US012808470B2

(12) United States Patent

Ravisankar et al.

(10) Patent No.: US 12,808,470 B2

(45) Date of Patent: *Nov. 24, 2026

(54) PUSH-TO-CONNECT FITTING PROVIDING AN INSERTION INDICATION

(71) Applicant: RELIANCE WORLDWIDE CORPORATION, Atlanta, GA (US)

(72) Inventors: Sai Kishore Ravisankar, Alpharetta, GA (US); William Vernon Kluss, West Woombye (AU); Samantha Kelly, New York, NY (US); Eliana Pippen, Powder Springs, GA (US); Derres Catalano, Roswell, GA (US); William Clinton Osteen, Hartselle, AL (US)

(73) Assignee: Reliance Worldwide Corporation, Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/811,019

(22) Filed: Aug. 21, 2024

(65) Prior Publication Data

US 2025/0067377 A1 Feb. 27, 2025

Related U.S. Application Data

(63) Continuation of application No. 17/931,748, filed on Sep. 13, 2022, now Pat. No. 12,104,730, which is a (Continued)

(51) Int. Cl.

*F16L 37/091* (2006.01)
*F16L 37/092* (2006.01)

(52) U.S. Cl.

CPC ....... *F16L 37/0915* (2016.05); *F16L 37/0926* (2019.08); *F16L 2201/10* (2013.01)

(58) Field of Classification Search

CPC ............... F16L 37/0915; F16L 37/0926; F16L 2201/10; F16L 37/091; F16L 37/0927

See application file for complete search history.

(56) References Cited

U.S. PATENT DOCUMENTS 3,819,207 A 6/1974 Leopold, Jr.
4,248,460 A 2/1981 Murray et al.

(Continued)

FOREIGN PATENT DOCUMENTS

CN 104089125 A 10/2014
CN 112384726 A 2/2021

(Continued)

OTHER PUBLICATIONS

WO—International Preliminary Report on Patentability; International Patent Application No. PCT/US2021/022146; Sep. 6, 2022.

(Continued)

*Primary Examiner* — William S. Choi

(74) *Attorney, Agent, or Firm* — Barnes & Thornburg LLP

(57) ABSTRACT

A tube fitting for connection to a tube includes a main body structure and a tube liner. The main body structure is configured to receive an end of the tube and fluidly connect the tube to another component. The tube liner is positioned at least partially within the main body structure and is configured to extend into the tube. The main body structure and the tube liner are configured such that, when the tube is fully inserted into the tube fitting, the end of the tube is positioned at a predetermined depth within the tube fitting, and the main body structure and the tube liner cooperate together to provide an audible indication to indicate that the tube has been fully inserted into the tube fitting.

21 Claims, 37 Drawing Sheets

Related U.S. Application Data continuation of application No. PCT/US2021/022146, filed on Mar. 12, 2021.

(60) Provisional application No. 62/989,043, filed on Mar. 13, 2020.

(56) References Cited

U.S. PATENT DOCUMENTS

| | | | | |
|---|---|---|---|---|
| 4,632,437 | A | 12/1986 | Robson | |
| 4,642,155 | A | 2/1987 | Ramsey | |
| 4,969,667 | A | 11/1990 | Sauer | |
| 5,090,748 | A | 2/1992 | Usui | |
| 5,584,513 | A | 12/1996 | Sweeny et al. | |
| 6,258,197 | B1 | 7/2001 | Helander | |
| 7,025,842 | B2 | 4/2006 | Monsheimer et al. | |
| 7,867,420 | B2 | 1/2011 | Wolter | |
| 8,025,318 | B1 | 9/2011 | Morroney et al. | |
| D722,363 | S | 2/2015 | Kluss et al. | |
| D746,951 | S | 1/2016 | Gledhill et al. | |
| D746,952 | S | 1/2016 | Gledhill et al. | |
| D746,954 | S | 1/2016 | Gledhill et al. | |
| D746,958 | S | 1/2016 | Gledhill et al. | |
| D751,673 | S | 3/2016 | Gledhill et al. | |
| D751,674 | S | 3/2016 | Gledhill et al. | |
| D751,675 | S | 3/2016 | Gledhill et al. | |
| 9,841,131 | B2 * | 12/2017 | Hagen | F16L 37/0915 |
| 10,016,856 | B2 | 7/2018 | Neal et al. | |
| 10,550,966 | B2 | 2/2020 | Blomberg | |
| D902,360 | S | 11/2020 | Kluss et al. | |
| 10,850,451 | B2 | 12/2020 | Lennon et al. | |
| D908,846 | S | 1/2021 | Kluss et al. | |
| D908,847 | S | 1/2021 | Kluss et al. | |
| 10,941,889 | B2 * | 3/2021 | Irwin | F16L 37/0915 |
| 10,962,153 | B2 | 3/2021 | Kluss et al. | |
| 11,105,452 | B1 | 8/2021 | Dias et al. | |
| 2006/0108705 | A1 | 5/2006 | Rowley | |
| 2010/0045030 | A1 | 2/2010 | Roberts et al. | |
| 2010/0308572 | A1 * | 12/2010 | Pedersen | F16L 37/0926 |
| 2011/0025054 | A1 * | 2/2011 | Kluss | F16L 37/0915 |
| 2011/0140417 | A1 | 6/2011 | Kluss | |
| 2013/0181446 | A1 * | 7/2013 | Le Clinche | F16L 37/0915 |
| 2014/0152002 | A1 | 6/2014 | Crompton et al. | |
| 2018/0001571 | A1 | 1/2018 | Lennon et al. | |
| 2019/0353286 | A1 | 11/2019 | Kujawski | |
| 2020/0096145 | A1 | 3/2020 | Lin | |
| 2020/0276771 | A1 | 9/2020 | Shi et al. | |
| 2021/0071793 | A1 | 3/2021 | Kluss et al. | |
| 2021/0285584 | A1 | 9/2021 | Ravisankar et al. | |
| 2021/0324986 | A1 | 10/2021 | Simon | |

FOREIGN PATENT DOCUMENTS

| | | | |
|---|---|---|---|
| GB | 2143918 | A | 2/1985 |
| JP | 2003314763 | A | 11/2003 |
| JP | 2004324858 | A | 11/2004 |
| JP | 2008286258 | A | 11/2008 |
| JP | 2010043729 | A | 2/2010 |
| JP | 2012077803 | A | 4/2012 |
| JP | 2012180940 | A | 9/2012 |
| JP | 2012219894 | A | 11/2012 |
| JP | 2016075308 | A | 5/2016 |
| MY | 143104 | A | 3/2011 |
| WO | 2009024787 | A1 | 2/2009 |
| WO | 2009068934 | A1 | 6/2009 |
| WO | 2015089583 | A1 | 6/2015 |
| WO | 2019209860 | A1 | 10/2019 |

OTHER PUBLICATIONS

WO—International Search Report and Written Opinion; International Patent Application No. PCT/US2021/022146; Jun. 25, 2021.

* cited by examiner

PUSH-TO-CONNECT FITTING PROVIDING AN INSERTION INDICATION

CROSS-REFERENCE TO RELATED PATENT APPLICATIONS

This patent application is a continuation of U.S. patent application Ser. No. 17/931,748, filed Sep. 13, 2022; which is a continuation of International Patent Application No. PCT/US2021/022146, filed Mar. 12, 2021; which claims priority to and the benefit of U.S. Provisional Patent Application No. 62/989,043, filed Mar. 13, 2020.

INCORPORATION BY REFERENCE

The entire disclosures of U.S. patent application Ser. No. 17/931,748, filed Sep. 13, 2022; International Patent Application No. PCT/US2021/022146, filed Mar. 12, 2021; and U.S. Provisional Patent Application No. 62/989,043, filed Mar. 13, 2020, are incorporated herein by reference.

FIELD

The present application relates generally to push-to-connect fittings.

BACKGROUND

In some tube fittings, a user may not know whether a tube is completely inserted within a tube fitting. Accordingly, the user may accidently use the tube fitting with the tube only partially attached. The present disclosure address this and other related and unrelated issues.

SUMMARY

Various implementations provide for a tube fitting for connection to a tube that comprises a main body structure and a tube liner. The main body structure is configured to receive an end of the tube and fluidly connect the tube to another component. The tube liner is positioned at least partially within the main body structure and is configured to extend into the tube. The main body structure and the tube liner are configured such that, when the tube is fully inserted into the tube fitting, the end of the tube is positioned at a predetermined depth within the tube fitting, and the main body structure and the tube liner cooperate together to provide an audible indication to indicate that the tube has been fully inserted into the tube fitting.

According to various embodiments, the tube liner is configured to move axially in a first axial direction along a longitudinal direction into the main body structure in tandem with axial motion of the tube.

According to various embodiments, one of the main body structure and the tube liner comprises a protrusion, and another of the main body structure and the tube liner comprises a groove configured to receive the protrusion. The audible indication is generated when the groove receives the protrusion once the tube has been fully inserted into the tube fitting.

According to various embodiments, the tube liner comprises at least one slot extending along the length of the tube liner from an end of the tube liner. The at least one slot allows the end of the tube liner to flex radially inwardly as the protrusion moves into the groove.

According to various embodiments, one of the protrusion or the groove is formed integrally along an inner surface of the main body structure.

According to various embodiments, the main body structure comprises a main body and an insert positioned within the main body. The insert is configured to receive the end of the tube and comprises one of the protrusion or the groove.

According to various embodiments, the tube liner comprises an inner portion configured to extend into the tube and an extension that extends radially outward from an outer surface of the inner portion of the tube liner. The extension is configured to abut the end of the tube such that, as the tube moves into the tube fitting, the tube moves the tube liner further into the tube fitting in a longitudinal direction of the tube fitting.

According to various embodiments, the tube liner is freely movable in an axial direction along at least a portion of the length of the main body structure before the tube is fully inserted into the tube fitting.

According to various embodiments, within the main body structure, the tube liner is the only component of the tube fitting that moves together with the tube.

According to various embodiments, the tube liner comprises a seal member that is configured to provide a seal between an inner surface of the tube and an outer surface of the tube liner.

According to various embodiments, when the tube is only partially inserted into the tube fitting, the end of the tube is inserted into the tube fitting such that the end of the tube is positioned at a depth that is less than the predetermined depth within the tube fitting, and the audible indication is not provided.

According to various embodiments, the tube fitting further comprises a retainer positioned around an end of the main body structure. When the tube is only partially inserted into the tube fitting, the end of the tube is positioned at a depth that is less than the predetermined depth within the tube fitting, and such that the retainer is freely rotatable about the end of the main body structure. When the tube is fully inserted into the tube fitting, the main body structure and the retainer cooperate together to prevent the retainer from freely rotating about the end of the main body structure. The main body structure and the retainer provide a force indication to indicate that the tube has been fully inserted into the tube fitting. The force indication is provided by a resisting force of the retainer so as to prevent rotational movement of the retainer relative to the main body structure when a user attempts to rotate the retainer.

According to various embodiments, the tube fitting further comprises a spring member. The tube liner comprises an inner portion configured to extend into the tube and an extension that extends radially outward from an outer surface of the inner portion of the tube liner. The spring member is positioned along the extension and is configured to abut the end of the tube such that, when the tube moves in a first axial direction into the tube fitting and is fully inserted into the tube fitting, the spring member pushes the tube backward in a second axial direction opposite to the first axial direction to provide the force indication.

According to various embodiments, the spring member is constructed out of a flexible material.

Various other implementations provide for a tube fitting for connection to a tube. The tube fitting comprises a main body structure configured to receive an end of the tube and fluidly connect the tube to another component and a retainer positioned around an end of the main body structure. The main body structure and the retainer are configured such that, when the tube is only partially inserted into the tube fitting, the end of the tube is positioned at a depth that is less than a predetermined depth within the tube fitting, and the retainer is freely rotatable about the end of the main body structure. When the tube is fully inserted into the tube fitting, the end of the tube is positioned at the predetermined depth within the tube fitting, and the main body structure and the retainer cooperate together to prevent the retainer from freely rotating about the end of the main body structure. The main body structure and the retainer provide a force indication to indicate that the tube has been fully inserted into the tube fitting. The force indication comprises the retainer providing a resisting force preventing rotational movement of the retainer relative to the main body structure when a user attempts to rotate the retainer.

According to various embodiments, the tube fitting further comprises a tube liner and a spring member. The tube liner is positioned at least partially within the main body structure and comprises an inner portion configured to extend into the tube and an extension that extends radially outward from an outer surface of the inner portion of the tube liner. The spring member is positioned along the extension and is configured to abut the end of the tube such that, when the tube moves in a first axial direction into the tube fitting and is fully inserted into the tube fitting, the spring member pushes the tube backward in a second axial direction opposite to the first axial direction to provide the force indication.

According to various embodiments, the tube liner comprises an outer portion with a lip configured to abut a ledge along an inner surface of the main body structure.

According to various embodiments, the tube fitting further comprises a grab ring that is configured to grip an outer surface of the tube and move in the second axial direction when the tube moves in the second axial direction. Movement of the grab ring in the second axial direction moves the retainer in the second axial direction to prevent the retainer from rotating such that the main body structure and the retainer provide the force indication.

According to various embodiments, the tube fitting further comprises a cartridge ring positioned at least partially within the retainer. Movement of the grab ring in the second axial direction moves the cartridge ring in the second axial direction so as to move the retainer in the second axial direction.

According to various embodiments, the retainer comprises at least one tab that extends axially inward. An outer surface of the main body structure comprises a channel that extends radially around the main body structure and is configured to receive the at least one tab of the retainer.

According to various embodiments, the channel comprises an end wall. When the at least one tab is pulled further into the channel in the second axial direction due to the movement of the retainer in the second axial direction, a free end of the at least one tab firmly abuts the end wall. A frictional force of the at least one tab of the retainer being pulled onto the end wall of the channel of the main body structure in the second axial direction prevents the retainer from rotating relative to the main body structure and provides the force indication that the tube is fully inserted into the tube fitting.

According to various embodiments, the end wall of the channel of the main body structure comprises at least one notch that is indented axially along a circumferential length of the end wall. The at least one tab is configured to align with and be received within the at least one notch such that side edges of the at least one notch rotationally lock the retainer relative to the main body structure to provide the force indication that the tube is fully inserted into the tube fitting.

According to various embodiments, when the tube is only partially inserted into the tube fitting, the force indication is not provided.

According to various embodiments, the tube fitting further comprises a tube liner positioned at least partially within the main body structure and configured to extend into the tube. When the tube is fully inserted into the tube fitting, the main body structure and the tube liner cooperate together to provide an audible indication to indicate that the tube has been fully inserted into the tube fitting.

According to various embodiments, one of the main body structure and the tube liner comprises a protrusion. The other of the main body structure and the tube liner comprises a groove configured to receive the protrusion. The audible indication is generated when the groove receives the protrusion.

Various other implementations provide for a tube fitting for connection to a tube that comprises a body assembly and an actuator. The body assembly is configured to receive an end of the tube and fluidly connect the tube to another component. The actuator is positioned at least partially within the body assembly and is movable between a retracted position and an extended position within the body assembly. The body assembly and the actuator are configured such that, when the tube is fully inserted into the tube fitting, the end of the tube is positioned at a predetermined depth within the tube fitting and the actuator is moved from the retracted position to the extended position to provide a visual indication to indicate that the tube has been fully inserted into the tube fitting.

According to various embodiments, the actuator is one of a conical structure or a clip that is configured expand radially outwardly when moving from the retracted position to the extended position.

According to various embodiments, the body assembly defines a through-hole through which the visual indication is provided.

According to various embodiments, the tube fitting further comprises a securing ring with an indication member that is visible through the through-hole to provide the visual indication. The indication member is configured to press against an inner surface of the body assembly to prevent the securing ring from inadvertently moving within the body assembly.

According to various embodiments, the tube fitting further comprises a demount ring movable between a concealed position in which the demount ring is positioned completely within the body assembly and an exposed position in which the demount ring is positioned partially outside of the body assembly. When the actuator is moved from the retracted position to the extended position, the demount ring is concurrently moved from the concealed position to the exposed position to provide the visual indication.

Various other implementations provide for a method of connecting a tube into a tube fitting. The method comprises inserting an end of the tube into the tube fitting to fluidly connect the tube to another component, inserting a tube liner at least partially into the tube (where the tube liner is positioned at least partially within a main body structure), and providing an audible indication to indicate that the tube has been fully inserted into the tube fitting. The main body structure and the tube liner cooperate together to provide the audible indication. When the tube is fully inserted into the the tube fitting, the end of the tube is inserted into the tube fitting such that the end of the tube is positioned at a predetermined depth within the tube fitting.

These and other features together with the organization and manner of operation thereof, will become apparent from the following detailed description when taken in conjunction with the accompanying drawings, wherein like elements have like numerals throughout the several drawings described below.

DETAILED DESCRIPTION

Referring to the figures generally, various implementations disclosed herein relate to a tube fitting that provides at least one indication that the tube has been completely or fully inserted into the tube fitting. As described further herein, the tube fitting may provide an audible indication, a force indication, and/or a visual indication to indicate when the tube has been completely inserted into the tube fitting.

Figure 1A:
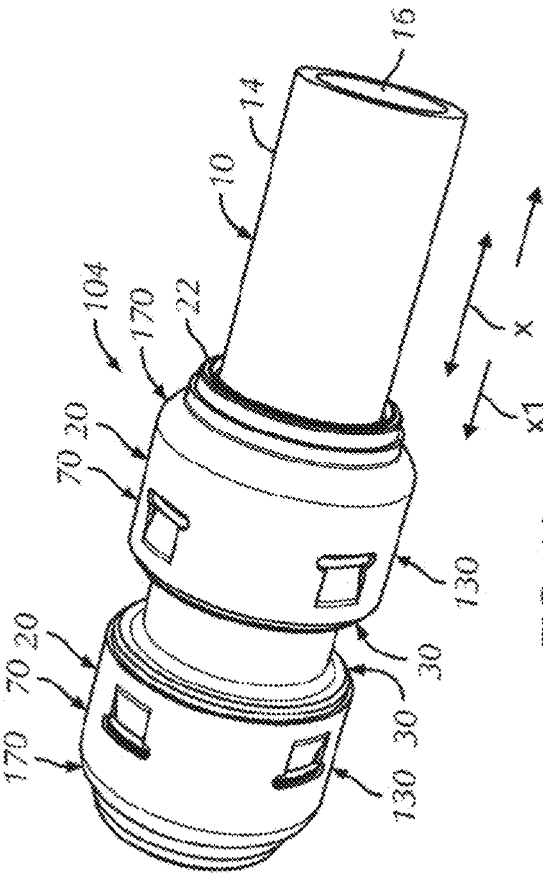
FIG. 1A is a perspective view of a tube fitting according to one implementation, as shown attached to a tube.
Figure 1B:
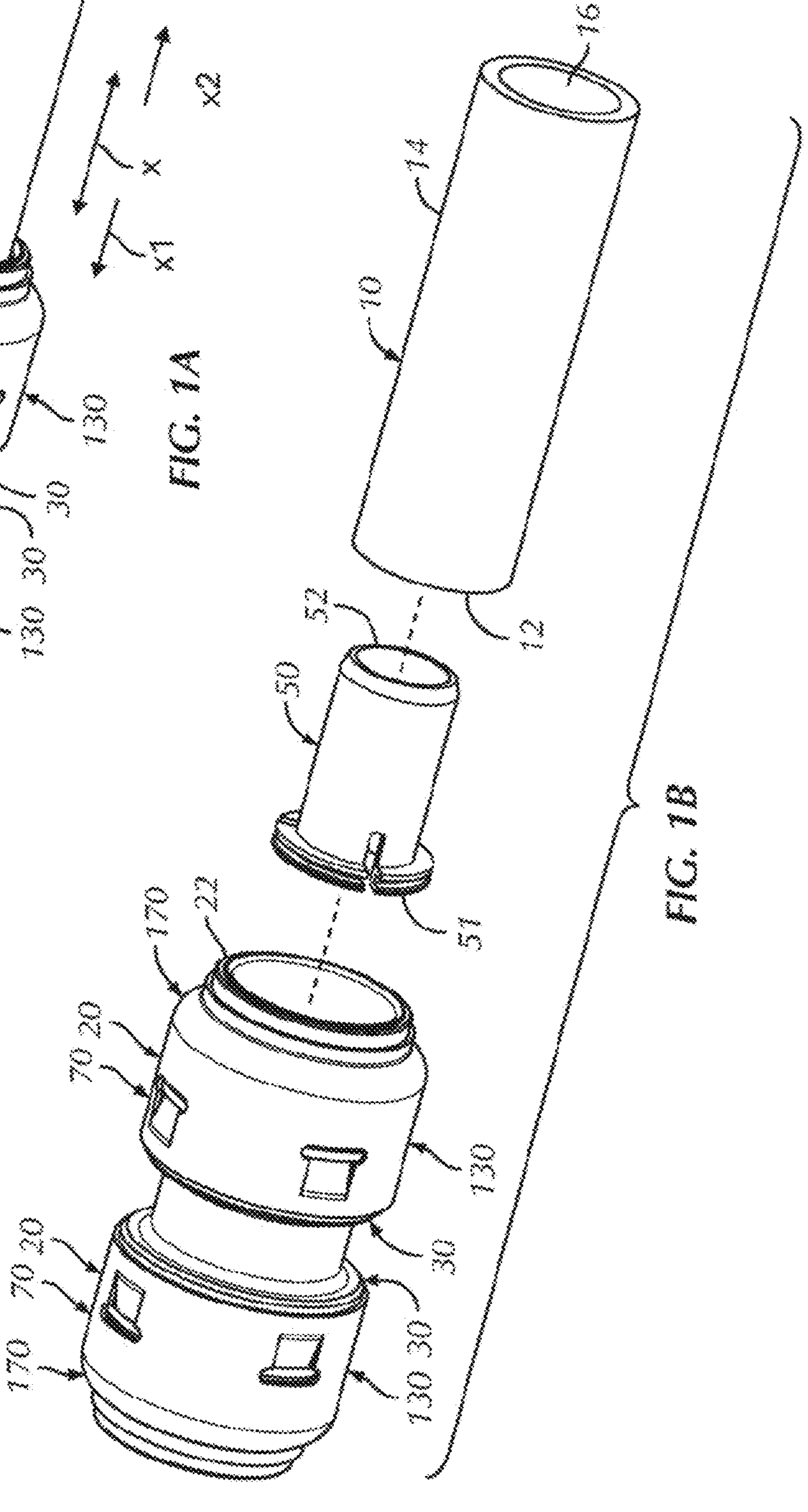
FIG. 1B is an exploded view of the tube fitting and the tube of FIG. 1 A.

As shown in FIGS. 1A-1B, a tube fitting assembly (referred to herein as the tube fitting 20) is configured to receive and connect to a portion of a tube 10 or other tubular member (e.g., a pipe, conduit, etc.), in particular an end 12 of the tube 10. The end 12 of the tube 10 is inserted within and secured or locked into the tube fitting 20. To indicate that the tube 10 has been fully inserted into the tube fitting 20, the tube fitting 20 is configured to provide various insertion indications, such as an audible indication, a force indication, and/or a visual indication, as described further herein. Full or complete insertion of the tube 10 into the tube fitting 20 generally refers to when the tube 10 has been inserted into the tube fitting 20 such that the end 12 of the tube 10 is positioned at a predetermined depth within the tube fitting 20 and/or a predetermined length of the tube 10 is positioned within the tube fitting 20. Full insertion of the tube 10 within the fitting 20 may indicate that the end 12 of the tube 10 has reached a stop or terminus of the tube fitting 20, that the tube 10 is sufficiently sealed within or to the tube fitting 20 (in particular with a seal member 28), and/or that the tube 10 cannot be moved any further within, into, and along the length of the tube fitting 20 in a first axial direction XI.

Figure 4A:
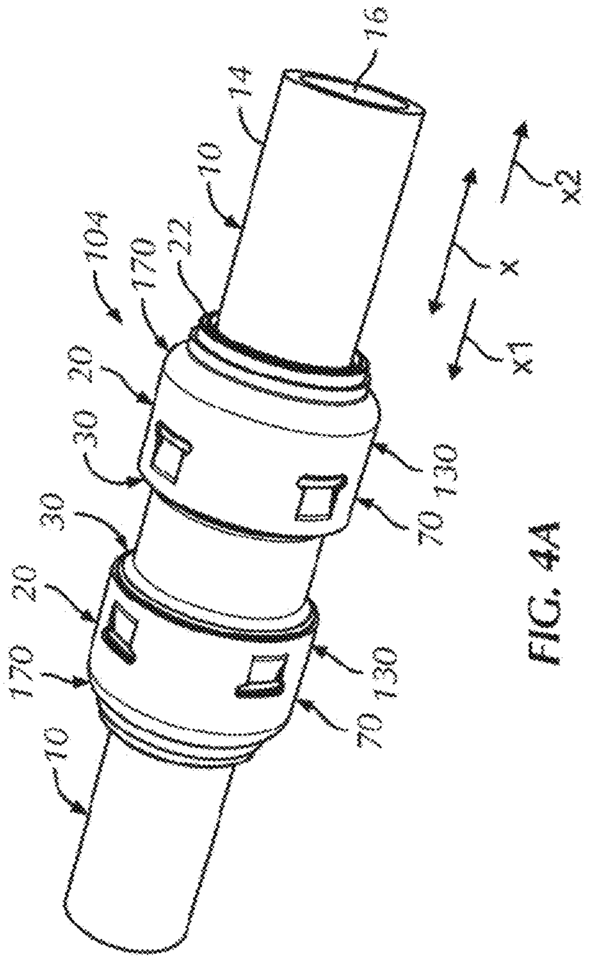
FIG. 4A is a perspective view of two tube fittings according to another implementation attached to two tubes.
Figure 4B:
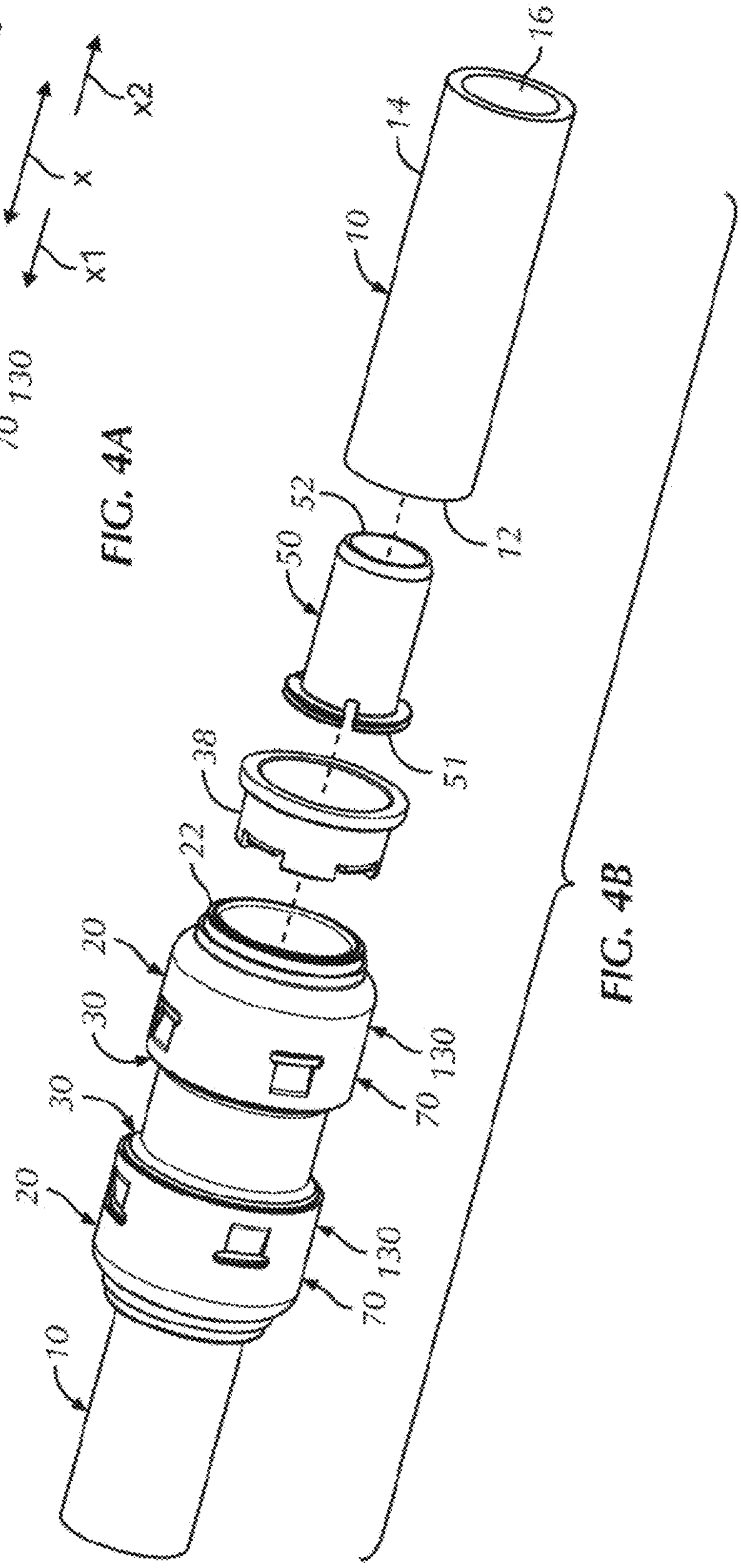
FIG. 4B is an exploded view of one of the tube fittings and the tube of FIG. 4A.

The tube fitting 20 may allow the tube 10 to be fluidly connected to another component or device (such as another tube 10). Accordingly, fluid can flow in either direction between the respective inner areas defined by the tube fitting 20 and the tube 10. The tube fitting 20 may be a part of a dual fitting assembly (as shown in FIGS. 4A-4B) that includes two tube fittings 20 connected to each other on opposite ends, which are each configured to receive and fluidly connect two different tubes 10.

Figure 2A:
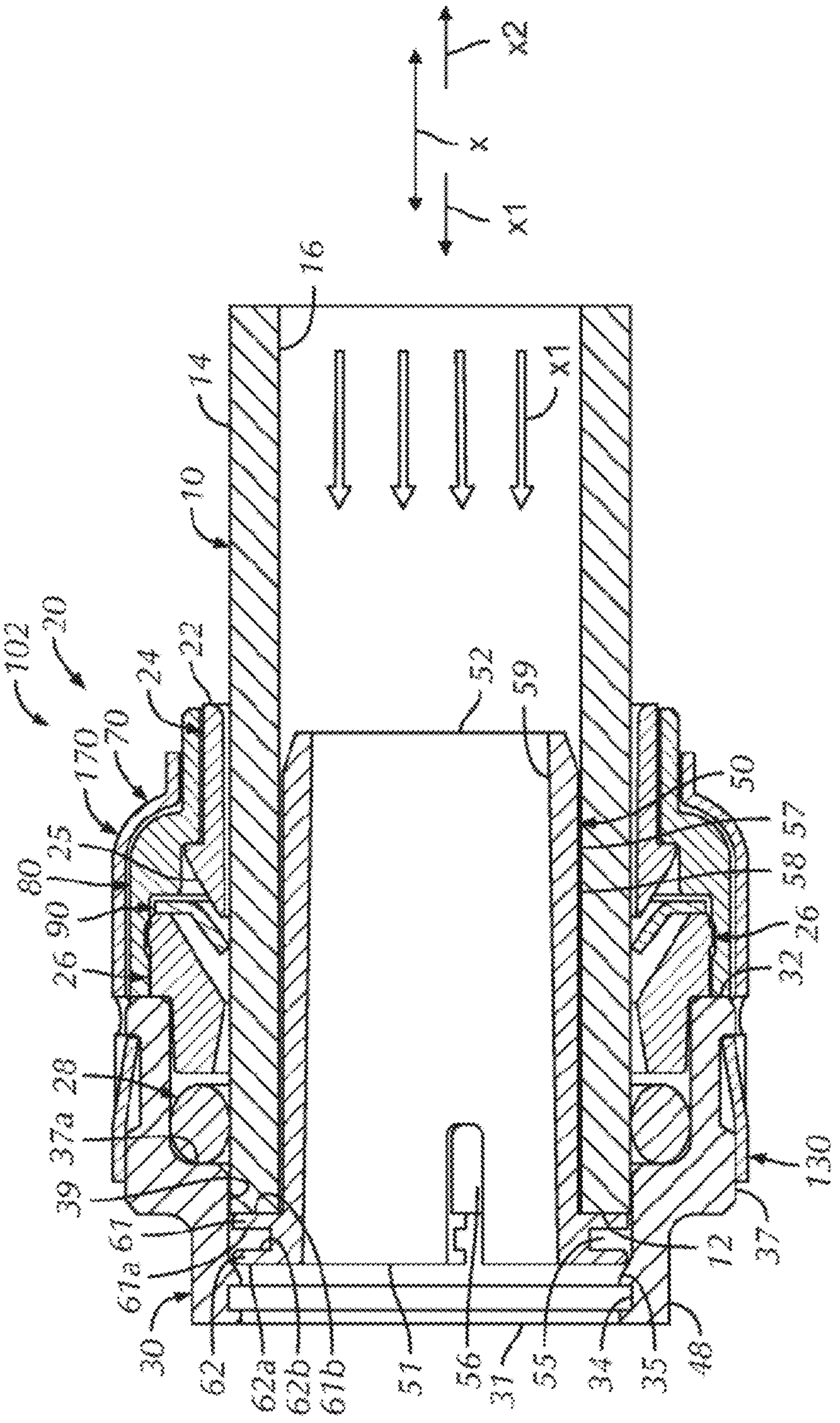
FIG. 2A is a cross-sectional view of the tube fitting of FIG. 1A with the tube in the partial insertion position.
Figure 2B:
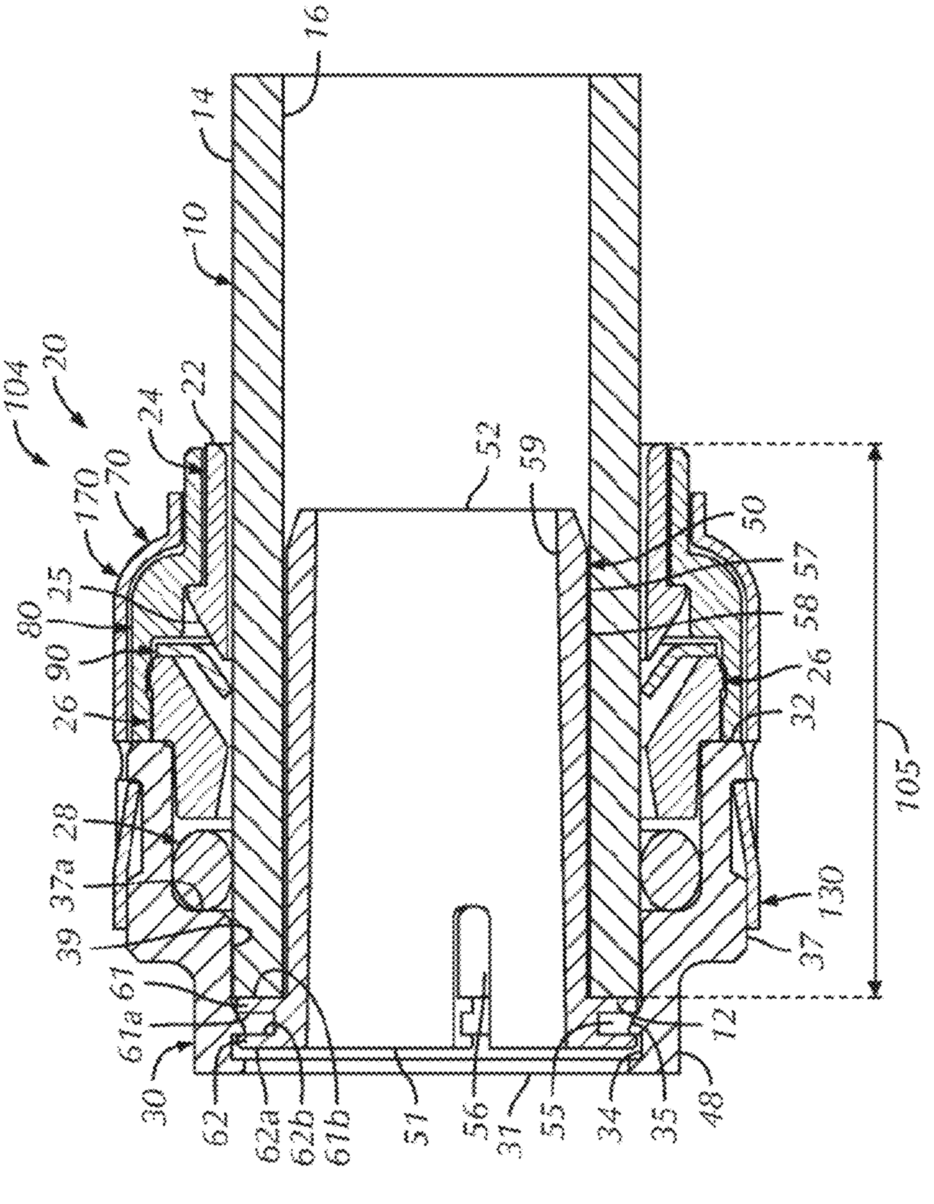
FIG. 2B is a cross-sectional view of the tube fitting of FIG. 1 A with the tube in the full insertion position.

As shown in various implementations, the tube fitting 20 comprises a body assembly 130, a tube liner 50 configured to extend into the tube 10, and a grab ring 90 configured to secure the tube 10 (as shown, for example, in FIGS. 2A-2B). The body assembly 130 is configured to receive the end 12 of the tube 10 and fluidly connect the tube 10 to another component. In particular, the body assembly 130 comprises a main body structure 30 configured to receive the end 12 of the tube 10 and a retainer structure 170 that is positioned radially around a portion of the main body structure 30 and extends axially from the second end 32 of the main body structure 30.

The sleeve or retainer structure 170 includes a retainer 70 and a cartridge ring 80.

According to some implementations (as shown, for example, in FIGS. 2A-2B, 5A-5B, and 11 A-15), the retainer 70 and the cartridge ring 80 are separate components that are attachable to each other. Accordingly, the retainer 70 is positioned around a portion of the main body structure 30 and the cartridge ring 80 is positioned within the retainer 70. Alternatively, according to other implementations (as shown, for example, in FIGS. 18A-18B, 24A-24B, and 27A-27B), the retainer 70 and the cartridge ring 80 are integral components that may be constructed as a single piece. Accordingly, the retainer structure 170 comprises a single unitary component that cannot be separated without destruction. If the retainer 70 and the cartridge ring 80 are integral components (as shown in FIGS. 17A-27B, for example), the retainer 70 forms the radially outward portion of the retainer structure 170, and the cartridge ring 80 forms the radially inward portion of the retainer structure 170. The retainer structure 170 may be constructed out of a variety of different materials, including but not limited to plastic or metal (such as stainless steel).

Figure 8:
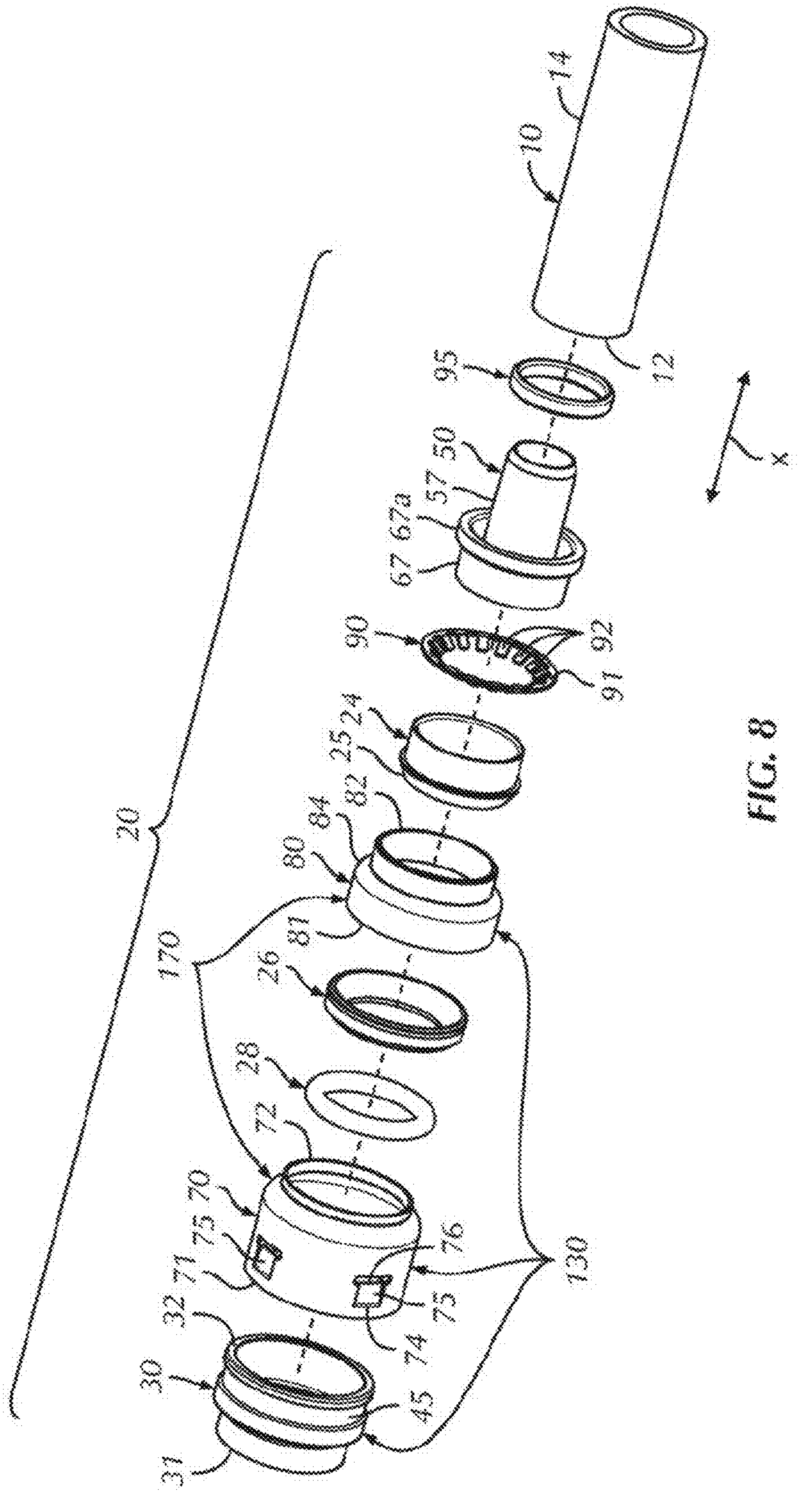
FIG. 8 is an exploded view of the tube fitting and tube of FIG. 7A.
Figure 11A:
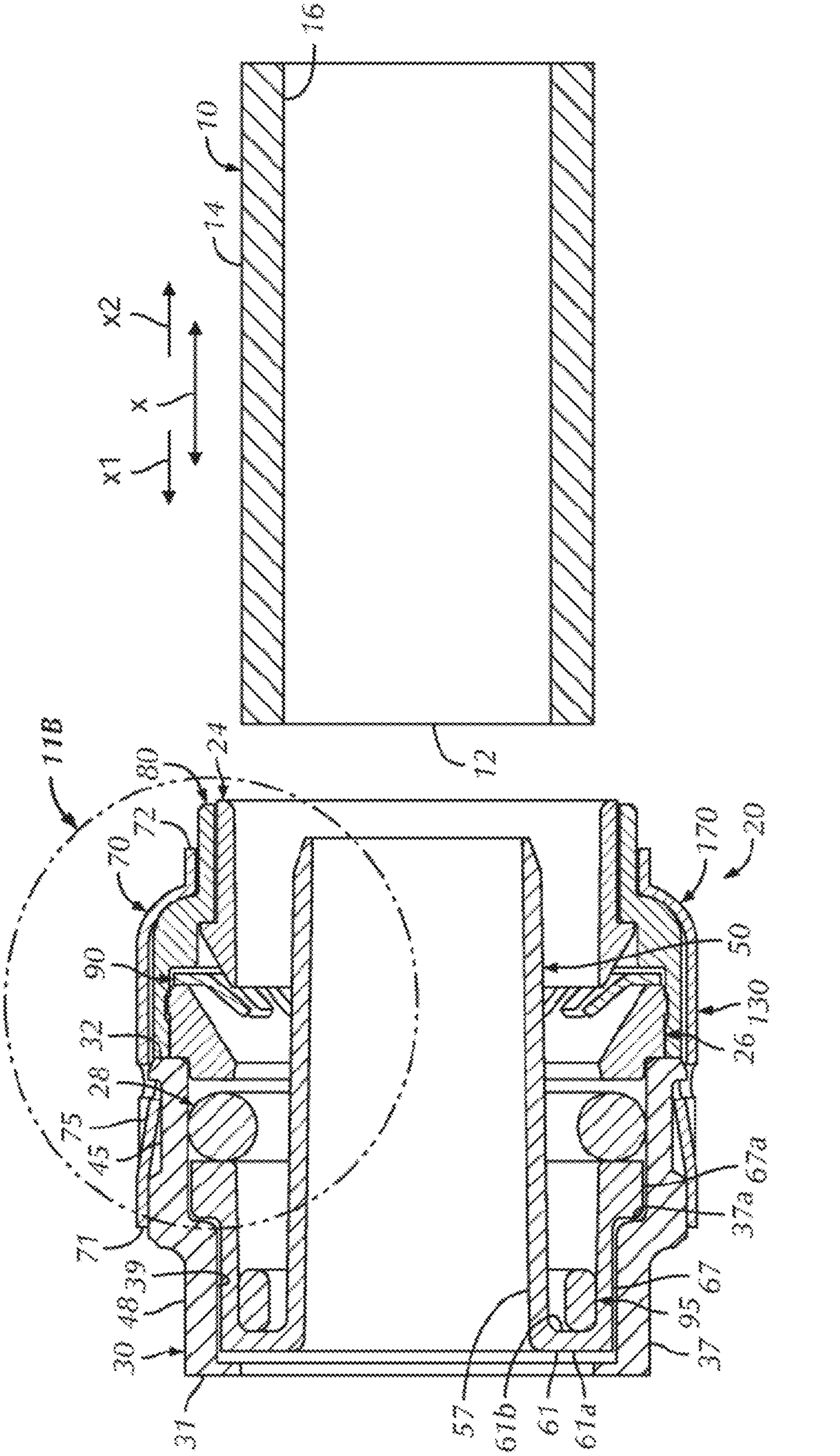
FIG. 11A is a cross-sectional view of the tube fitting of FIG. 8 with the tube unattached to the tube fitting.
Figure 11B:
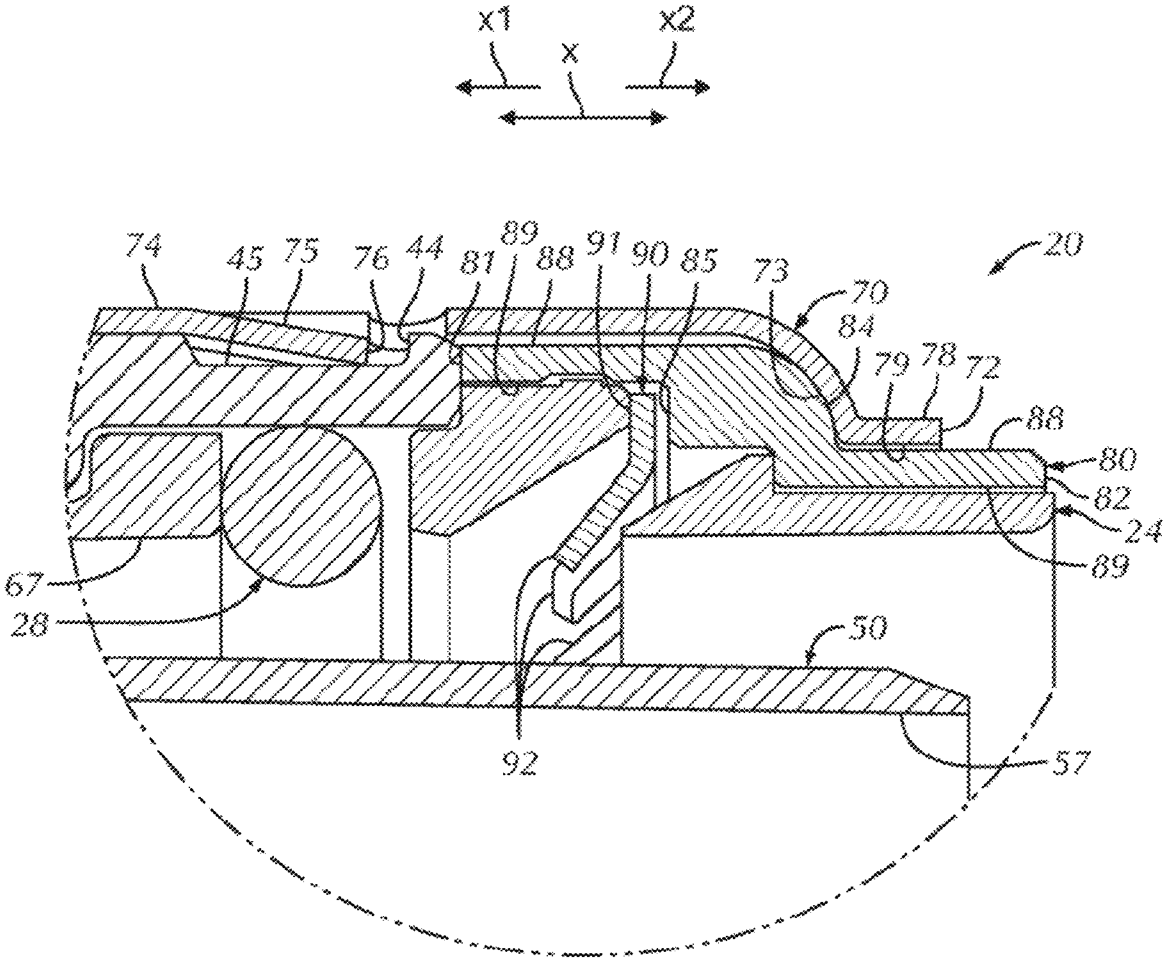
FIG. 11B is an enlarged portion of the tube fitting of FIG. 11 A.

The tube fitting 20 may further comprise other components, including but not limited to a demount ring 24, a securing ring 26, and a seal member 28 (as shown in FIGS. 2A and 8). The demount ring 24 is positioned along the entrance end 22 of the tube fitting 20 and extends axially inwardly from the entrance end 22. The demount ring 24 comprises an angled end 25 that is configured to release the tube 10 from the grab ring 90 when the user moves the demount ring 24 in the first axial direction XI (with, for example, a tool), thereby opening up the grab ring 90 and releasing the tube 10 from the grab ring 90 (which allows the tube 10 to be removed from the tube fitting 20). The demount ring 24 is positioned at least partially within the cartridge ring 80. The protection ring or securing ring 26 is positioned axially inward from the demount ring 24 and the grab ring 90 (i.e., in the first axial direction XI from the demount ring 24) and axially outward from the seal member 28 (i.e., in the second axial direction X2 from the seal member 28), and therefore axially between the grab ring 90 and the seal member 28. The securing ring 26 is positioned radially within the body assembly (e.g., at least partially within the main body structure 30 and the retainer structure 170, and in particular within the cartridge ring 80). The grab ring 90 is positioned axially between the securing ring 26 and the demount ring 24. The seal member 28 is positioned within the main body structure 30, axially between the securing ring 26 and either the transition portion 37*a* of the main body 37 (as shown in FIG. 2A), an end surface of the insert 38 (as shown in FIG. 5 A), an end surface of the outer portion 67 of the tube fitting 20 (as shown in FIG. 11 A), or an end surface of the activation structure 160 (as shown in FIGS. 18A-18B and 24A-24B).

To insert the tube 10 into the tube fitting 20, the tube 10 is moved in a first axial direction XI along a longitudinal direction X (which is the axial direction) of the tube fitting 20 into the tube fitting 20 (in particular into the body assembly 130). As shown in FIG. 2A, when the tube 10 is only partially inserted into the tube fitting 20 (i.e., the partial insertion position 102), the end 12 of the tube 10 is inserted into the tube fitting 20 such that the end 12 of the tube 10 is positioned at a depth that is less than a predetermined depth 105 within the tube fitting 20.

As shown in FIG. 2B, when the tube 10 is fully inserted into the tube fitting 20 (i.e., the full insertion position 104), the end 12 of the tube 10 is inserted into the tube fitting 20 such that the end 12 of the tube 10 is positioned at the predetermined depth 105 within the tube fitting 20. When the tube 10 is fully inserted into the tube fitting 20, the tube 10 and the tube fitting 20 are substantially aligned (along their respective flow directions and longitudinal axis) along the longitudinal direction X, and the seal member 28 is located at a position along the tube 10 to provide for sufficient sealing of the tube 10 within the tube fitting 20. When the tube 10 is fully inserted into the tube fitting 20, the tube fitting 20 is configured to provide at least one insertion indication (i.e., an audible indication, a force indication, and/or a visual indication, as described further herein) to indicate that the tube 10 is fully inserted into the tube fitting 20. To remove the tube 10 from the tube fitting 20, the tube 10 is moved backwards in a second axial direction X2 (that is opposite the first axial direction XI) along the longitudinal direction X.

Figure 5A:
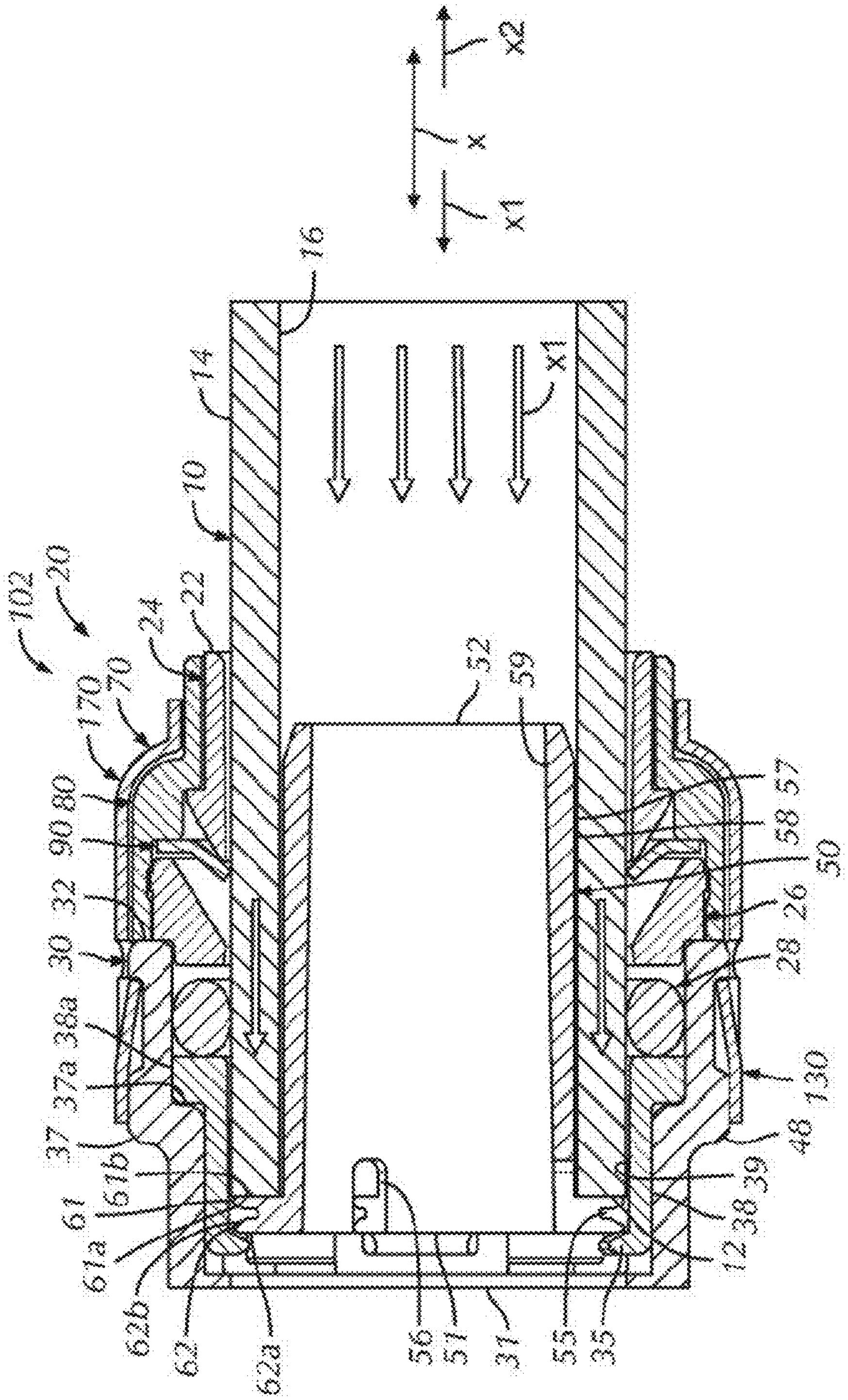
FIG. 5A is a cross-sectional view of one of the tube fittings of FIG. 4 A with the tube in the partial insertion position.
Figure 5B:
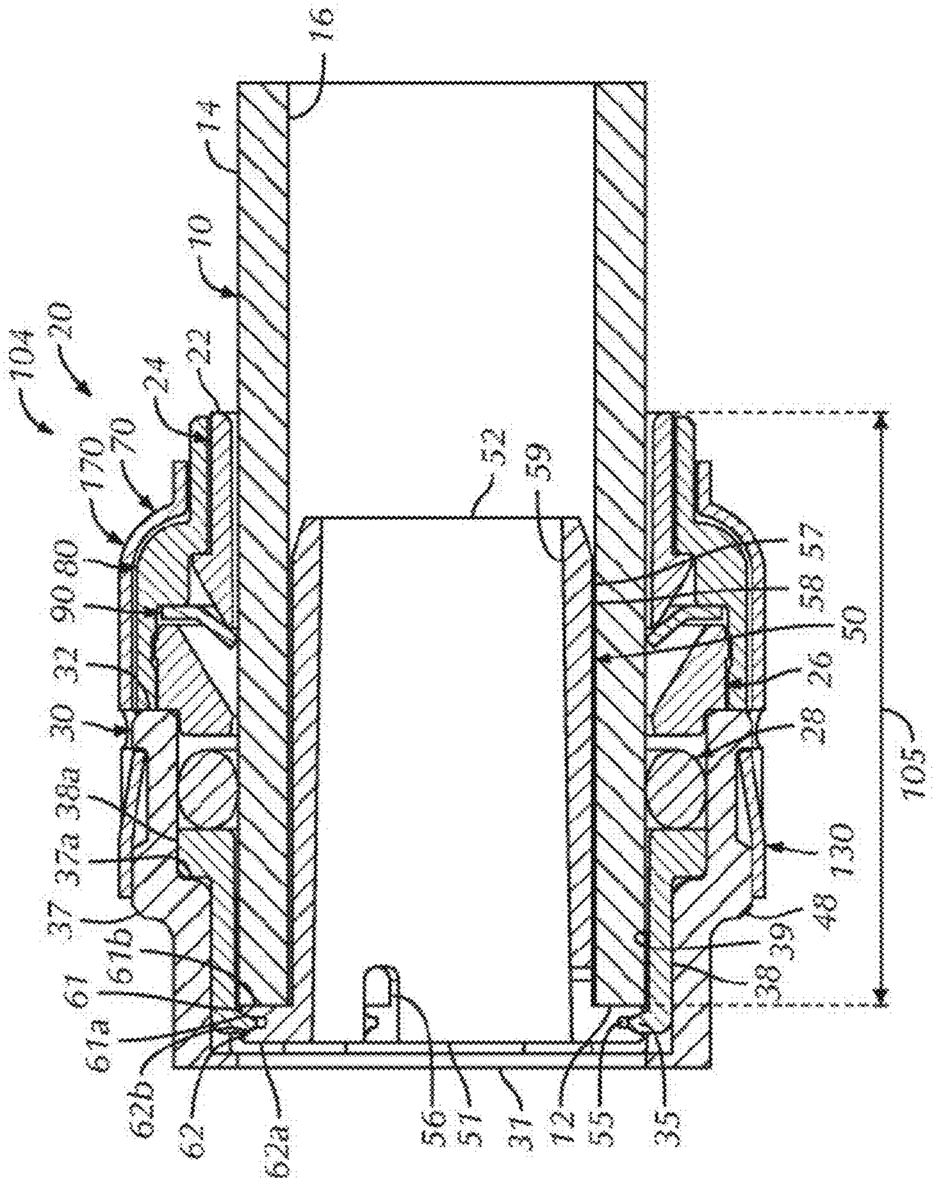
FIG. 5B is a cross-sectional view of one of the tube fittings of FIG. 4A with the tube in the full insertion position.

The predetermined depth 105 refers to the depth that the tube 10 is inserted into the tube fitting 20 in order to be fully or completely inserted and is the longitudinal distance between the end 12 of the tube 10 and the entrance end 22 of the tube fitting 20 when the tube 10 is fully inserted (as shown in FIGS. 2B and 5B). The predetermined depth 105 may be determined or defined by the second surface 61*b* of the first extension 61 of the tube liner 50 or the spring member 95 of the tube fitting 20 (as described further herein), either of which can act as a "stop" for the tube 10 by preventing the tube 10 from moving any further into the tube fitting 20. In particular, when the end 12 of the tube 10 is pressed completely against the second surface 61*b* of the first extension or against the spring member 95 (and the second surface 61*b* or the spring member 95 cannot move any further within and along the length of the tube fitting 20 in the first axial direction XI), the end 12 of the tube 10 is at the predetermined depth 105 within the tube fitting 20 (assuming the tube liner 50 is installed completely within main body structure 30 and cannot move any further within and along the length of the tube fitting 20 in the first axial direction XI). The entrance end 22 of the tube fitting 20 is the longitudinal end of the tube fitting 20 through which the tube 10 is initially inserted. The first axial direction XI of the longitudinal direction X refers to an axial and longitudinal direction leading further into the main body structure 30 of the tube fitting 20. The second axial direction X2 of the longitudinal direction X refers to an axial and longitudinal direction leading further out from the main body structure 30 of the tube fitting 20.

As described further herein, to connect the tube 10 into the tube fitting 20 (to fluidly connect the tube 10 to another component), the end 12 of the tube 10 is inserted into the tube fitting 20 in the first axial direction XI, and the tube liner 50 is inserted at least partially into the tube 10 (i.e., the tube 10 is moved over the tube liner 50). Once the tube 10 has been moved into the full insertion position 104, an audible indication, a force indication, and/or a visual indication are provided to indicate to the user that the tube 10 has been fully inserted into the tube fitting 20

The main body component or structure 30 is configured to receive the end 12 of the tube 10 and fluidly connect the tube 10 to another component. Although the main body structure 30 is included within the various implementations of the tube fitting 20, the main body structure 30 is primarily described with respect to FIGS. 2A-2B and 5A-5B.

As shown in FIGS. 2A-2B, the main body structure 30 comprises a main body 37 that defines an area within which the tube 10 is received. The main body structure 30 comprises a first end 31 and a second end 32 that are opposite each other along the longitudinal length of the main body structure 30. The first end 31 is closer to the first axial direction XI, and the second end 32 is closer to the second axial direction X2 (relative to each other). When the tube 10 is inserted into the tube fitting 20, the tube 10 first moves through the second end 32 of the main body structure 30 (before proceeding further into the main body structure 30 toward the first end 31).

The main body structure 30 comprises an inner surface 39 and an outer surface 48 that are opposite each other. The inner surface 39 faces radially inward towards and the outer surface 48 faces radially outward away from the tube 10 (and the center area of the main body structure 30). If the main body structure 30 includes the insert 38, the inner surface 39 may refer to respective inner surfaces of both the main body 37 and the insert 38 collectively.

Along the inner surface of the main body 37, the main body 37 includes a first portion (along the first end 31) and a second portion (along the second end 32), where the second portion of the main body 37 has a larger inner diameter than the first portion of the main body 37. The main body 37 also includes a circumferential transition portion 37*a* along the inner surface of the main body 37 that extends between, connects, and provides a transition between the first portion and the second portion. In particular, the transition portion 37*a* extends radially outward from the first portion (with the smaller diameter) to the second portion (with the larger diameter).

The transition portion 37*a* provides an area for certain components (such as the seal member 28, the insert 38, and the activation structure 160) to abut against, as described further herein. According to some implementations (as shown, for example, in FIGS. 2A-2B), the transition portion 37*a* is a lip, step, or ledge that extends at approximately 90° to the inner surfaces of the first portion and the second portion. According to other implementations (as shown, for example, in FIGS. 24A-24B), the transition portion 37*a* may be sloped, curved, ramped, or angled (at an angle that is not approximately 90°) relative to the inner surfaces of the first portion and the second portion and as the transition portion 37*a* extends between the first and second portions.

According to some implementations (as shown, for example, in FIGS. 2A-2B), the main body structure 30 is a single-piece structure that comprises the main body 37 (and does not include the insert 38). In particular, the main body structure 30 of FIGS. 2A-2B is constructed as a single-piece and comprises a single unitary, integral component that cannot be separated without destruction. According to various other implementations (as shown, for example, in FIGS. 4A-6), the main body structure 30 is a two-piece assembly and further comprises an insert 38 positioned within the main body 37 and configured to receive the end 12 of the tube 10.

Figure 6:
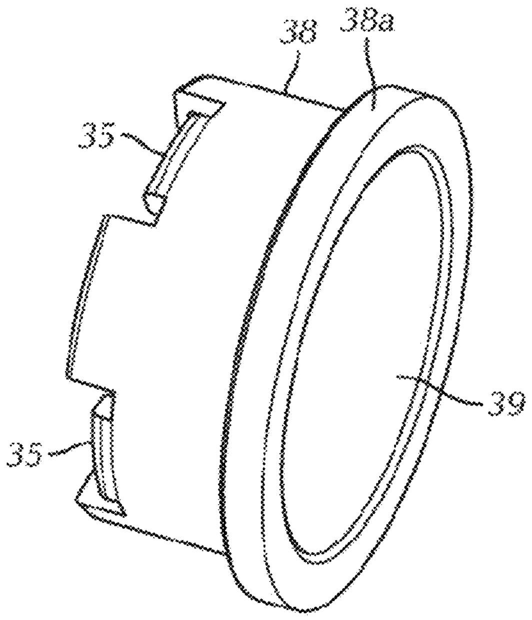
FIG. 6 is a perspective view of an insert of one of the tube fittings of FIG. 4 A.

In implementations in which the main body structure 30 comprises the insert 38 (as shown FIGS. 5A-5B, for example), the transition portion 37*a* is a lip, step, or ledge that provides an area for the main body 37 and the insert 38 to attach together. As shown in FIGS. 5A-6, the insert 38 may have a corresponding and complementary circumferential ledge or lip 38*a* along the outer surface of the insert 38 that has a larger outer diameter than the rest of the insert 38.

The transition portion 37*a* (and a portion of the second portion) of the main body 37 is configured to receive and secure the lip 38*a* of the insert 38, such that the lip 38*a* abuts against the transition portion 37*a*. The main body 37 and the insert 38 are sized and shaped such that the insert 38 fits completely with the main body 37, radially inward from the main body 37.

Figure 10A:
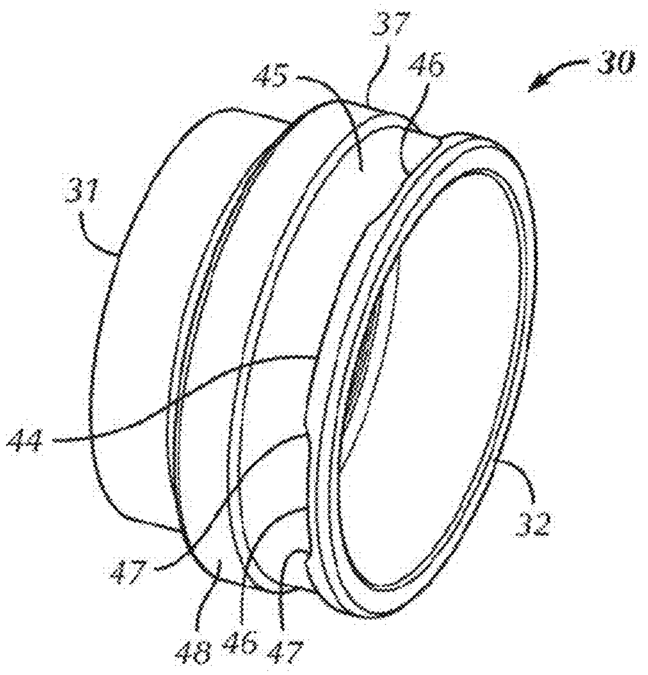
FIG. 10A is a perspective view of a main body structure according to another implementation.
Figure 10B:
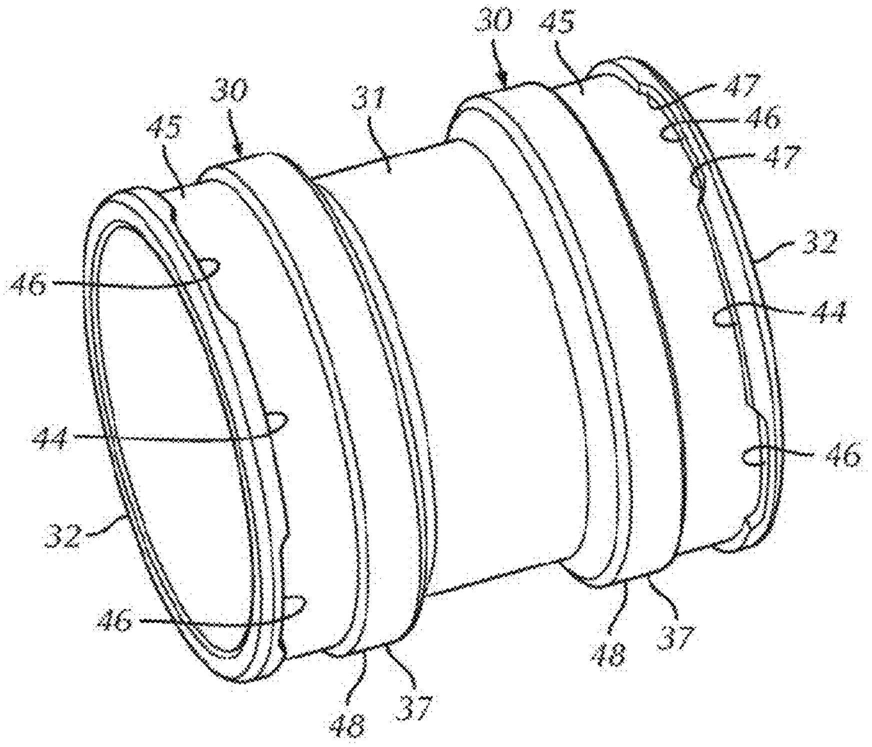
FIG. 10B is a perspective view of two main body structures of FIG. 10A attached to each other.

Optionally, as shown in FIG. 10B, two main body structures 30 may be attached to each other (along their respective first ends 31) as an integral piece that is configured to connect two different tubes 10. In particular, the two different tubes 10 are attached to each of the two main body structures 30 along opposite ends of the integral piece (as shown in FIG. 4A). Although the two main body structures 30 of FIG. 10B are shown on opposite ends from each other (i.e., at approximately 180° from each other), the two main body structures 30 may be positioned in a variety of different orientations and angles relative to each other, such as at approximately 450 or approximately 90° from each other. Furthermore, additional other main body structures 30 may also be fluidly attached to the two main body structures 30 (creating a conduit therebetween) at a variety of different angles and orientations.

The main body structure 30 may be constructed out of a variety of different materials, including metal (such as brass) or plastic.

As shown in FIGS. 2A-2B and 5A-5B, the tube liner 50 (e.g., a tube stiffener) is positioned at least partially within the main body structure 30 and is configured to extend into the tube 10 (and optionally also around the tube 10) once the tube 10 is at least partially inserted into the main body structure 30 (and at full insertion) and support the tube 10. The tube liner 50 may also act as a stop within the tube fitting 20 and position the tube 10 as the desired predetermined depth 105 in the full insertion position 104 (by abutting either the second surface 61*b* of the first extension 61 of the tube liner 50 or the spring member 95 (which is along the second surface 61*b* of the first extension 61) against the end 12 of the tube 10, thereby preventing the tube 10 from moving any further into the tube fitting 20). Although the tube liner 50 is included within the various implementations of the tube fitting 20, the tube liner 50 is primarily described with respect to FIGS. 2A-2B and 5A-5B.

The tube liner 50 is freely movable and floatable within at least a portion of the longitudinal, axial length of the main body structure 30 of the tube fitting 20 and along the axial, longitudinal direction X (before the tube 10 is fully inserted into the tube fitting 20 and therefore before any audible, force, and/or visual indication occurs). In implementations of the tube fitting 20 with only the audible indication (as shown in FIGS. 1 A-6), the tube liner 50 may not have a set position within the main body structure 30 until the tube 10 pushes the tube liner 50 into engagement with the main body structure 30 and is inserted completely into the main body structure 30 of the tube fitting 20 to provide the audible indication. Once the audible indication occurs (as described further herein), the tube liner 50 may lock temporarily or permanently into place (in an axial position) within the main body structure 30.

The tube liner 50 comprises a first end 51 and a second end 52 that are opposite each other along the longitudinal length of the tube liner 50. The first end 51 is closer to the first axial direction XI, and the second end 52 is closer to the second axial direction X2 (relative to each other). When the tube 10 is inserted into the tube fitting 20, the second end 52 of the tube liner 50 is first inserted into the end 12 of the tube 10 (before the length of the tube liner 50).

The tube liner 50 comprises an inner wall or portion 57 that is configured to extend axially into the tube 10 (i.e., along the longitudinal direction X) when the tube 10 is at least partially inserted into the tube fitting 20. The inner portion 57 comprises an outer surface 58 and an inner surface 59 that are opposite each other. The outer surface 58 faces radially outward towards and the inner surface 59 faces radially inward away from the tube 10 (and the center area of the main body structure 30). The outer surface 58 may optionally abut the inner surface 16 of the tube 10, as shown in FIG. 2B.

As shown in FIGS. 2A-3 and 5A-5B, the tube liner 50 further comprises a first protrusion, rib, or extension 61 that extends radially outward from the outer surface 58 of the inner portion 57 of the tube liner 50. The first extension 61 may be approximately perpendicular to the outer surface 58 of the inner portion 57. The first extension 61 comprises a first surface 61*a* and a second surface 61*b* that are opposite each other. The first surface 61*a* faces toward the first end 51 of the tube liner 50, and the second surface 61*b* faces toward the second end 52 of the tube liner 50.

Figure 12A:
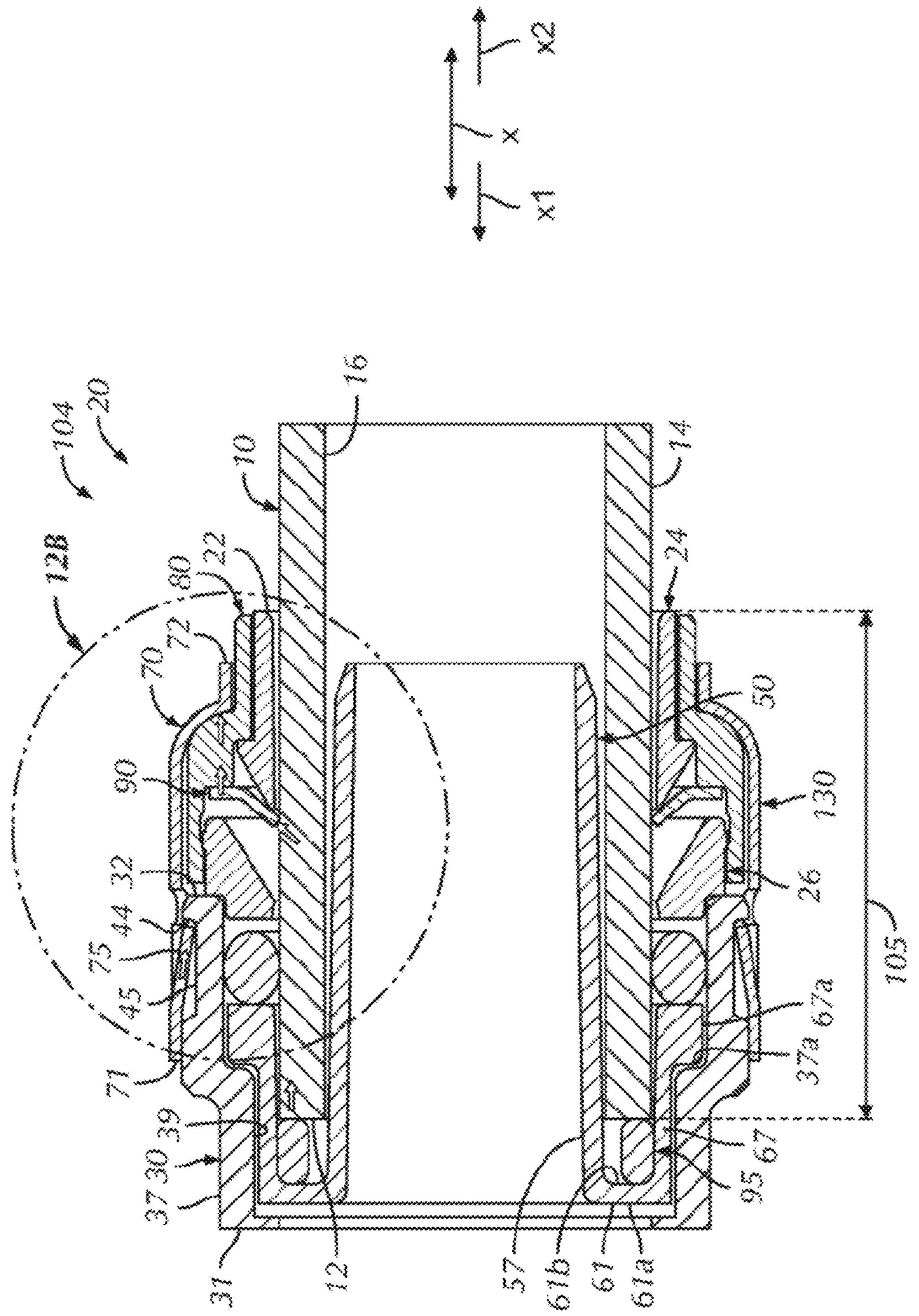
FIG. 12A is a cross-sectional view of the tube fitting of FIG. 8 with the tube in the full insertion position.

The first extension 61 is configured to abut the end 12 of the tube 10 (both in the partial insertion position 102 and the full insertion position 104), either directly (via the second surface 61*b*, as shown in FIGS. 2A-2B) or indirectly (via the spring member 95 that is positioned along the second surface 61*b*, as shown in FIG. 12A). As shown in FIGS. 2A-2B and 5A-5B, as the tube 10 moves axially in the first axial direction XI in the longitudinal direction X into the main body structure 30 during insertion, the end 12 of the tube 10 abuts and pushes against the second surface 61*b* of the first extension 61 (or abuts against and pushes the spring member 95 and therefore also pushes the second surface 61*b*). Accordingly, the tube liner 50 is configured to move axially in the first axial direction XI along a longitudinal direction into the main body structure 30 in tandem with axial motion of the tube 10. In particular, the tube liner 50 is configured to move axially further into the main body structure 30 of the tube fitting 20 in the first axial direction XI of the longitudinal direction X of the main body structure 30 into the main body structure 30 as the tube 10 is inserted into and moved axially in the first axial direction XI into the main body structure 30 of the tube fitting 20. The tube liner 50 and the tube 10 thus move together within (and relative to) the main body structure 30 in the first axial direction XI. In implementations of the tube fitting 20 with only the audible indication (as shown in FIGS. 1 A-6), the tube liner 50 may be the only component of the tube fitting 20 that moves together with the tube 10 within (and relative to) the main body structure 30 as the tube 10 moves in the first axial direction XI.

According to one implementation as shown in FIGS. 8 and 11 A-12B, the tube liner 50 comprises an outer wall or portion 67 that is configured to extend axially over the outer surface 14 of the tube 10 such that the tube 10 is positioned radially between the inner portion 57 and the outer portion 67 of the tube liner 50 when the tube 10 is at least partially inserted into the tube fitting 20. The outer portion 67 may be substantially parallel to the inner portion 57, and the first extension 61 may extend axially between the inner portion 57 and the outer portion 67, thereby defining a space configured to receive the end 12 of the tube 10.

As shown in FIG. 11 A, the outer portion 67 may comprise a circumferential ledge or lip 67*a* (that corresponds and is complementary to the transition portion 37*a*, as described further herein) along the outer surface of the outer portion 67 that has a larger outer diameter than the rest of the outer portion 67. The transition portion 37*a* of the main body 37 is configured to receive and secure the lip 67*a* of the outer portion 67 such that the transition portion 37*a* and the lip 67*a* abut each other.

Figure 16A:
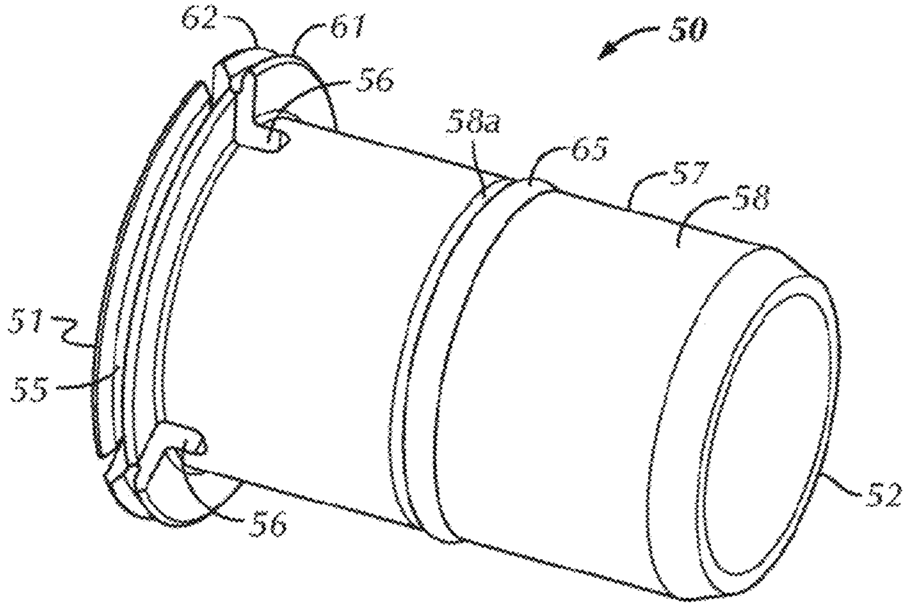
FIG. 16A is a perspective view of a tube liner according to one implementation.
Figure 16B:
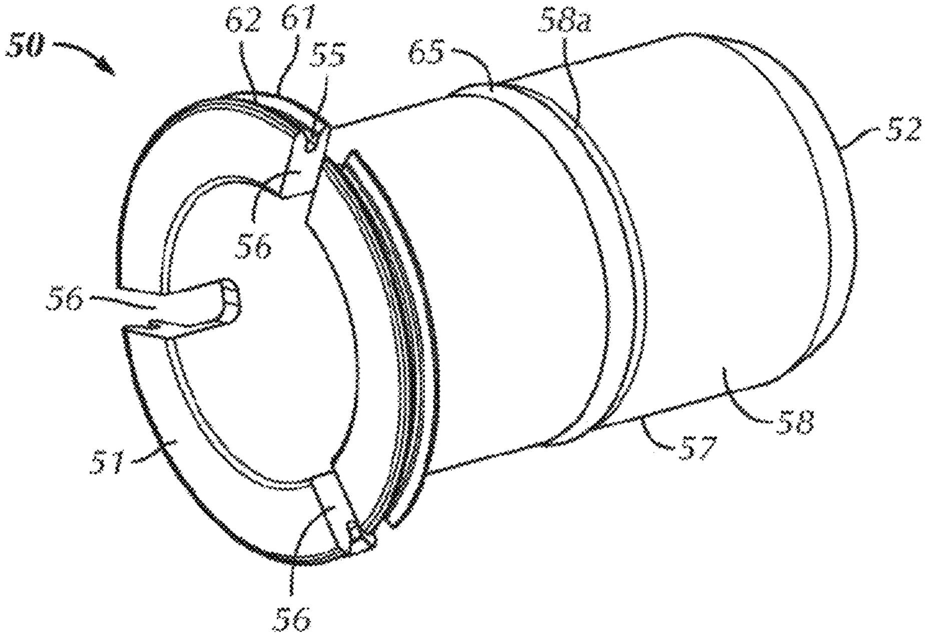
FIG. 16B is another perspective view of the tube liner of FIG. 16A.
Figure 16C:
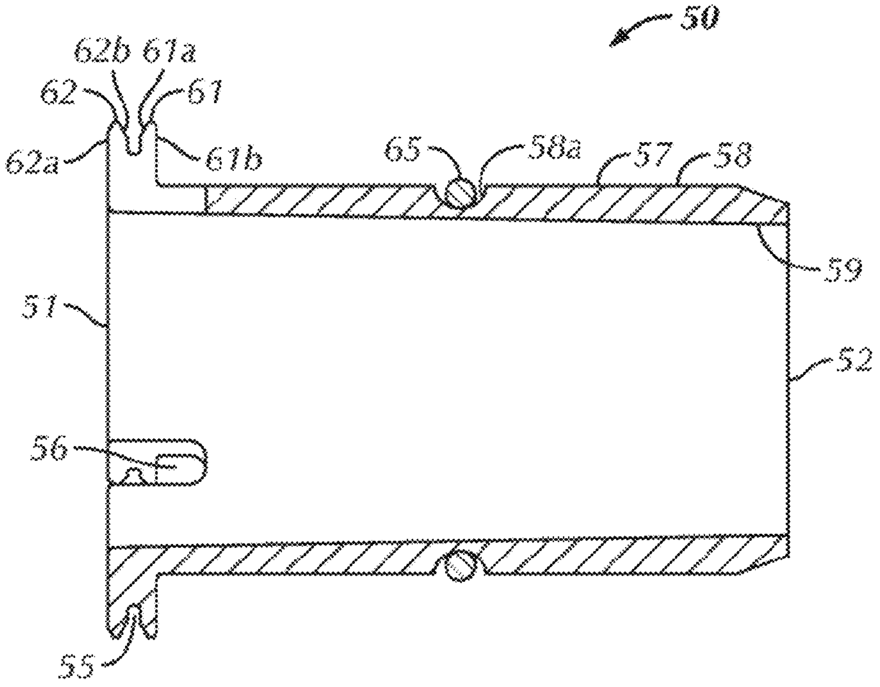
FIG. 16C is a cross-sectional view of the tube liner of FIG. 16C.

Optionally, the tube liner 50 may not include any barb features and has a substantially smooth outer surface (such as the outer surface 58 of the inner portion 57). According to one implementation as shown in FIGS. 16A-16C, the tube liner 50 comprises a seal member 65 (such as an O-ring seal) that is positioned along the outer surface 58 of the inner portion 57, thereby allowing the inner portion 57 to securely seal with the inner surface 16 of the tube 10. In particular, the seal member 65 is configured to seal with the inner surface 16 of the tube 10 to prevent any leakage. In particular, the seal member 65 provides a seal between the outer surface 58 of the inner portion 57 of the tube liner 50 and the inner surface 16 of the tube 10. Accordingly, the outer surface 58 of the inner portion 57 of the tube liner 50 comprises or defines a groove 58*a* that is configured to secure the seal member 65 around the outside of the inner portion 57. Accordingly, the groove 58*a* is shaped and sized to receive and secure the seal member 65. The groove 58*a* and the seal member 65 extend around the entire outer perimeter of the inner portion 57. The seal member 65 is wider than the depth of the groove 58*a* such that, when the seal member 65 is positioned within the groove 58*a*, the seal member 65 extends above the outer surface 58 of the inner portion 57 (as shown in FIG. 16C) in order to seal with the tube 10. The seal member 65 (and the corresponding and complementary groove 58*a*) may be included with any of the various implementations of the tube liner 50 (and therefore any of the various implementations of the tube fitting 20), such as the tube fittings 20 with the audible indication, force indication, and/or a visual indication.

The retainer 70 is positioned around the outer surface 48 of the second end 32 of the main body structure 30, as shown in FIGS. 2A, 11 A, and 18A. Although the retainer 70 is included within various implementations of the tube fitting 20, the retainer 70 is primarily described with respect to FIGS. 7A-8 and 11 A-12B. In particular, it is noted that, unless otherwise specified herein, the various components, features, and aspects of the retainer 70 of FIGS. 7A-8 and 11 A-12B (that is a separate component from the cartridge ring 80) can be included within the retainer 70 of the various implementations shown in FIGS. 17A-27B (in which the retainer structure 170 has an integral retainer 70 and cartridge ring 80).

As shown in FIG. 1 IB, the retainer 70 comprises an outer surface 78 and an inner surface 79 that are opposite each other. The outer surface 78 faces radially outward away from and the inner surface 79 faces radially inward towards the tube 10 (and the center area of the tube fitting 20). The outer surface 78 may define one of the outermost surfaces of the tube fitting 20 (i.e., the surface that the user may interact with).

The retainer 70 comprises a first end 71 and a second end 72 that are opposite each other along the longitudinal length of the retainer 70. The first end 71 is closer to the first axial direction XI, and the second end 72 is closer to the second axial direction X2 (relative to each other). When the tube 10 is inserted into the tube fitting 20, the tube 10 first moves through the second end 72 of the retainer 70 (before proceeding further within the retainer 70 toward the first end 71). As shown in FIGS. 11 A-1 IB, the retainer 70 overlaps at least a portion of the main body structure 30 (along the second end 32). When the retainer 70 and the cartridge ring 80 are separate components, the retainer 70 also overlaps the cartridge ring 80 (along the first end 81) and attaches the main body structure 30 and the cartridge ring 80 together (along the second end 32 and the first end 81, respectively).

As shown in FIGS. 1 IB and 12B, when the retainer 70 and the cartridge ring 80 are separate components, the inner surface 79 of the retainer 70 comprises an inner ledge 73 that faces toward the first end 71 of the retainer 70. The inner ledge 73 is configured to abut against the outer ledge 84 of the cartridge ring 80, as described further herein.

As shown in FIGS. 2A, 11 A, and 18A, the cartridge ring 80 is positioned at and extends axially away from the second end 32 of the main body structure 30. Although the cartridge ring 80 is included within various implementations of the tube fitting 20, the cartridge ring 80 is primarily described with respect to FIGS. 7A-8 and 11 A-12B. In particular, it is noted that, unless otherwise specified herein, the various components, features, and aspects of the cartridge ring 80 of FIGS. 7A-8 and 11 A-12B (that is a separate component from the retainer 70) can be included within the cartridge ring 80 of the various implementations shown in FIGS. 17A-27B (in which the retainer structure 170 has an integral retainer 70 and cartridge ring 80). In implementations where the retainer 70 and the cartridge ring 80 are separate components (as shown in the various implementations of FIGS. 1 A-16C), the cartridge ring 80 is positioned at least partially within the retainer 70 (at the second end 72 of the retainer 70), along the inner surface 79 of the retainer 70. If the retainer 70 and the cartridge ring 80 are integral components (as shown in the various implementations of FIGS. 17A-27B), the retainer 70 forms the radially outward portion of the retainer structure 170, and the cartridge ring 80 forms the radially inward portion of the retainer structure 170.

Figure 12B:
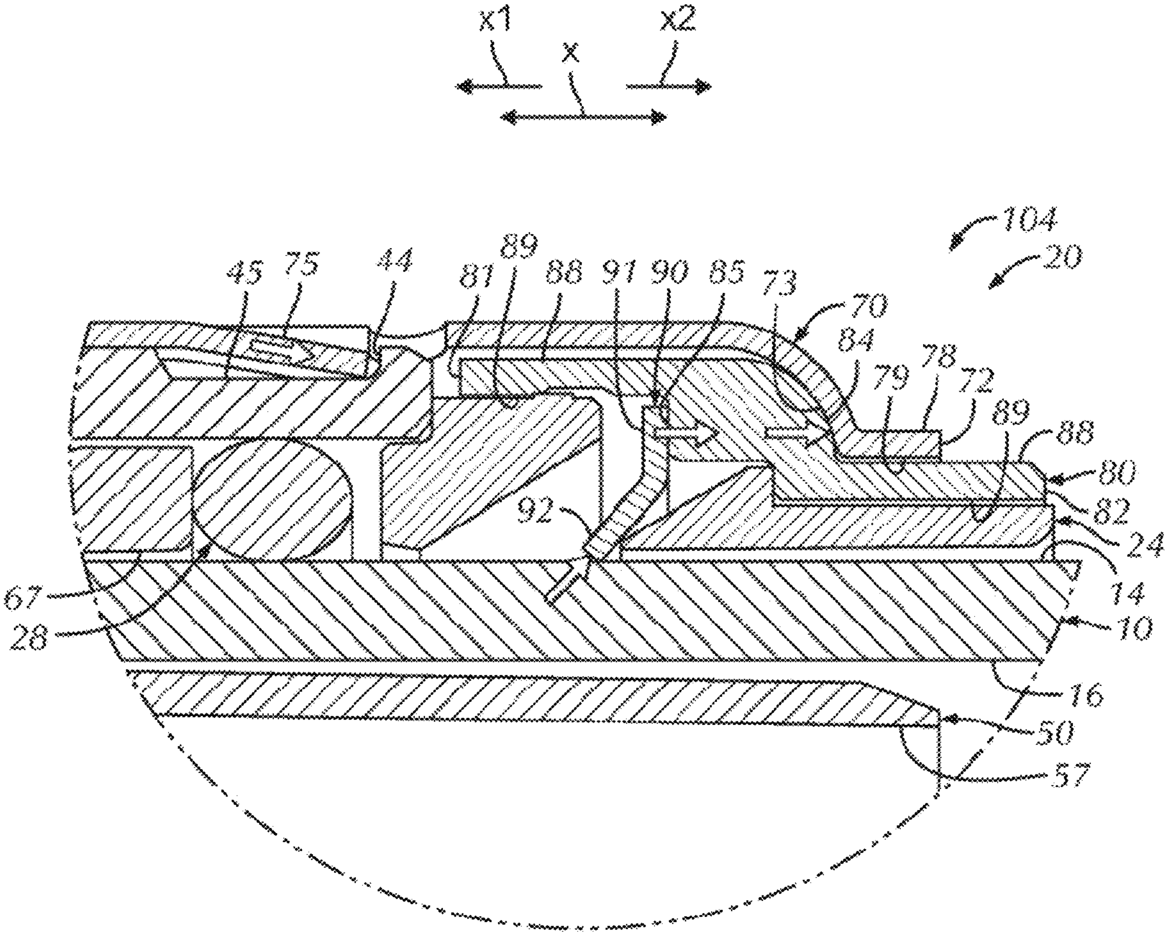
FIG. 12B is an enlarged portion of the tube fitting of FIG. 12A.

As shown in FIG. 1 IB, the cartridge ring 80 comprises an outer surface 88 and an inner surface 89 that are opposite each other. The outer surface 88 faces radially outward away from and the inner surface 89 faces radially inward towards the tube 10 (and the center area of the tube fitting 20). As shown in FIG. 12B, when the retainer 70 and the cartridge ring 80 are separate components, the outer surface 88 of the cartridge ring 80 (in particular along the outer ledge 84) and the inner surface 79 of the retainer 70 (in particular along the inner ledge 73 and at the second end 72 of the retainer 70) abut each other and may have complementary, interlocking geometry (e.g., with respect to one or more of a shape, a size, and a curvature) in order to fit together and to allow the retainer 70 to attach the cartridge ring 80 to the main body structure 30. In implementations in which the retainer 70 and the cartridge ring 80 are integral components, the outer surface 88 of the cartridge ring 80 and the inner surface 79 of the retainer 70 are integrally formed and create a middle portion of the retainer structure 170 that is integral.

As shown in FIGS. 8 and 1 IB, the cartridge ring 80 comprises a first end 81 and a second end 82 that are opposite each other along the longitudinal length of the cartridge ring 80. The first end 81 is closer to the first axial direction XI, and the second end 82 is closer to the second axial direction X2 (relative to each other). When the tube 10 is inserted into the tube fitting 20, the tube 10 first moves through the second end 82 of the cartridge ring 80 (before proceeding further within the cartridge ring 80 toward the first end 81).

As shown in FIGS. 1 IB and 12B, the inner surface 89 of the cartridge ring 80 comprises an inner ledge 85 that faces toward the first end 81 of the cartridge ring 80, and the outer surface 88 of the cartridge ring 80 comprises an outer ledge 84 that faces toward the second end 82 of the cartridge ring 80. The inner ledge 85 is configured to abut against the ring 91 of the grab ring 90, and the outer ledge 84 is configured to abut against the inner ledge 73 of the retainer 70, as described further herein.

The grab ring 90 is configured to secure the tube 10 within the tube fitting 20 and prevent the tube 10 from backing out of the tube fitting 20 and moving in the second axial direction X2, as shown in FIG. 12B. Although the grab ring 90 is included within various implementations of the tube fitting 20, the grab ring 90 is primarily described with respect to FIGS. 8 and 11 A-12B.

As shown in FIG. 8, the grab ring 90 comprises a ring 91 and a plurality of axially-inwardly facing teeth 92 that extend radially inwardly from the ring 91. The teeth 92 are configured to grip the outer surface 14 of the tube 10, in particular when the tube 10 is in the full insertion position 104 (as shown in FIG. 12B). The teeth 92 may be angled from the ring 91 toward the first axial direction XI to firmly grip the outer surface 14 of the tube 10 when the tube 10 moves in the second axial direction X2 to prevent the tube 10 from moving substantially in the second axial direction X2 when the grab ring 90 is grabbing the tube 10 (while allowing the tube 10 to move in the first axial direction XI during insertion). As shown in FIGS. 11 A-12B, the grab ring 90 is positioned within the cartridge ring 80, radially outward from the inner portion 57 of the tube liner 50. To allow the tube 10 to be removed from the tube fitting 20, the grab ring 90 can be opened by pushing the demount ring 24 axially toward the teeth 92 in the first axial direction XI (with, for example, a tool), which moves the teeth 92 radially outwardly from the tube 10, thereby opening the grab ring 90 and releasing the grab ring 90 from the outer surface 14 of the tube 10. The tube 10 can then be removed and backed out from the tube fitting 20 in the second axial direction X2.

According to some implementations (as shown in FIGS. 1 A-3, FIGS. 4A-6, and FIGS. 13A-15), some implementations of the tube fitting 20 may provide an audible indication that audibly indicates once the tube 10 has been fully inserted into the main body structure 30 of the tube fitting 20. Although the audible indication is described with reference to FIGS. 1 A-6, other implementations of the tube fitting 20 may include the audible indication (and its various components).

In implementations with an audible indication, the main body structure 30 comprises an audible indication portion 35 (e.g., a protrusion or groove) that interacts with a corresponding and complementary audible indication portion 55 of the tube liner 50 (as described further herein) to create the audible indication, as shown in FIGS. 2A-2B and 5A-5B. The audible indication portion 35 is positioned along and formed integrally with the inner surface 39 of the main body structure 30 (and may be a part of the main body 37 or the insert 38, depending on the configuration of the main body structure 30). For example, according to one implementation as shown in FIGS. 2A-2B, the audible indication portion 35 is positioned along and formed integrally with the inner surface of the main body 37 as a single unitary component that cannot be separated without destruction. According to another implementation as shown in FIGS. 5A-5B, the audible indication portion 35 is positioned along and formed integrally with the inner surface of the insert 38 as a single unitary component that cannot be separated without destruction. As shown in FIG. 6, the audible indication portion 35 may comprise multiple parts that are positioned about the circumference of the inner surface 39 (along, for example only, one axial end of the insert 38).

In implementations with an audible indication, the tube liner 50 further comprises a second protrusion, rib, or extension 62 that extends radially outward from the outer surface 58 of the inner portion 57 of the tube liner 50 and forms the audible indication portion 55 of the tube liner 50 (as shown, for example, in FIGS. 2A-3 and 5A-5B). The second extension 62 may be approximately perpendicular to the outer surface 58 of the inner portion 57 and substantially parallel to the first extension 61. The second extension 62 is positioned closer to (and optionally at) the first end 51 of the tube liner 50 than the first extension 61 (although both the first extension and the second extension 62 are positioned close to or near the first end 51 of the tube liner 50).

Figure 3:
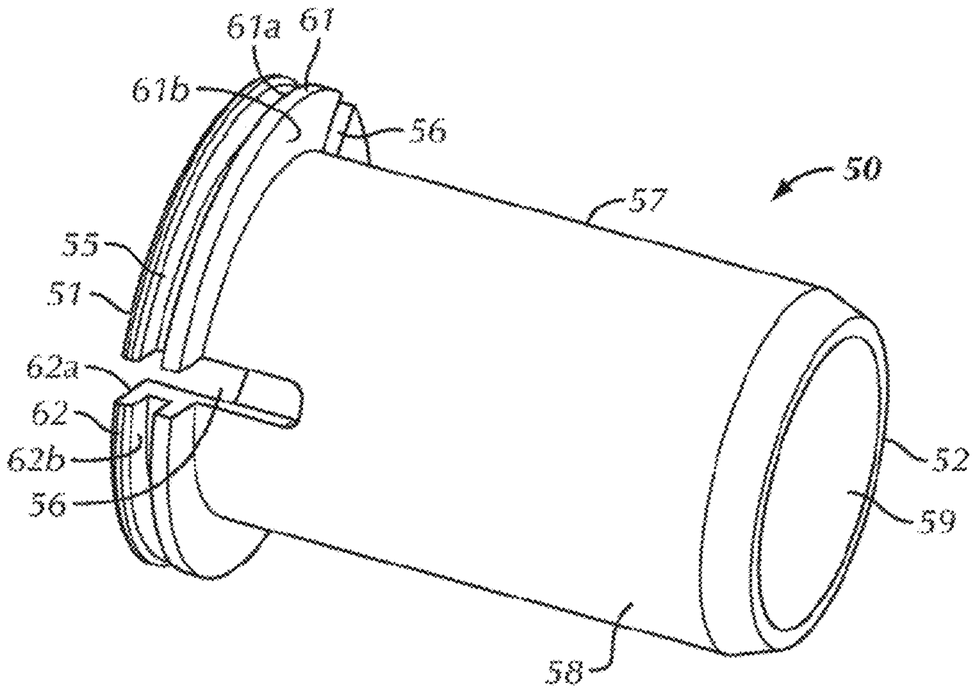
FIG. 3 is a perspective view of a tube liner of the tube fitting of FIG. 1 A.

As shown in FIG. 3, the first and second extensions 61, 62 may be axially spaced apart from each other along at least their free ends (and optionally along their entire height from the outer surface 58) in order to form a groove that is between the first and second extensions 61, 62 and forms the audible indication portion 55 of the tube liner 50. The second extension 62 comprises a first surface 62*a* and a second surface 62*b* that are opposite each other. The first surface 62*a* faces toward the first end 51 of the tube liner 50, and the second surface 62*b* faces toward the second end 52 of the tube liner 50. Accordingly, the audible indication portion 55 (e.g., the groove) is formed between the first surface 61*a* of the first extension 61 and the second surface 62*b* of the second extension 62. The groove is configured to receive the audible indication portion 35 (e.g., the protrusion) of the main body structure 30.

Furthermore, according to various implementations (as shown FIGS. 2A-3 and 5A-5B, for example), the tube liner 50 (in particular the inner portion 57) may comprise at least one slot 56 extending along a portion of the longitudinal length of the tube liner 50 (in particular along the length of the inner portion 57) from the first end 51 of the tube liner 50 toward a middle portion of the tube liner 50. The slot 56 may extend completely through the wall of the inner portion 57 (i.e., between the outer surface 58 and the inner surface 59). The tube liner 50 may optionally include a plurality of slots 56 spaced apart from each other about the perimeter of the inner portion 57 along the first end 51. The slot 56 allows the first end 51 of the tube liner 50 to flex radially inwardly as the respective audible indication portions 35, 55 (of the main body structure 30 and the tube liner 50) move partially past or into each other and connect with each other (to make the audible indication, as described further herein). For example, the slot 56 allows the first end 51 to flex radially inwardly as a protrusion (that is one of the audible indication portions 35, 55) moves into the groove (that is the other of the audible indication portions 35, 55). The slot 56 may optionally also extend through the first and second extensions 61, 62 (in addition to the inner portion 57).

With the audible indication (as shown in FIGS. 1A-6 and 13-15), when the tube 10 is fully inserted into the tube fitting 20 into the full insertion position 104, the main body structure 30 and the tube liner 50 cooperate together to provide the audible indication to indicate that the tube 10 has been fully inserted into the tube fitting 20. The audible indication may be a variety of different types of noises (e.g., a click or snap) that can be easily heard by the user outside of the tube fitting 20. In some implementations, the audible indication may be a sound of approximately 20 to approximately 40 dBa. When the tube 10 is only partially inserted into the tube fitting 20 and before full insertion (i.e., when the tube 10 is in the partial insertion position 102, as shown in FIGS. 2A and 5A), the audible indication is not provided.

The audible indication portions 35, 55 are configured to interact (e.g., interlock) with each other when the tube 10 is fully inserted into the tube fitting 20 to provide the audible indication. In particular, one of the audible indication portions 35, 55 is a protrusion (e.g., extension, abutment, or lip) and the other of the audible indication portions 35, 55 is a groove (e.g., a channel, indication, or recess) that is configured to interact with (e.g., receive) the protrusion once the tube 10 has been fully inserted into the full insertion position 104, as shown in FIGS. 2B and 5B. According to one implementation (as shown, for example, in FIGS. 2A-2B and 5A-5B), the audible indication portion 35 of the main body structure 30 is a protrusion, and the audible indication portion 55 of the tube liner 50 is a groove. However, according to various other implementations, the audible indication portion 35 may be a groove, and the audible indication portion 55 may be a protrusion. The audible indication is created or generated when the groove receives the protrusion. The audible indication thereby indicates to the user that the tube 10 has been fully inserted into the tube fitting 20.

The audible indication portions 35, 55 are positioned along the respective lengths of the main body structure 30 and the tube liner 50 such that, when the audible indication portions 35, 55 interact with each other to create the audible indication, the tube 10 is at the predetermined depth 105 within the tube fitting 20.

As shown in FIGS. 2A-2B, the protrusion (that is the audible indication portion 35) may be surrounded axially on one or both sides by a groove or undercut feature 34. For example, the undercut feature 34 may be positioned along a side of the protrusion that is closer to the first end 31 of the main body structure 30. In the full insertion position 104 (as shown in FIG. 2B), the undercut feature 34 is configured to receive and secure the second extension 62. Furthermore, the protrusion may be angled toward in the first axial direction XI, toward the first end 31 of the main body structure 30. For example, the protrusion may have a first surface (that is closer to the first end 31 of the main body structure 30) and a second surface (that is closer to the second end 32 of the main body structure 30). The second surface of the protrusion may be angled toward the first end 31 of the main body structure 30, and the first surface of the protrusion may be at approximately 90° relative to the inner surface 39 of the main body structure 30. Accordingly, the second extension 62 (and therefore the tube liner 50) can easily move past the protrusion in the first axial direction XI, but is firmly secured in the full insertion position 104 and prevented from moving in the second axial direction X2 back out of the main body structure 30. Furthermore, as the second extension 62 moves past the protrusion and into the undercut feature 34 in the first axial direction XI, the audible indication is accentuated.

During use (as shown in FIGS. 2A-2B and 5A-5B), as the tube 10 is moved into the tube fitting 20 in the first axial direction XI, the tube 10 is inserted into an area radially between the main body structure 30 and the inner portion 57 of the tube liner 50 (in particular within the main body structure 30 and around the inner portion 57 of the tube liner 50). The end 12 of the tube 10 abuts and pushes against the second surface 61*b* of the first extension 61 of the tube liner 50 (or abuts and pushes against the spring member 95 that is positioned along the second surface 61*b* according to some implementations), thereby concurrently pushing and moving the tube liner 50 in the first axially direction XI within and relative to the main body structure 30. Once the tube 10 is moved sufficiently into the main body structure 30 at the predetermined depth 105 to be fully inserted into the tube fitting 20 (i.e., such that the end 12 of the tube 10 is pressed against the second surface 61*b* of the first extension 61 or against the spring member 95), the audible indication portion 55 of the tube liner 50 engages with the audible indication portion 35 of the main body structure 30, thereby making the audible indication to indicate full insertion of the tube 10 into the tube fitting 20. To make this audible indication, the protrusion of one of the audible indication portions 35, 55 moves into the groove of the other of the audible indication portions 35, 55. For example, the second extension 62 of the tube liner 50 move along the second surface of the protrusion (that is the audible indication portion 35) of the main body structure 30, which partially collapses the first end 51 of the tube liner 50 (due to the slot(s) 56). Once the second extension 62 moves past the top of the protrusion (e.g., the audible indication portion 35), the first end 51 of the tube liner 50 expands back radially outward to its original shape. Further, the protrusion snaps over the edges of the groove (e.g., over the second extension 62) and into the groove contributing to the audible indication portion 55, and the second extension 62 snaps into the undercut feature 34, making the audible indication to indicate complete insertion of the tube 10 into the tube liner 50.

To allow the tube liner 50 to be moved out of engagement with the audible indication portion 35 and removed from the main body structure 30 (i.e., to reset the tube liner 50 to its original position where the tube liner 50 may freely movable within the main body structure 30, the second extension 62 (that forms a portion of the audible indication portion 55) may have a chamfer surface. Accordingly, after the audible indication has occurred (and the audible indication portions 35, 55 are engaged with each other), the user may manually reset and free the tube liner 50 from the main body structure 30 by using a tool (such as needle-nose pliers) to disengage the audible indication portion 55 from the audible indication portion 35 by moving the second extension 62 over the protrusion of the audible indication portion 35.

To insert the tube 10 into the tube fitting 20 with only the audible indication (as shown in FIGS. 1 A-6), the insertion of the tube 10 and the audible indication may be performed by a single action between the tube liner 50 and the main body structure 30, without any additional components.

According to some implementations (as shown in FIGS. 7A-15), some implementations of the tube fitting 20 may provide a force indication (which may also be referred to as a tactile indication) that indicates, with a resistive force, that the tube 10 has been fully inserted into the main body structure 30 of the tube fitting 20. Although the force indication is described primarily with reference to FIGS. 7A-12B, other implementations of the tube fitting 20 may include the force indication (and its various components).

The force indication comprises the retainer 70 providing a resisting force that prevents rotational movement of the retainer 70 relative to the main body structure 30 when a user attempts to rotate the retainer 70 relative to the main body structure 30 (and the tube 10 is in the full insertion position 104). Accordingly, the user can push the tube 10 into the tube fitting 20 until the retainer 70 stops freely rotating or is locked from rotating which indicates that the tube 10 has been completely inserted into the tube fitting 20 (in particular into the main body structure 30).

Figure 7A:
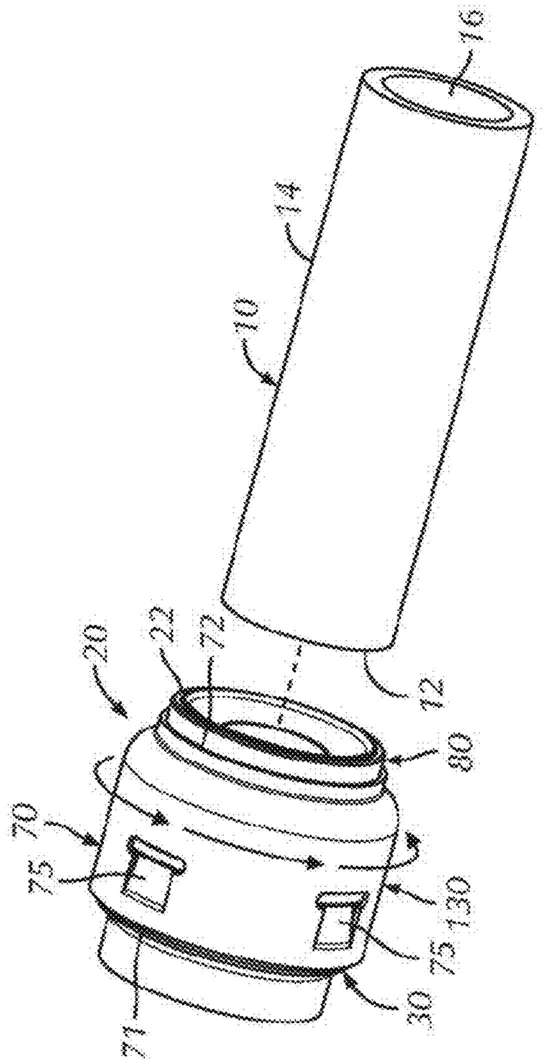
FIG. 7A is a perspective view of a tube fitting according to another implementation and a tube.
Figure 7B:
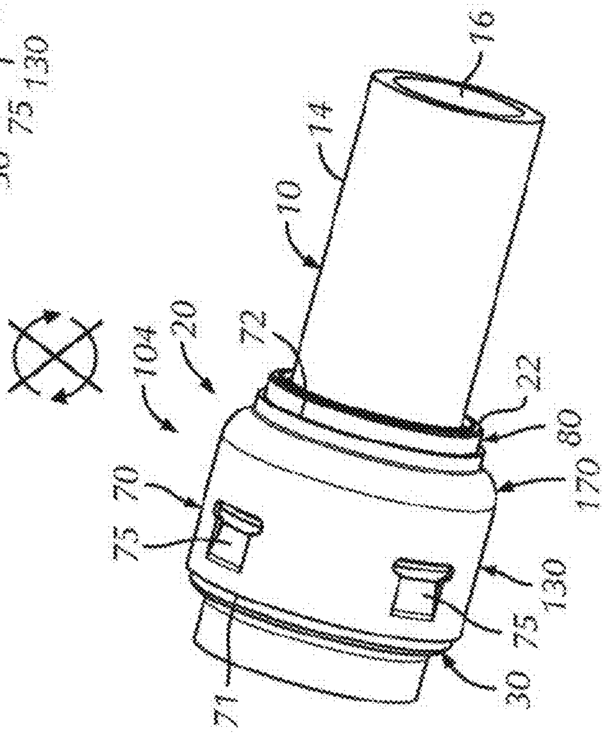
FIG. 7B is a perspective view of the tube fitting of FIG. 7A attached to the tube in the full insertion position.

According to various implementations which include a force indication, the retainer 70 is freely rotatable about the second end 32 of the main body structure 30 when the tube 10 is not inserted or only partially inserted (i.e., in the partial insertion position 102) into the main body structure 30 of the tube fitting 20, as shown in FIG. 7A. However, when the tube 10 is fully inserted into the main body structure 30 of the tube fitting 20 (i.e., in the full insertion position 104), the main body structure 30 and the retainer 70 corporate together to prevent the retainer 70 from freely rotating about the second end 32 of the main body structure 30, as shown in FIG. 7B (in which the retainer 70 tightened and not rotatable). Accordingly, as described further herein, the main body structure 30 and the retainer 70 together provide a force indication to indicate that the tube has been fully inserted into the main body structure 30 of the tube fitting 20.

In implementations with a force indication, the retainer 70 comprises at least one tab 75 that is configured to be received within a channel 45 of the main body structure 30 (as shown in FIGS. 8 and 11 A-12B). Optionally, the retainer 70 may comprise a plurality of tabs 75 that are spaced out along the perimeter of retainer 70. The tab(s) 75 is (are) movable relative to the rest of the retainer 70 and positioned closer toward the first end 71 of the retainer 70 in order to be received within and interlock with the channel 45 of the main body structure 30 (as described further herein).

As shown in FIGS. 8 and 1 IB, the tab 75 comprises a base portion 74 (which is attached to the rest of the retainer 70) and a free end 76 (which is detached from the rest of the retainer 70 (except through the base portion 74) and is freely movable relative to the rest of the retainer 70). The body of the tab 75 extends between the base portion 74 and the free end 76 along the longitudinal direction X. The base portion 74 is closer to the first end 71 of the retainer 70, and the free end 76 is closer to the second end 72 of the retainer 70 (compared to each other). Accordingly, the tab 75 can move and rotate about the base portion 74 and along an axis substantially perpendicular to the longitudinal direction X. The tab 75 extends axially inwardly relative to and from the rest of the retainer 70. In particular, the free end 76 of the tab 75 may be positioned radially inward from the rest of the inner surface 79 of the retainer 70 in order to grab ahold of the end wall 44 of the channel 45 of the main body structure 30. This angling and configuration of the tab 75 allows the tabs 75 of the retainer 70 to be moved over the second end 32 of the main body structure 30 in the first axial direction XI to attach to the main body structure 30, but not be moved backward back over the second end 32 of the main body structure 30 in the second axial direction X2, thereby keeping the retainer 70 and the main body structure 30 attached to each other.

Figure 9:
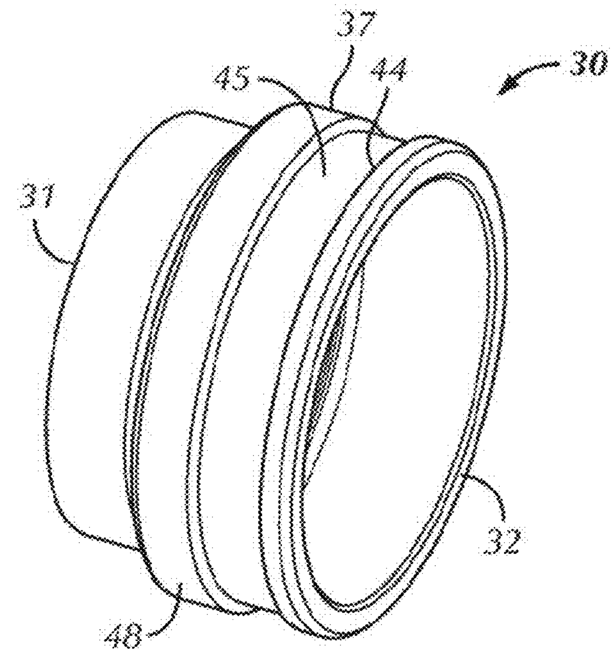
FIG. 9 is a perspective view of a main body structure of the tube fitting of FIG. 8.

As shown in FIGS. 9-10B, the outer surface 48 of the main body structure 30 comprises a channel 45 (e.g., a groove, indentation, or recess) that extends radially around the main body structure 30. The channel 45 is configured to receive at least one tab 75 of the retainer 70. As described further herein, the tab 75 is moved further into the channel 45 when the tube 10 is in the full insertion position 104 (i.e., when the retainer 70 is moved in the second axial direction X2 relative to the main body structure 30 of the tube fitting 20). The channel 45 comprises an end wall 44 (e.g., a front edge or shoulder) that extends substantially perpendicular to the longitudinal direction X and defines an axial end of the channel 45 (that is closer to the second end 32 of the main body structure 30 than the rest of the channel 45). The end wall 44 provides an axial catch for the free end 76 of the tab 75 to prevent the retainer 70 from being removed and to prevent the retainer 70 from being rotated when the tube 10 is in the full insertion position 104 (to provide the force indication, as described further herein).

According to one implementation as shown in FIGS. 8-9, the end wall 44 may be a flat, continuous wall without any divots or notches. According to another implementation as shown in FIGS. 10A-10B, the end wall 44 may comprise at least one lock divot, indentation, or notch 46 along its length that is indented axially along the circumferential length of the end wall 44. Each of the lock notches 46 have two side edges 47 along opposite ends (about the circumference of the main body structure 30). The side edges 47 of each of the notches 46 are configured to rotationally lock the retainer 70 in place in the full insertion position 104 (as described further herein) and provides a force indication (that locks the retainer 70 against rotation). Optionally, the end wall 44 may define multiple notches 46 (such as four notches 46) along its length and that are spaced apart from each other about the circumferential length of the end wall 44. The size, shape, and number of notches 46 and tabs 75 may optionally correspond and be complementary to each other. Before the force indication, the retainer 70 may be rotated relative to the main body structure 30 to align the tabs 75 with the notches 46 and until the tabs 75 slide into the notches 46 for the force indication. When the tabs 75 are positioned within the notches 46, the retainer 70 is rotationally locked relative to the main body structure 30 (thereby providing the force indication).

As shown in FIGS. 11 A and 12A, the tube fitting 20 also comprises a spring member 95 that is positioned radially between the inner portion 57 of the tube fitting and the inner surface 39 of the main body structure 30 (and optionally between the inner portion 57 and the outer portion 67 of the tube liner 50 if the tube liner 50 includes the outer portion 67). A first side of the spring member 95 is positioned along the second surface 61*b* of the first extension 61 (with the second side of the spring member 95 configured to contact the end 12 of the tube 10). In the full insertion position 104 (as shown in FIG. 12 A), the spring member 95 is positioned axially between (and directly contacts or abuts) the second surface 61*b* of the first extension 61 of the tube liner 50 and the end 12 of the tube 10. The spring member 95 may be a variety of different devices or materials that provides a spring-back force, such as a flat spring or seal. According to one implementation, the spring member 95 is constructed out of flexible material, such as rubber (e.g., an O-ring seal member).

As shown in FIGS. 11 A-12B, when the tube 10 is inserted into the tube fitting 20 (with the force indication), the tube 10 is moved in the first axial direction XI into the entrance end 22 of the tube fitting 20, and the end 12 of the tube 10 is inserted over the inner portion 57 of the tube liner 50. Once the tube 10 is fully inserted into the tube fitting 20, the end 12 of the tube 10 is presses against the second side of the spring member 95, which presses the spring member 95 against the second surface 61*b* of the first extension 61. This force pushes the tube liner 50 in the first axial direction XI. In the implementation shown in FIG. 12A, this force on the tube liner 50 presses the lip 67*a* of the outer portion 67 against the transition portion 37*a* of the main body structure 30. In the implementation shown in FIG. 13C, this force on the tube liner 50 moves the audible indication portion 55 of the tube liner 50 to interact with the audible indication portion 35 of the main body structure 30 (thereby creating the audible indication, as described further herein). If the main body structure 30 includes the insert 38, the tube liner 50 also presses the insert 38 in the first axial direction XI, thereby pressing the lip 38*a* of the insert 38 against the transition portion 37*a* of the main body 37.

Figure 13A:
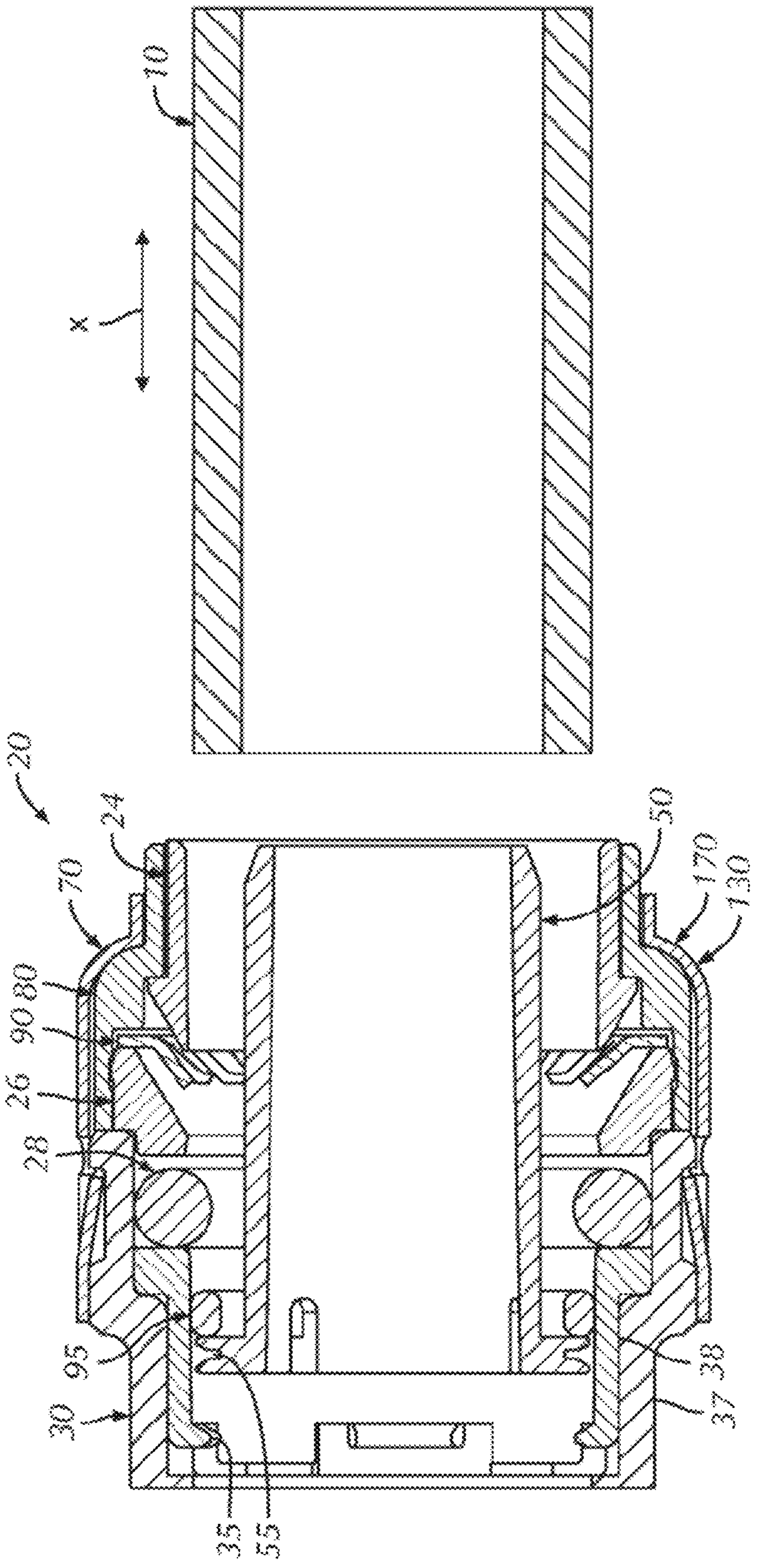
FIG. 13A is a cross-sectional view of a tube fitting according to another implementation with the tube unattached to the tube fitting.
Figure 13B:
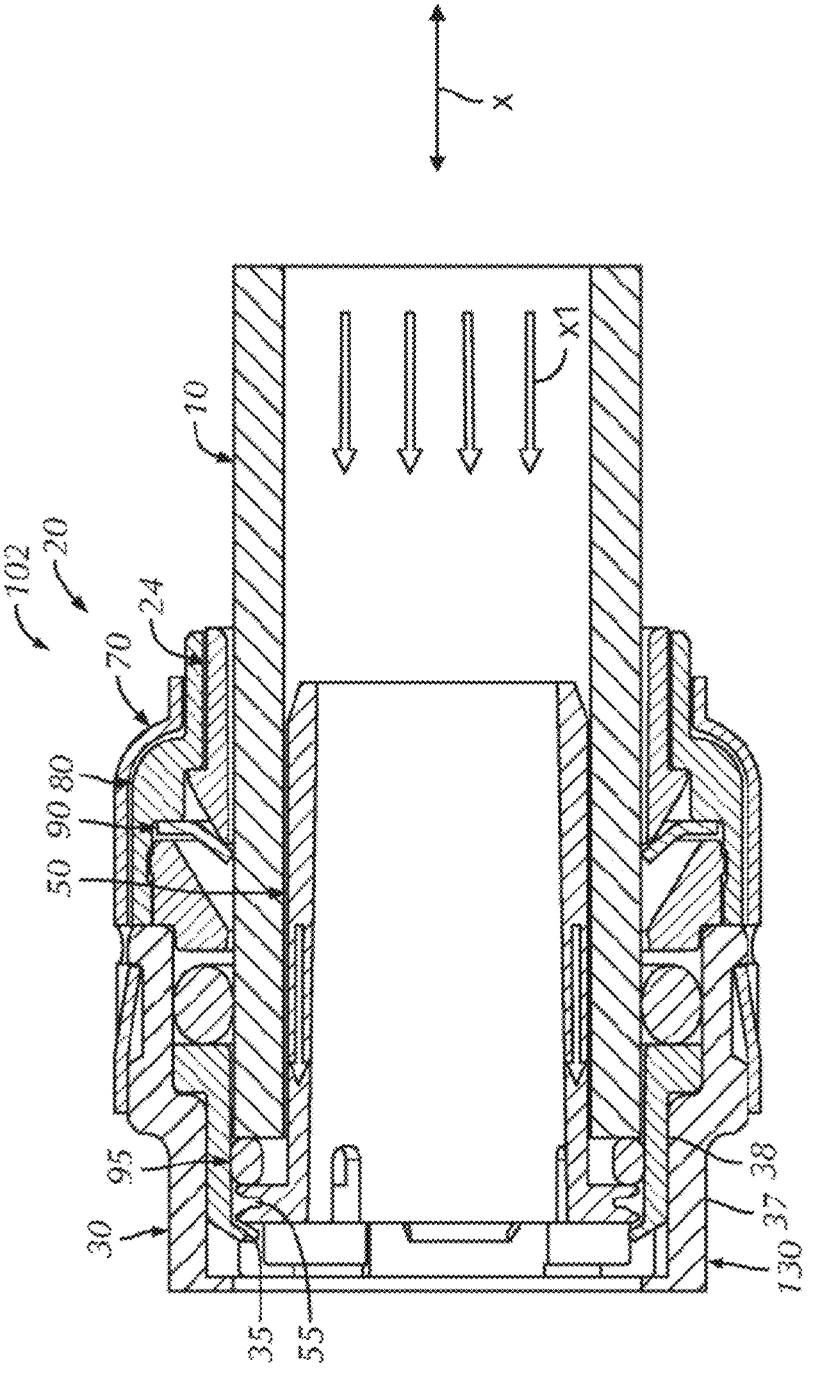
FIG. 13B is a cross-sectional view of the tube fitting of FIG. 13 A with the tube in the partial insertion position.
Figure 13C:
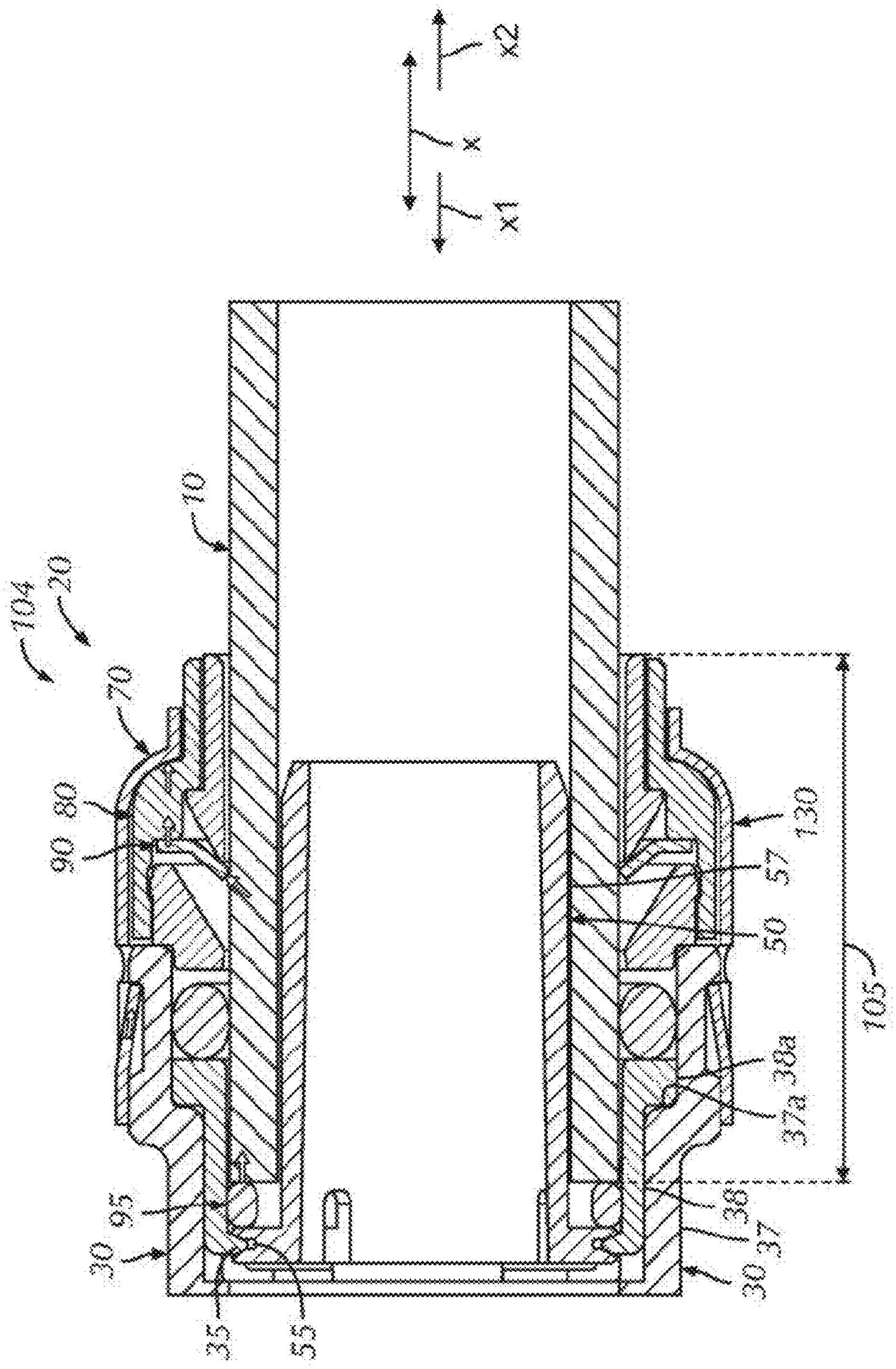
FIG. 13C is a cross-sectional view of the tube fitting of FIG. 13A with the tube in the full insertion position.

As shown in FIGS. 12A and 13C, due to the spring-like qualities of the spring member 95 and the second surface 61*b* of the first extension 61, when the tube 10 is fully inserted into the tube fitting 20 in the first axial direction XI, the spring member 95 provides a reactive and spring-back force against the end 12 of the tube 10 in the second axial direction X2 to provide the force indication by closing various assembly gaps between the mating components of the tube fitting 20 to tighten and pull the retainer 70 against the end wall 44 of the channel 45 of the main body structure 30. This action creates a frictional force between the tabs 75 of the retainer 70 and the end wall 44 of the channel 45 of the main body structure 30 to prevent the retainer 70 from freely rotating relative to the main body structure 30 (such that the main body structure 30 and the retainer 70 provide the force indication that the tube 10 is fully inserted into the tube fitting 20).

In particular, this reactive force pushes the tube 10 backward in the second axial direction X2, thereby engaging the teeth 92 of the grab ring 90 with the outer surface 14 of the tube 10 (as shown in FIG. 12B). As the teeth 92 of the grab ring 90 engage with the outer surface 14 of the tube 10 (and as the tube 10 is moved in the second axial direction X2 due to the spring member 95), the grab ring 90 is moved in the second axial direction X2 with the tube 10, which presses the ring 91 of the grab ring 90 against the inner ledge 85 of the cartridge ring 80 and moves the cartridge ring 80 (and thereby the retainer 70) in the second axial direction X2.

As the cartridge ring 80 moves in the second axial direction X2, the outer ledge 84 of the cartridge ring 80 contacts and presses against the inner ledge 73 of the retainer 70, which moves the retainer 70 in the second axial direction X2. As the retainer 70 moves in the second axial direction X2, the tabs 75 (which are moved with the rest of the retainer 70 in the second axial direction X2) are pulled further into the channel 45 of the main body structure 30 in the second axial direction X2 toward the end wall 44 of the channel 45. As the tabs 75 are moved in the second axial direction X2, the free ends 76 of the tabs 75 are firmly pressed against and abut the end wall 44 of the channel 45, thereby closing one or more gaps that may be present in the assembly.

The axial force or pressure of the free ends 76 of the tabs 75 of the retainer 70 being pressed against the end wall 44 of the channel 45 of the main body structure 30 creates a frictional force between the tabs 75 and the end wall 44. This frictional force of the tab 75 being pulled toward and onto the end wall 44 of the channel 45 in the second axial direction X2 prevents the retainer 70 from rotating relative to the main body structure 30, thereby providing the force indication to the user that indicates that the tube 10 is fully inserted into the main body structure 30 of the tube fitting 20 in the full insertion position 104 (in particular when the user tries to rotate the retainer 70 relative to the main body structure 30, e.g., by manual rotation).

If the end wall 44 of the channel 45 includes notches 46 (as shown in FIGS. 10A-10B), when the tabs 75 are pulled toward the end wall 44, the retainer 70 may be rotated slightly to align the tabs 75 with the notches 46 such that the free ends 76 of the tabs 75 are inserted into, received within, and engage with the notches 46. Accordingly, the side edges 47 of the notches 46 engage with the side edges of the tabs 75 (along the free ends 76) when the tube 10 is completely inserted into the tube fitting 20, which further constrains and prevents the retainer 70 from radially rotating relative to the main body structure 30 and rotationally locks the retainer 70 in place relative to the main body structure 30 to provide the force indication that the tube 10 is fully inserted into the main body structure 30 of the tube fitting 20 in the full insertion position 104.

The force indication allows the user to continually or regularly check whether the tube 10 is fully inserted into the tube fitting 20 (by checking whether the retainer 70 is rotatable relative to the main body structure 30), even after initial full insertion of the tube 10 into the tube fitting 20.

When the tube 10 is only partially inserted into the tube fitting 20 in the partial insertion position 102 (as shown in FIG. 13B), the force indication is not provided, and the retainer 70 can thus rotate freely about and relative to the main body structure 30. Furthermore, if the tube 10 is partially or completely removed from the tube fitting 20 (by, for example, engaging the demount ring 24), the tabs 75 of the retainer 70 are released from a firm engagement with the end wall 44 of the channel 45, thereby allowing the retainer 70 to rotate freely relative to the main body structure 30 (and indicating to the user that the tube 10 is not fully inserted into the main body structure 30 of the tube fitting 20).

According to various implementations as shown in FIGS. 13A-15, the tube fitting 20 provides both the audible indication and the force indication, both of which are described further herein. Accordingly, the tube 10 is pushed into the tube fitting 20 until the audible indication is heard and the retainer 70 stops rotating freely about the main body structure 30 (i.e., the force indication), which indicates that the tube 10 has been completely inserted into the tube fitting 20 in the full insertion position 104.

However, as shown in FIGS. 1 A-6, in some implementations, the tube fitting 20 may only provide an audible indication. In contrast, as shown in FIGS. 7A-12B, the tube fitting 20 may only provide a force indication in some implementations.

Figure 14:
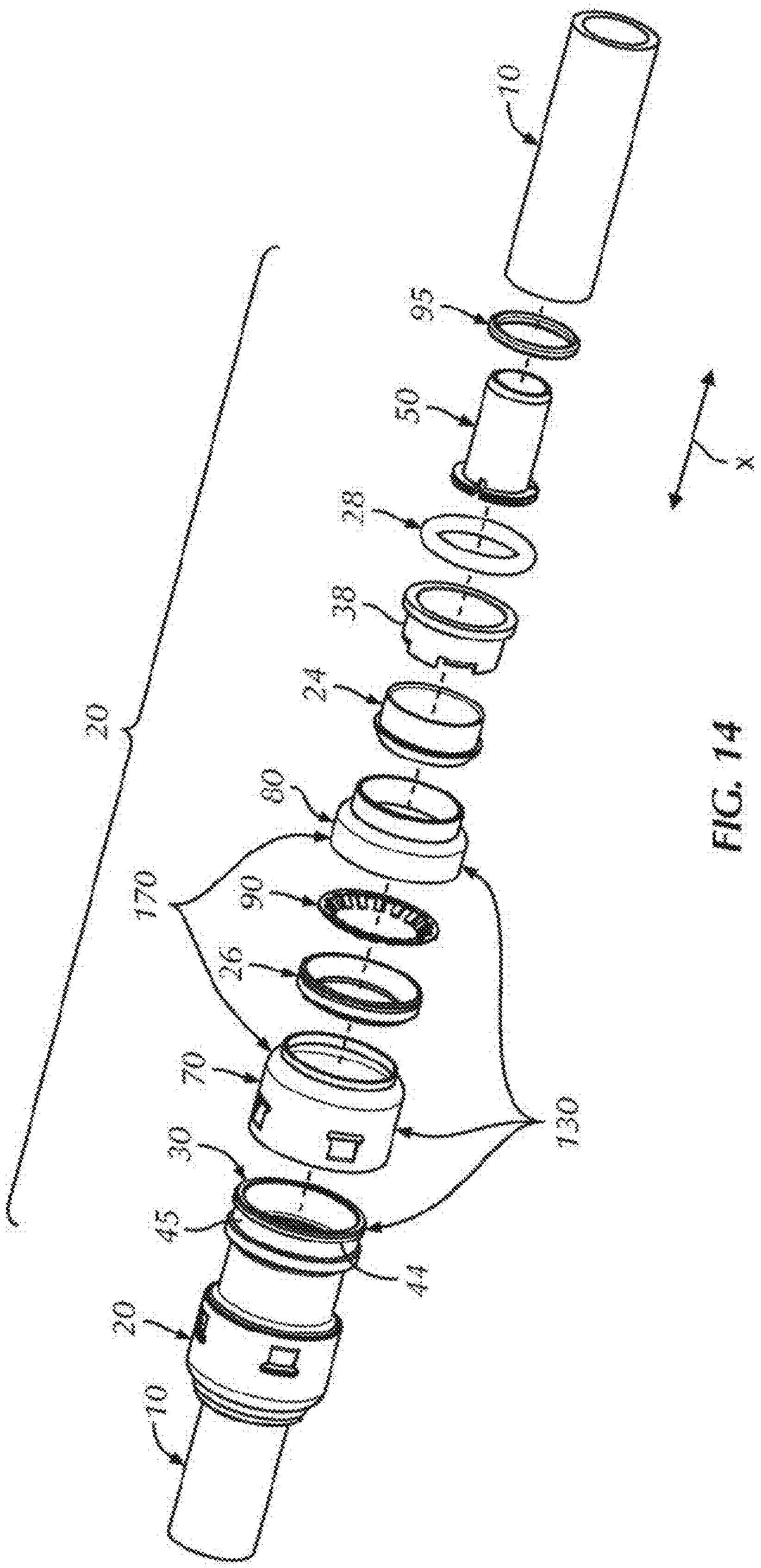
FIG. 14 is an exploded view of the tube fitting of FIG. 13A.
Figure 15:
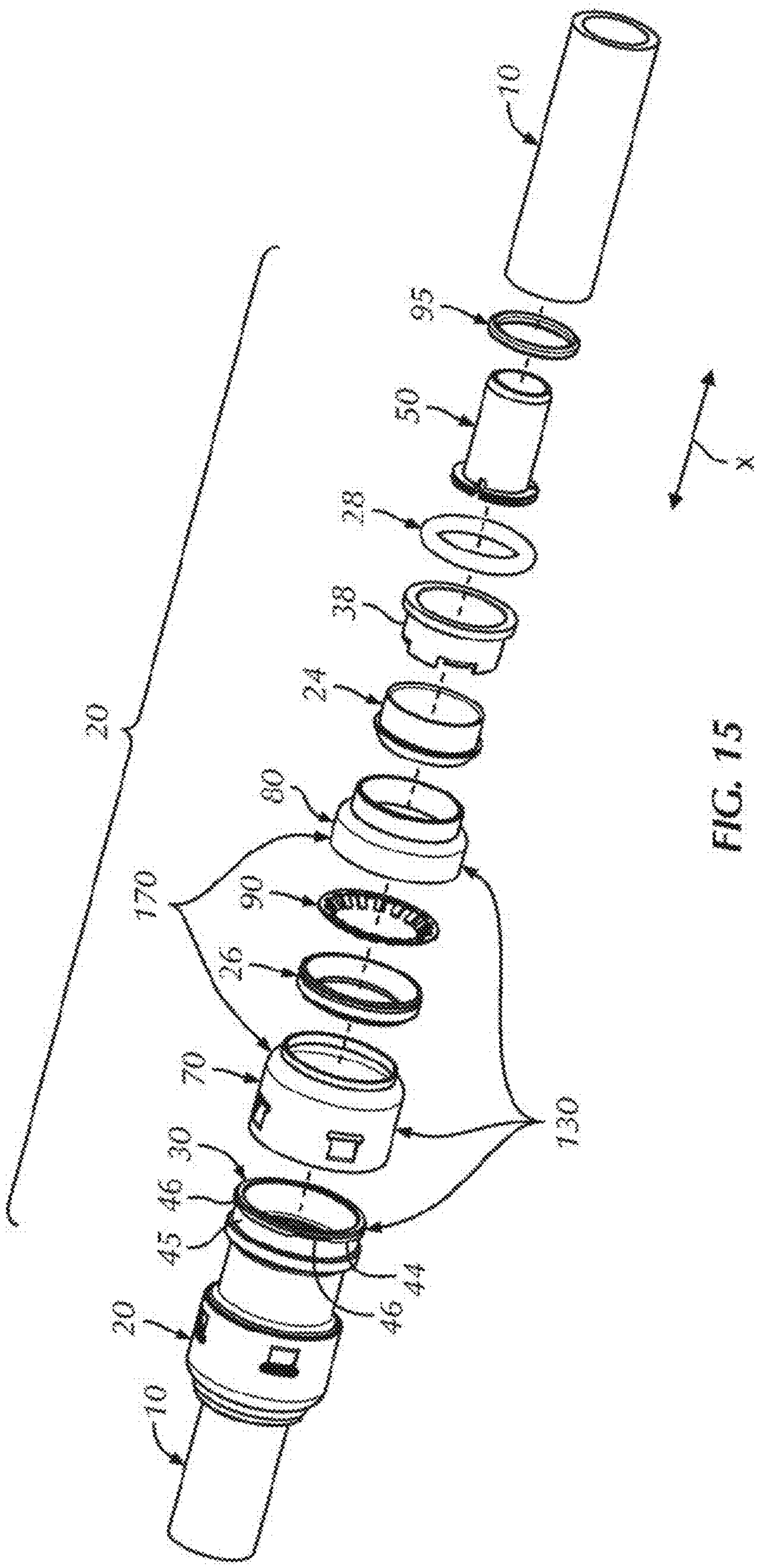
FIG. 15 is an exploded view of a tube fitting according to another implementation.

As shown in FIG. 14, the tube fitting 20 (with both the audible indication and the force indication) may comprise the main body structure 30 that has the channel 45 without the notches 46. However, as shown in FIG. 15, the tube fitting 20 (with both the audible indication and the force indication) may comprise the main body structure 30 that has the channel 45 with the notches 46. Furthermore, the various tube fittings 20 (with both the audible indication and the force indication) may comprise a main body structure 30 that includes the insert 38 of the main body structure 30 (as shown in FIGS. 13A-13C) or that does not include the insert 38 (as shown and described further herein).

Figure 17A:
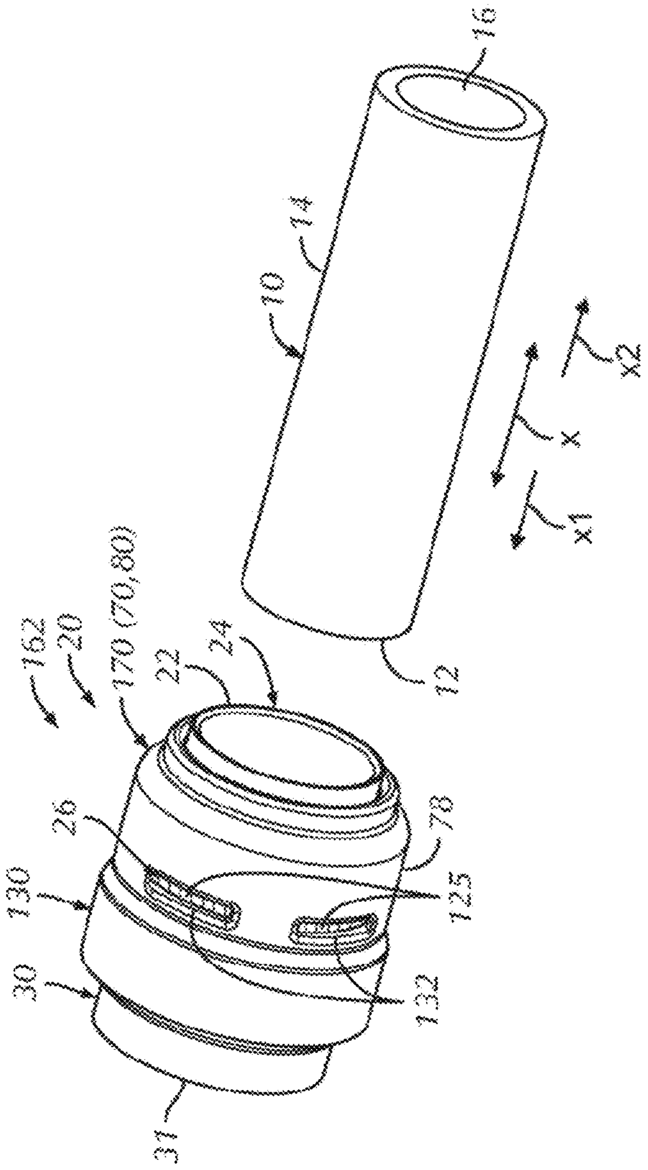
FIG. 17A is a perspective view of a tube fitting with a visual indication according to one implementation with the tube removed from the tube fitting.
Figure 17B:
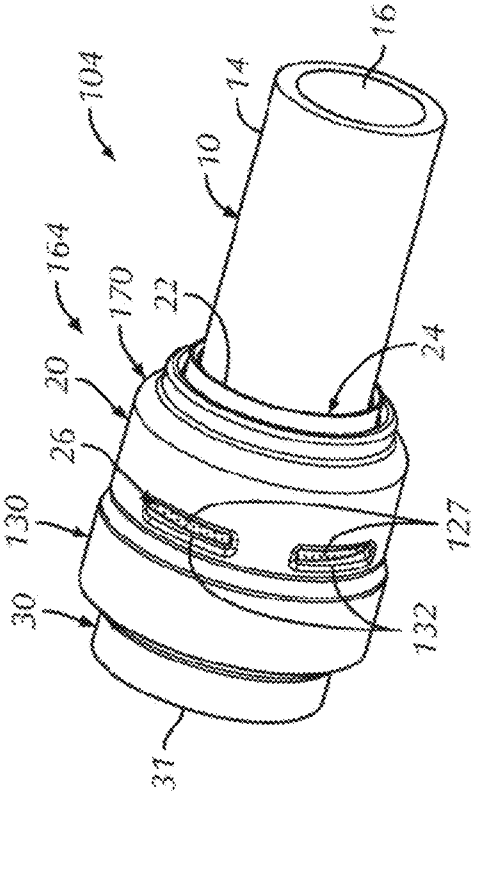
FIG. 17B is a perspective view of the tube fitting of FIG. 17A with the tube fully inserted into the tube fitting.

According to some implementations (as shown in FIGS. 17A-17B (i.e., the implementations in FIGS. 18A-23B and FIGS. 24A-25E) and FIGS. 26A-27B, some implementations of the tube fitting 20 may provide a visual indication that visually indicates once the tube has been fully inserted into the tube fitting 20. Although the visual indication is described with reference to FIGS. 17A-27B, other implementations of the tube fitting 20 may include the visual indication (and its various components).

In the various implementations with the visual indication, the tube fitting 20 further comprises an actuator (e.g., an expandable and retractable activation structure) 160 (which may be one of a conical structure 166 or a clip 168, each of which are shown and described further herein) positioned at least partially within the body assembly 130 (e.g., within the main body structure 30 and/or within the retainer structure 170). As shown in FIGS. 18A-18B and 24A-24B, the activation structure 160 is positioned within the main body structure 30 and is configured to abut against the transition portion 37*a* of the main body 37 in at least the retracted position 162 (and optionally also the extended position 164). Although the retainer structure 170 in which a retainer 70 and a cartridge ring 80 that are integral with each other is shown with the implementations having a visual indicator, the retainer structure 170 in which a retainer 70 and a cartridge ring 80 are separate component from each other can be used within the implementations having the visual indicator.

The activation structure 160 is movable between a retracted position 162 and an extended position 164 within the body assembly 130 to provide a visual indication regarding whether or not the tube 10 is fully inserted into the tube fitting 20. As described further herein, the activation structure 160 is configured to expand radially outwardly when moving from the retracted position 162 to the extended position 164 (and to retract radially inwardly when moving from the extended position 164 to the retracted position 162). The body assembly 130 and the activation structure 160 are configured such that, when the tube 10 is not fully inserted into the tube fitting 20, the activation structure 160 is in the retracted position 162 (or moves from the extended position 164 to the retracted position 162 if the tube 10 was previously fully inserted into the tube fitting 20) to provide a visual indication to indicate to the user that the tube 10 is not fully inserted into the tube fitting 20. Further, when the tube 10 is fully inserted into the tube fitting 20, the activation structure 160 is moved from the retracted position 162 to the extended position 164 to provide a visual indication to indicate to the user that the tube 10 has been fully inserted into the tube fitting 20, as described further herein. The activation structure 160 is configured or biased to automatically return from the retracted position 162 to the extended position 164 once the tube 10 has been removed from within the activation structure 160.

According to various implementations as shown in FIGS. 17A-25E, the visual indication is shown through a portion of the tube fitting 20, such as through a viewing window, aperture, or through-hole 132 in the body assembly 130 (that comprises the main body structure 30 and the retainer structure 170). Accordingly, the body assembly 130 defines the through-hole 132 through which the visual indication is provided. The through-hole 132 extends completely through a side wall of the body assembly 130, such as through a side wall of the retainer structure 170. The body assembly 130 may comprises multiple through-holes 132 about the circumference of the body assembly 130 that may be radially aligned with each other. The user can look through the through-hole 132 to visually see the status of whether or not the tube 10 has been fully inserted into the body assembly 130 of the tube fitting 20. Depending on whether the tube 10 is fully inserted into the tube fitting 20 or not, different components (e.g., the securing ring body 125 or the indication member 127) are shown through the through-hole 132 to indicate to the user whether to not the tube 10 is completely inserted into the tube fitting 20, as shown in FIGS. 17A-17B. FIGS. 18A-23B and FIGS. 24A-25E show two different implementations of the visual indication of FIGS. 17A-17B.

Figure 20:
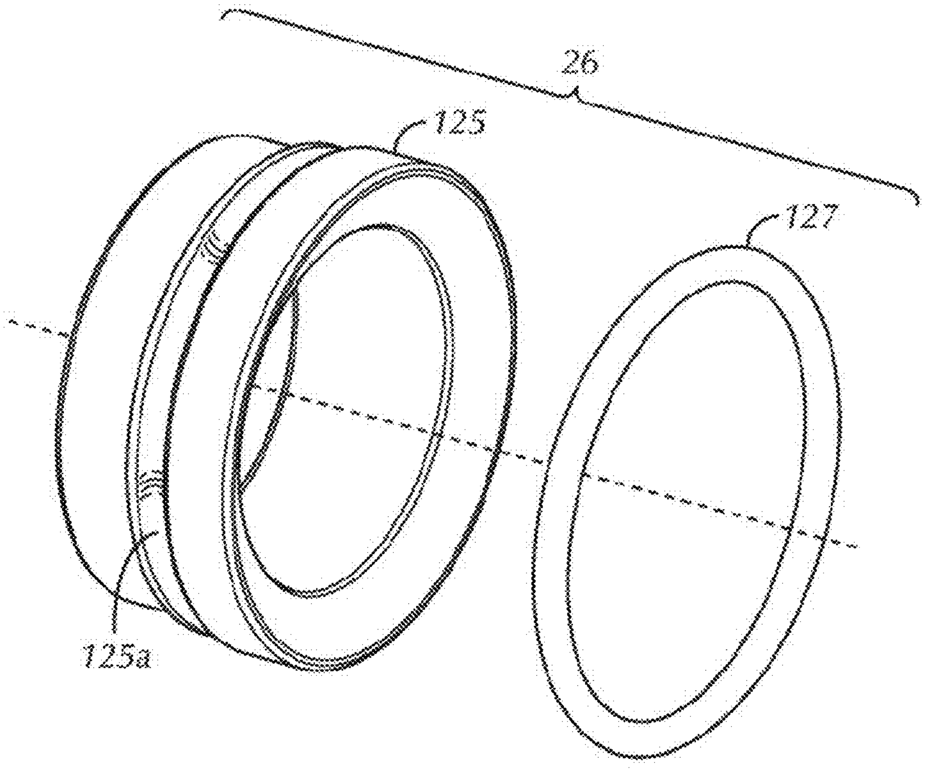
FIG. 20 is an exploded, perspective view of a securing ring of the tube fitting of FIG. 18 A.

As shown in FIGS. 18A-20 (as well as FIGS. 24A-24B), the securing ring 26 comprises a securing ring body 125 and an indicator or indication member 127 that may be separate or integral parts to each other. The securing ring body 125 defines an inner area (within which the tube 10 can be inserted). The indication member 127 is positioned around an outer radial surface (i.e., along the outer circumference) of the securing ring body 125. The securing ring body 125 and the indication member 127 may be visibly different (e.g., with different colors and/or textures) to provide a visible indication regarding whether the tube 10 is fully inserted into the tube fitting 20. According to one implementation, the indication member 127 is a seal member (e.g., an O-ring seal member) and the outer surface of the securing ring body 125 defines a groove 125*a* (as shown in FIG. 20) that is complementary to the indication member 127.

Figure 18A:
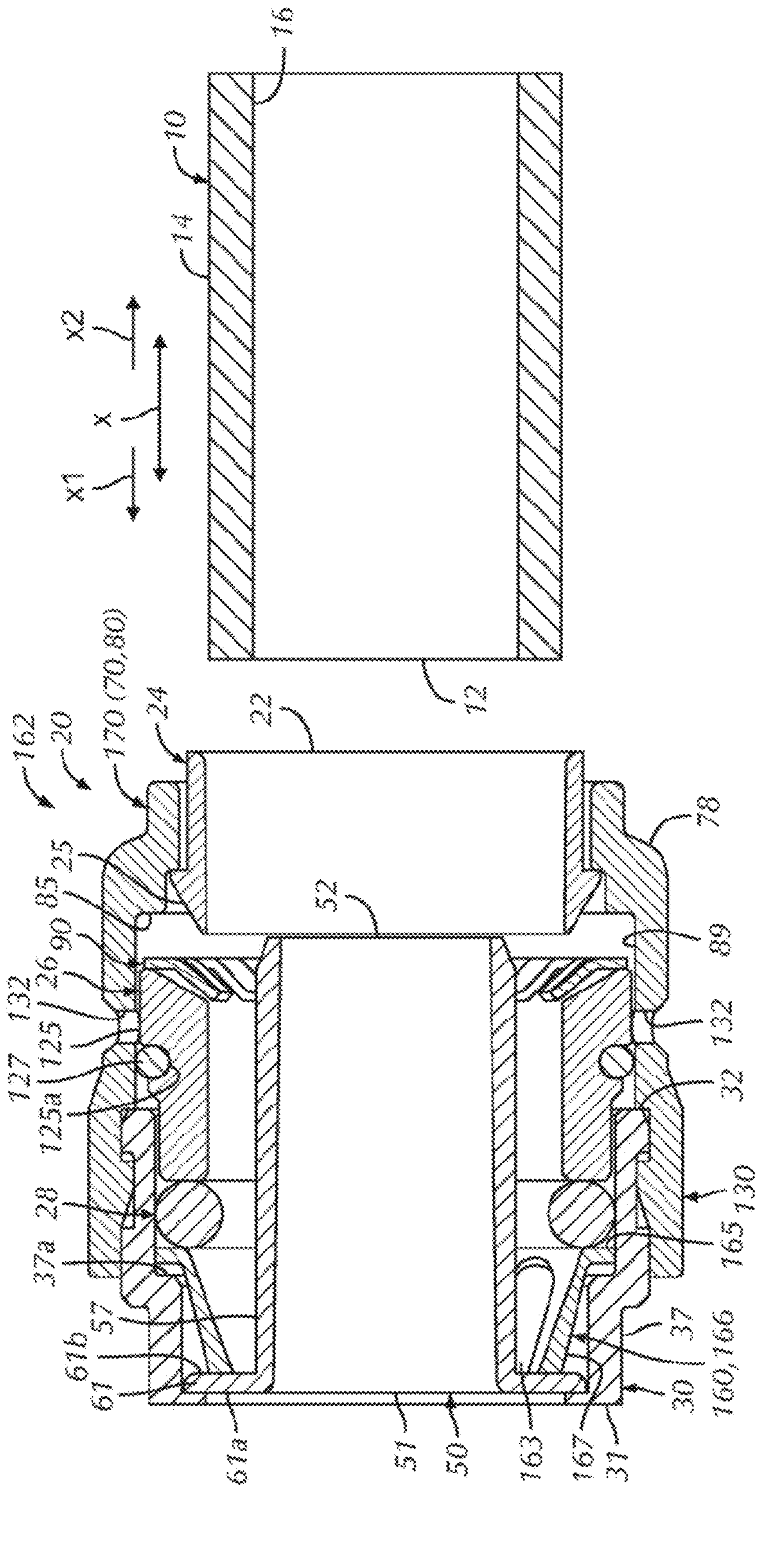
FIG. 18A is a cross-sectional view of a tube fitting according to one implementation having the visual indication of FIG. 17A with the tube removed from the tube fitting.
Figure 24A:
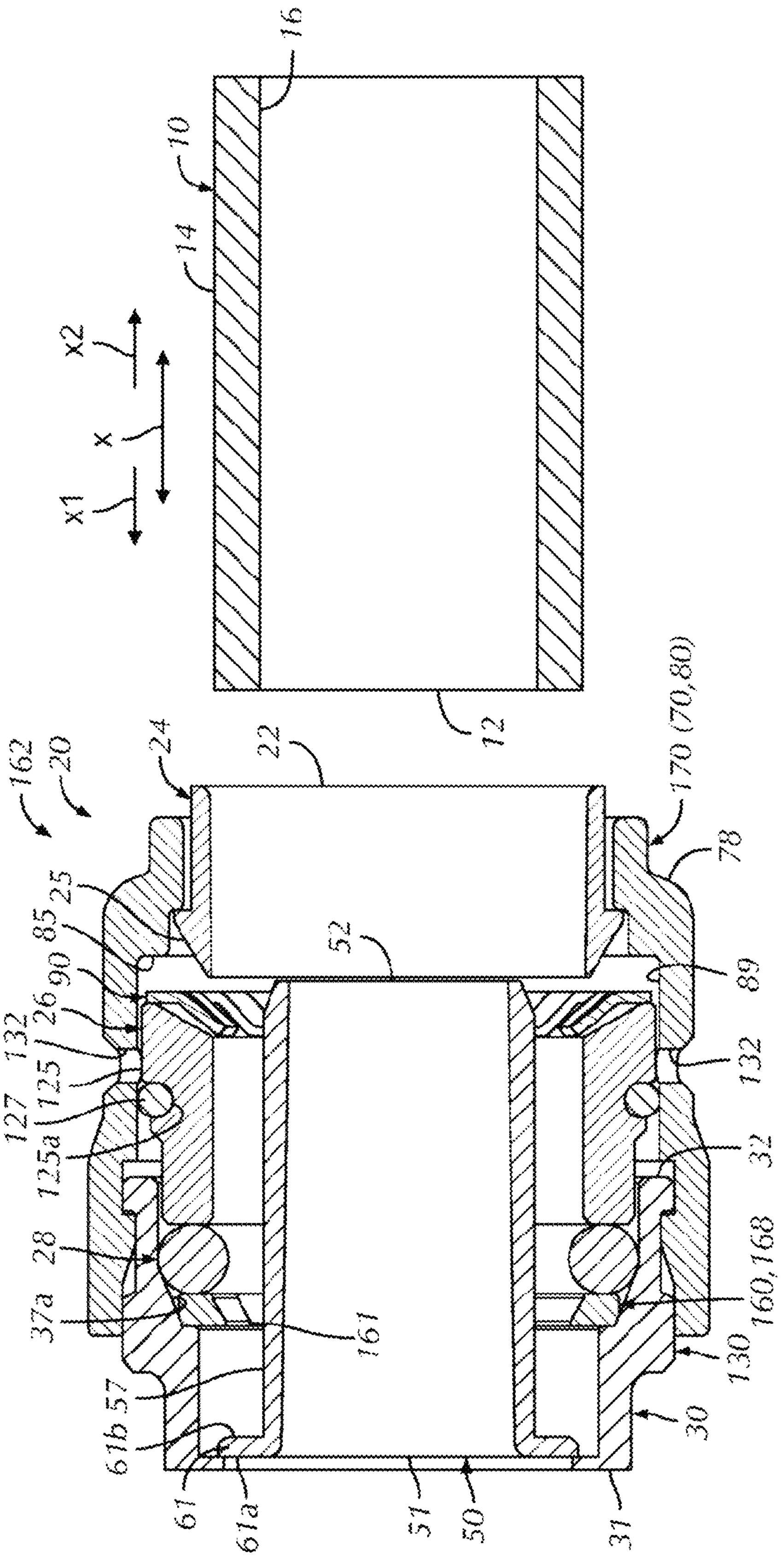
FIG. 24A is a cross-sectional view of a tube fitting according to another implementation having the visual indication of FIG. 17A with the tube removed from the tube fitting.

Accordingly, the indication member 127 is received, positioned, and secured within the groove 125*a* of the securing ring body 125 and defines an outer surface of the overall securing ring 26 (as shown in FIGS. 18A and 24A). However, according to various other implementations, the indication member 127 is adhered to the securing ring body 125 or is integral with the securing ring body 125. For example, the indication member 127 may be a painted or coated portion of the securing ring body 125 or have an adhesive or film portion that has a different color than the rest of the securing ring body 125.

The indication member 127 may extend at least partially radially beyond the outer surface of the securing ring body 125 in order to press against the inner surface of the body assembly 130 (in particular the retainer structure 170). Accordingly, the indication member 127 creates an adequate frictional force against the inner surface of the retainer structure 170 to prevent the securing ring 26 from inadvertently moving or sliding in either direction on its own within the body assembly 130 (while still being slidable when moved by the activation structure 160 or the demount ring 24, as described further herein), both when the indication member 127 is not aligned with or visible through the through-hole 132 (e.g., in the retracted position 162) and when the indication member 127 is aligned with and visible through the through-hole 132 (e.g., in the extended position 164).

Alternatively or additionally, according to various embodiments, the securing ring 26 and the retainer structure 170 may include an annular snap mechanism that includes a protrusion on one of the securing ring 26 or retainer structure 170 and a complementary groove or slot on the other of the securing ring 26 and the retainer structure 170. For example, the securing ring 26 may include a protrusion along its outer surface or circumference. The retainer structure 170 comprises a complementary groove or slot along its inner surface or circumference. The protrusion and the slot (that create the annular snap mechanism) are configured to mate or interlock with each other (by the protrusion being received within the slot when the protrusion and the slot are aligned together) to prevent the securing ring 26 from inadvertently moving or sliding in either direction on its own within the retainer structure 170 of the body assembly 130.

As shown in FIGS. 18A-18B and 24A-24B, the securing ring 26 is positioned within the body assembly 130 (e.g., within the main body structure 30 and/or the retainer structure 170) and is axially movable within the body assembly 130 as the activation structure 160 moves between the retracted position 162 and the extended position 164 (and therefore as the tube 10 is inserted into or removed from the tube fitting 20). The securing ring body 125 and the indication member 127 move in tandem within the body assembly 130.

Figure 18B:
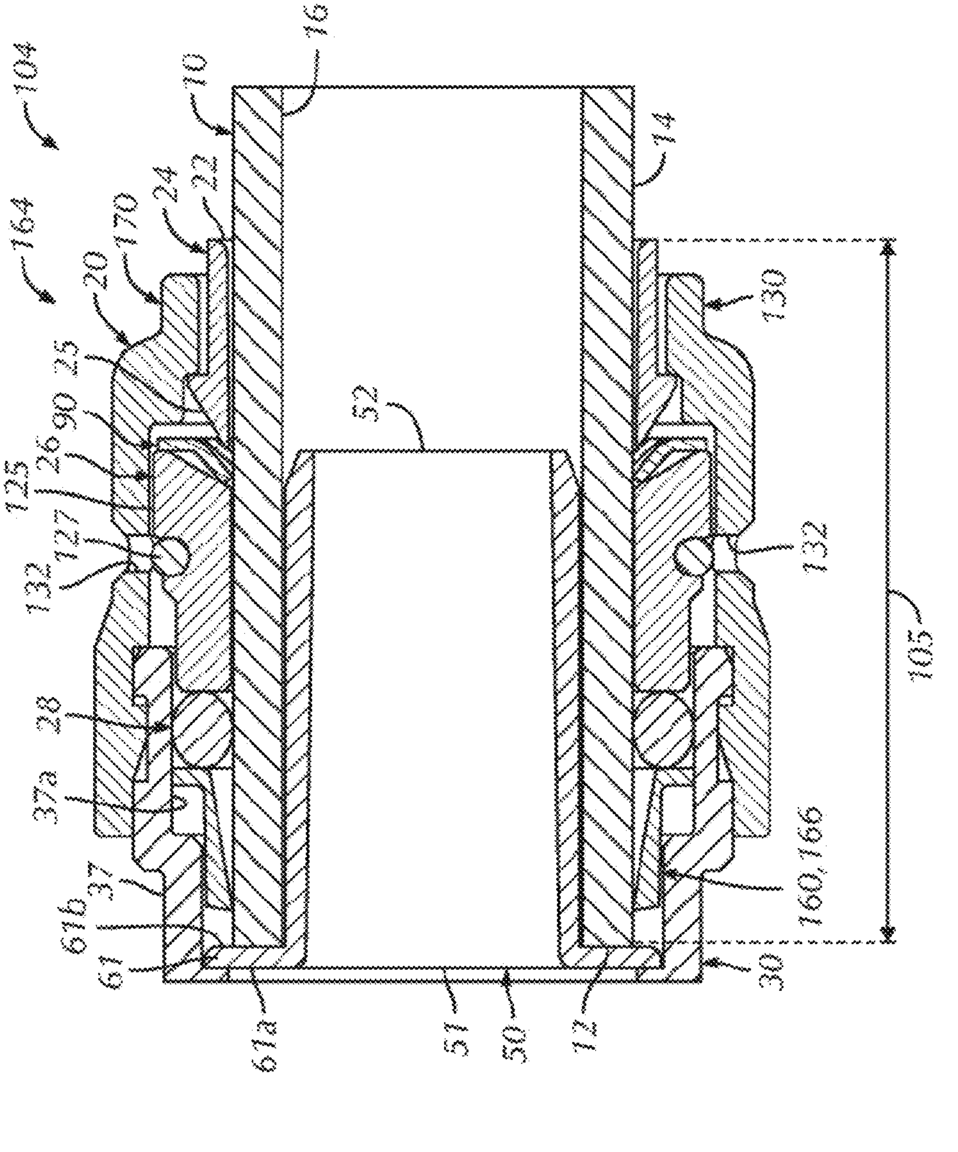
FIG. 18B is a cross-sectional view of the tube fitting of FIG. 18A with the tube fully inserted into the tube fitting.
Figure 19:
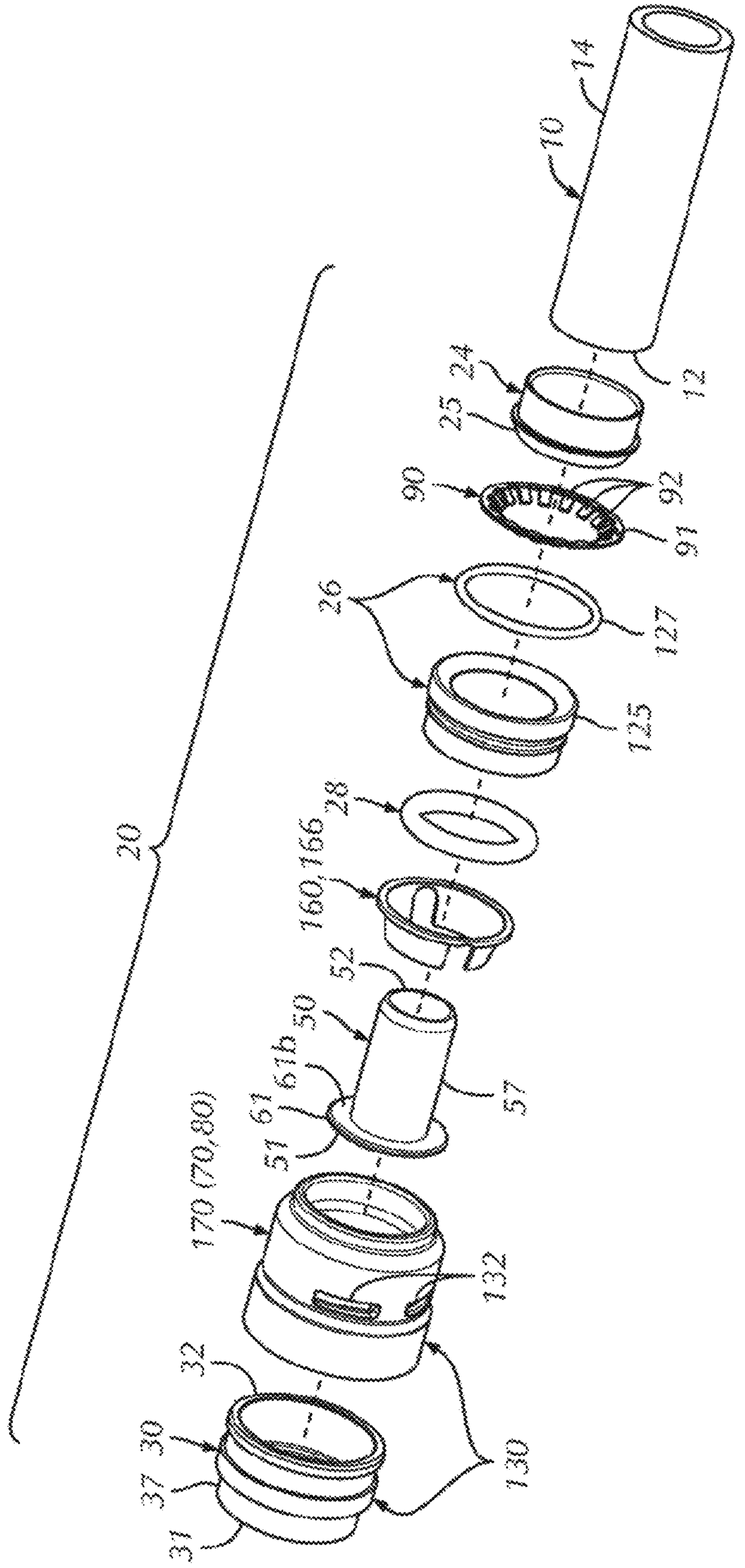
FIG. 19 is an exploded view of the tube fitting of FIG. 18 A.
Figure 24B:
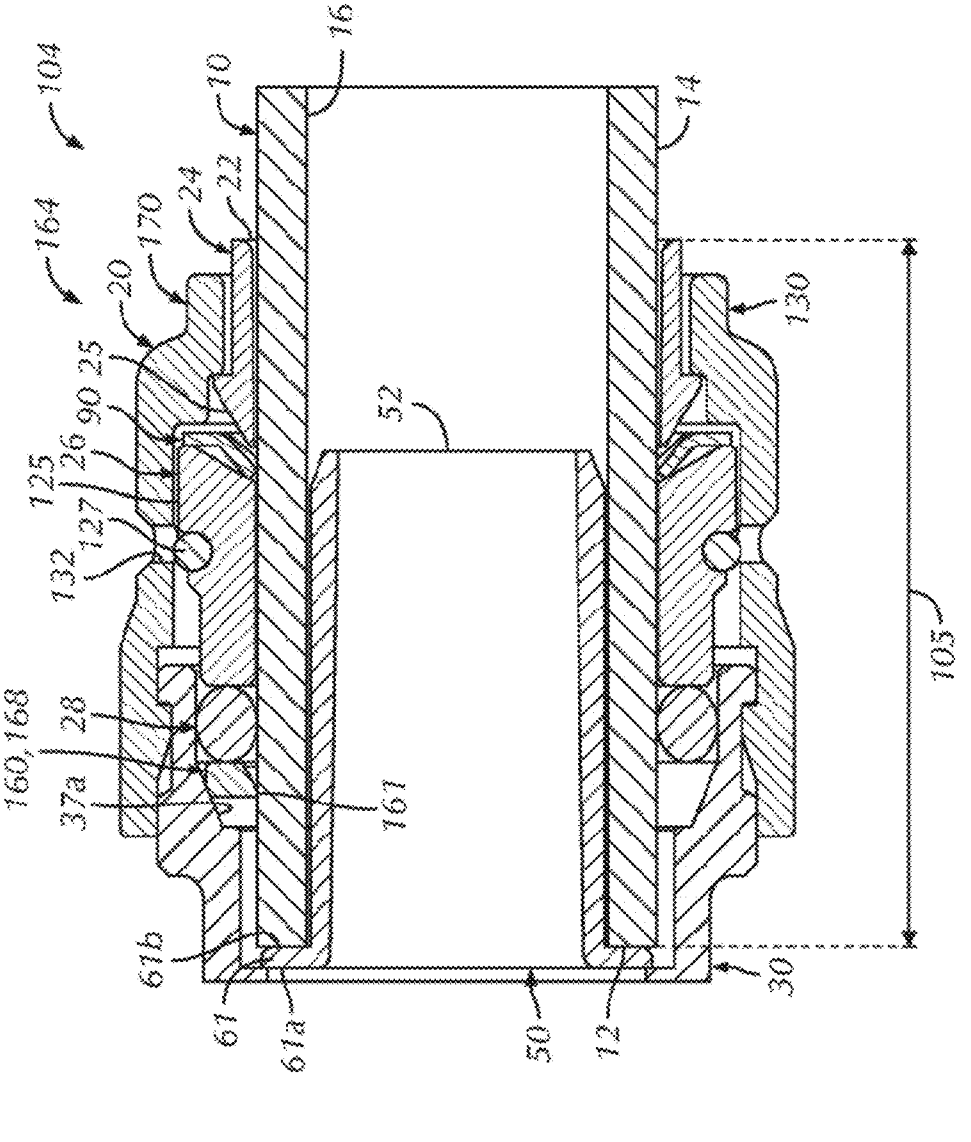
FIG. 24B is a cross-sectional view of the tube fitting of FIG. 24A with the tube fully inserted into the tube fitting.
Figure 25A:
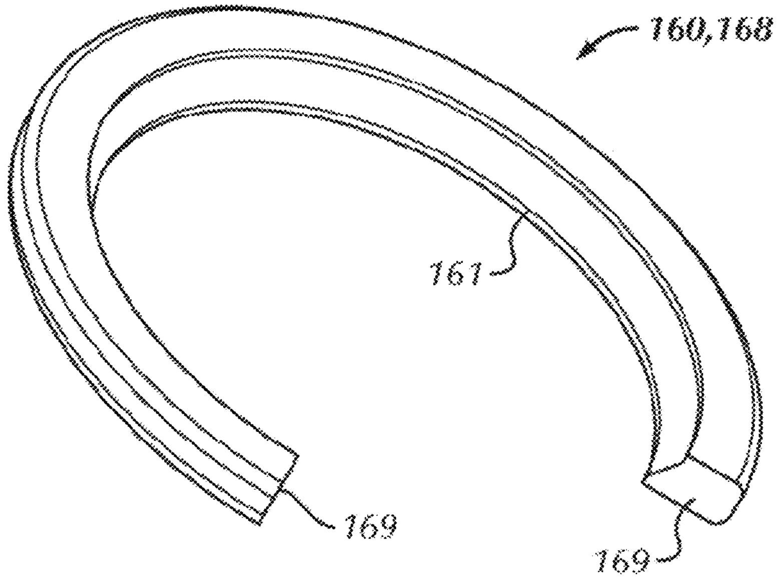
FIGS. 25A-25B are perspective views of the activation structure of the tube fitting of FIG. 24A.
Figure 25B:
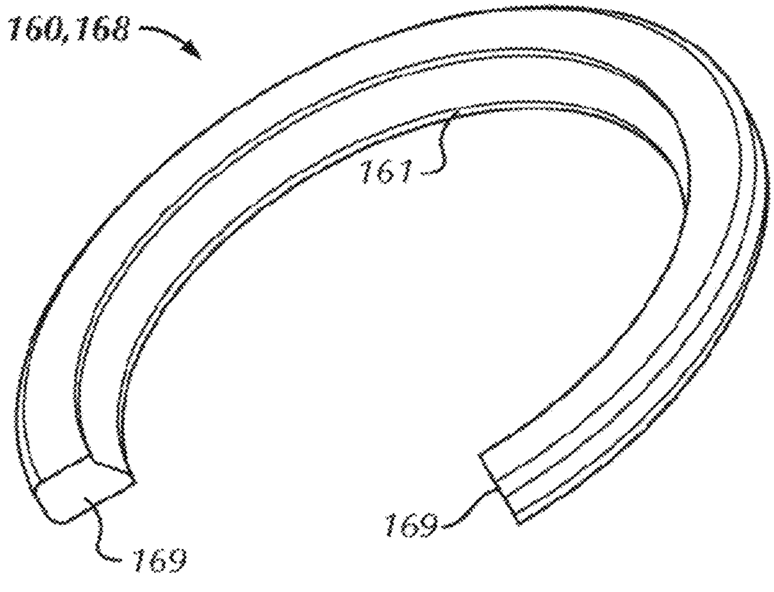
Figure 25C:
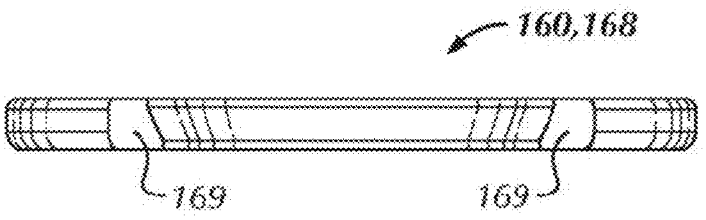
FIG. 25C is a front view of the activation structure of FIG. 25 A.
Figure 25D:
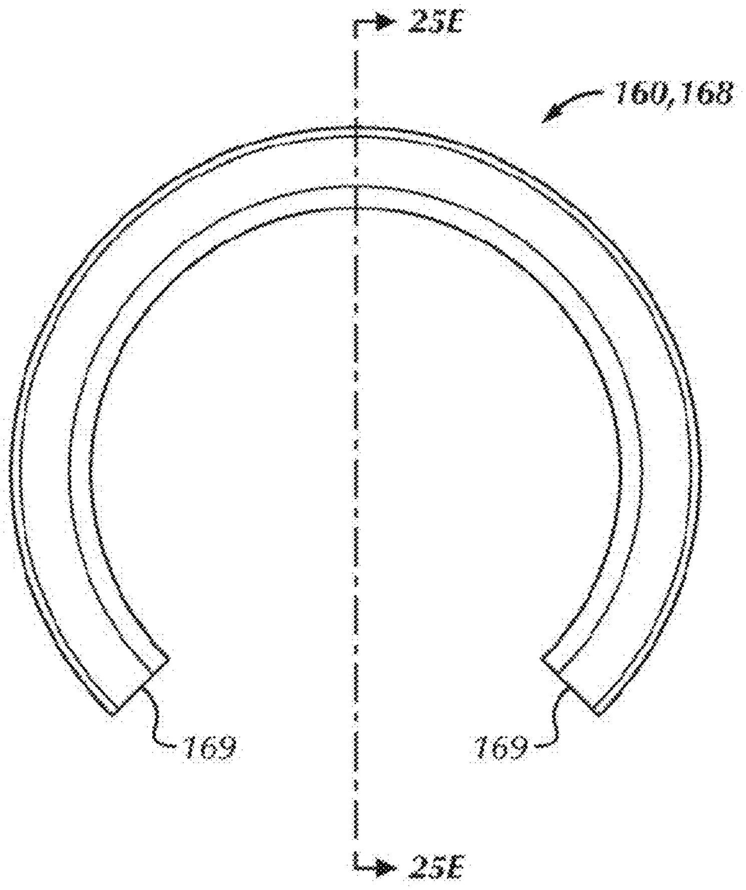
FIG. 25D is a top view of the activation structure of FIG. 25 A.
Figure 25E:
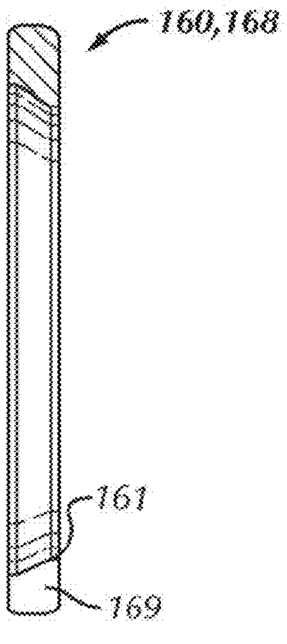
FIG. 25E is a cross-sectional view through Section 25E-25E of FIG. 25D.

The securing ring 26 is radially aligned with the through-hole 132 of the body assembly 130 such that one of the securing ring body 125 and the indication member 127 is radially aligned with and visible through the through-hole 132 when the activation structure 160 is in the retracted position 162, and the other of the securing ring body 125 and the indication member 127 is radially aligned with and visible through the through-hole 132 when the activation structure 160 is in the extended position 164. For example, as shown in FIGS. 17A, 18A, and 24A, when the activation structure 160 is in the retracted position 162 (i.e., when the tube 10 is not fully inserted into the tube fitting 20), a portion of the securing ring body 125 (which may optionally be a second indication member with any or all of the features, aspects, and components of the first indication member 127) is radially aligned with and visible through the through-hole 132. As shown in FIGS. 17B, 18B, and 24B, when the activation structure 160 is in the extended position 164 (i.e., when the tube 10 is fully inserted into the tube fitting 20), the indication member 127 is radially aligned with and visible through the through-hole 132.

However, according to other implementations, the indication member 127 is visible through the through-hole 132 when the activation structure 160 is in the retracted position 162, and the securing ring 125 is visible through the through-hole 132 when the activation structure 160 is in the extended position 164.

During use, as the tube 10 is fully inserted into the tube fitting 20 (as shown in FIGS. 18A-18B and 24A-24B), the end 12 of the tube 10 pushes radially outwardly against the inner surface of the activation structure 160 (i.e., the conical portion 167 or the clip 168, as described further herein), which causes the activation structure 160 to flex or expand radially outwardly to accommodate the outer diameter of the tube 10 such that the tube 10 fits within and extends through the activation structure 160. This moves the activation structure 160 from the retracted position 162 to the extended position 164. As the activation structure 160 radially expands and moves from the retracted position 162 to the extended position 164, the activation structure 160 moves in the second axial direction X2 (opposite the direction that the tube 10 is moving into the tube fitting 20). As the activation structure 160 moves in the second axial direction X2, the activation structure 160 concurrently moves or pushes the seal member 28, the securing ring 26, and the grab ring 90 in the same second axial direction X2 within the body assembly 130, which moves the indication member 127 to be radially aligned with and visible through the through-hole 132 of the body assembly 130 to provide the visual indication that the tube 10 is fully inserted into the tube fitting 20. When the indication member 127 can be viewed through the through-hole 132 of the body assembly 130, the user can visually verify that the tube 10 is fully inserted into the tube fitting 20.

To remove the tube 10 from the tube fitting 20 and reset the visual indication, the demount ring 24 is pressed with a demount tool, which flexes the grab ring 90 radially outwardly (away from the outer surface of the tube 10) and thereby releases the tube 10 and allows the tube 10 to be demounted from the tube fitting 20. As the tube 10 is moved out from the tube fitting 20 in the second axial direction X2 (and in particular out of the activation structure 160), the activation structure 160 automatically retracts radially inwardly back to its original shape, thereby moving from the extended position 164 to the retracted position 162 and moving in the first axial direction XI (the opposite direction of the tube fitting 20 moving out from the body assembly 130). At the same time, the demount ring 24 pushes the grab ring 90, the securing ring 26, and the seal member 28 in the first axial direction XI within the body assembly 130, back to their original positions, which radially aligns the securing ring body 125 (rather than the indication member 127) with the through-hole 132 of the body assembly 130 to indicate that the tube 10 is not fully inserted into the tube fitting 20 and resets the tube fitting 20 to be connected to a tube 10 again.

Figure 21:
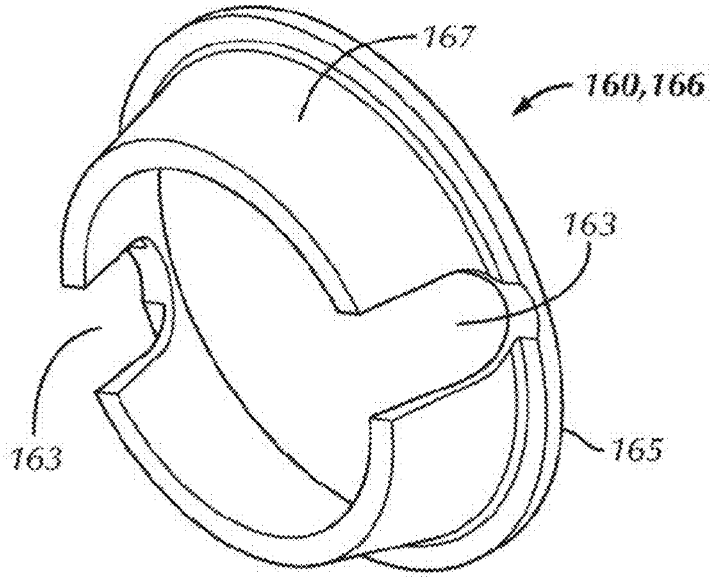
FIG. 21 is a perspective view of an activation structure of the tube fitting of FIG. 18A.
Figure 22A:
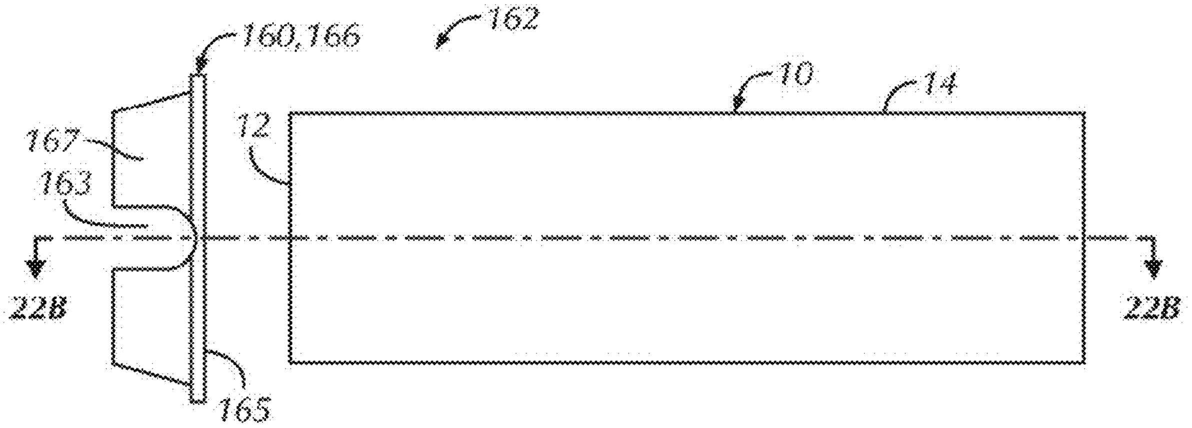
FIG. 22A is a side view of the activation structure of the tube fitting of FIG. 18A and the tube not connected to the activation structure.
Figure 22B:
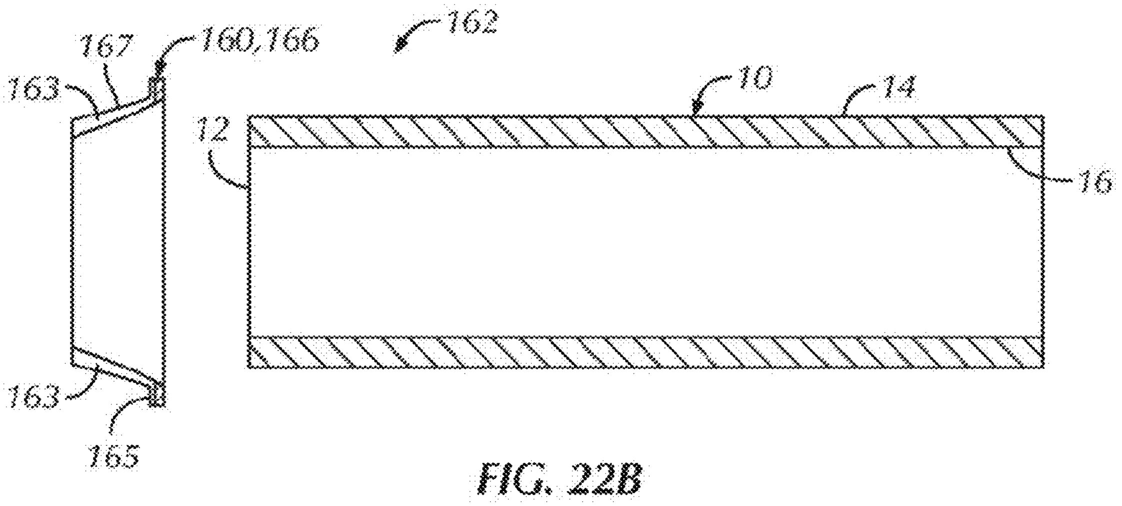
FIG. 22B is a cross-sectional view through Section 22B-22B of FIG. 22A.
Figure 23A:
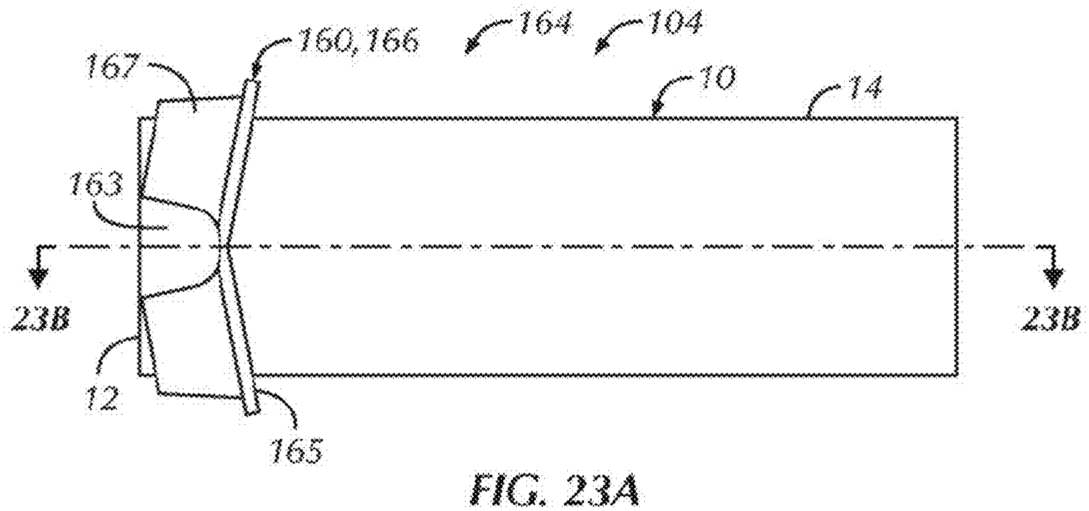
FIG. 23A is a side view of the activation structure of the tube fitting of FIG. 18A and the tube fully inserted into the activation structure.
Figure 23B:
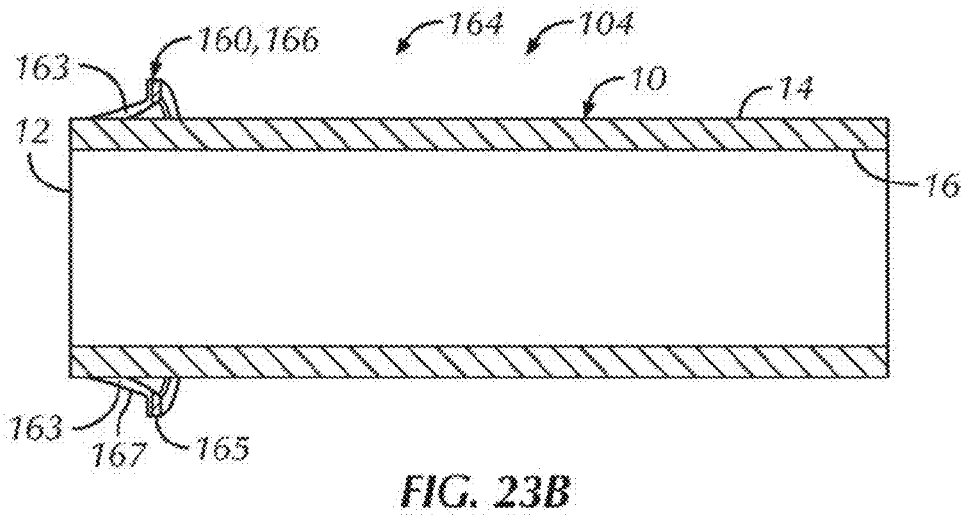
FIG. 23B is a cross-sectional view through Section 23B-23B of FIG. 23 A.

According to at least one implementation as shown in FIGS. 18A-23B, the activation structure 160 is an expandable and retractable cone or conical structure 166 through which the tube 10 can be inserted. As shown in FIG. 21, the conical structure 166 comprises a ledge 165 and a conical portion 167. The ledge 165 is positioned along the end of the conical portion 167 that is wider. The outer surface of the conical portion 167 tapers inwardly as it extends away from the ledge 165. However, as shown in FIGS. 18A-18B and 22B, the radial thickness of the conical portion 167 tapers as the conical portion 167 extends from the ledge 165. In particular, the radial thickness of the conical portion 167 is thinner along the end of the conical portion 167 next to the ledge 165 and is thicker along the end of the conical portion 167 further from the ledge 165. According to one embodiment, the conical structure 166 may be two separate pieces or components that can each individually move (e.g., be activated or flexed as the tube 10 is inserted into the tube fitting 20).

As shown in FIG. 18 A, the conical structure 166 is oriented within the body assembly 130 such that the conical portion 167 is further in the first direction XI and the ledge 165 is further in the second direction X2. The narrow end of the conical structure 166 abuts against the second surface 61*b* of the first extension 61 of the tube liner 50 in the retracted position 162.

The ledge 165 extends radially outwardly beyond the end of the conical portion 167.

Accordingly, in the retracted position 162, a surface of the ledge 165 may abut against the transition portion 37*a* (which, in this implementation, is a ledge that extends at approximately 90° to the first and second portions of the main body 37). The transition portion 37*a* and/or the second surface 61*b* of the first extension 61 of the tube liner 50 thereby prevents the conical structure 166 from moving any further in the second axial direction X2.

As shown in FIGS. 18A-18B and 22A-23B, the conical structure 166 is configured to expand radially outwardly due to the tube 10, increasing the inner diameter of the conical portion 167 to accommodate the outer diameter of the tube 10. In particular, the narrow end of the conical portion 167 is narrower (i.e., has a smaller diameter) in the retracted position 162 than in the extended position 164. As shown in FIG. 21, the conical portion 167 comprises at least one slot 163 that extends along at least a portion (or all) of the axial length of the conical portion 167 to allow the conical portion 167 to radially flex and expand outwardly. For example, the conical portion 167 may have two slots 163 on opposite radial sides from each other.

According to another implementation as shown in FIGS. 24A-25E, the activation structure 160 is an expandable and retractable clip 168. As shown in FIGS. 25A-25E, the clip 168 has a round, ring shape (through which the tube 10 can be inserted), with two ends 169 that are not attached to each other (thereby forming approximately a "C" shape). The inner surface of the clip 168 is angled (relative to its axis). A tip 161 of the inner surface (i.e., the portion of the clip 168 with the smallest diameter) is configured to abut against the outer surface 14 of the tube 10 (as shown in FIG. 24B), and the clip 168 is oriented within the body assembly 130 such that the tip 161 is positioned along the side of the clip 168 corresponding to the first axial direction XI. The outer surface of the clip 168 abuts against the transition portion 37*a* (which, in this implementation, is a ramped surface that extends (at an angle that is not approximately 90°) between the first and second portions of the main body 37).

As shown in FIGS. 24A-24B, the clip 168 is configured to expand radially outwardly due to the tube 10, increasing the inner diameter of the clip 168 (by increasing the distance between the two ends 169 of the clip 168) to accommodate the outer diameter of the tube 10. When the clip 168 expands radially outwardly as the tube 10 is be inserted into the tube fitting 20 (and specifically into the clip 168), the outer surface of the clip 168 engages with the ramped surface of the transition portion 37*a* of the main body 37. Accordingly, as the clip 168 moves along the ramped surface of the transition portion 37*a* toward the side of the transition portion 37*a* with a larger diameter, which is in the second axial direction X2 in a direction opposite the insertion direction of the tube 10 into the tube fitting 20, the transition portion 37*a* provides an increasingly large area for the clip 168 to expand into.

Figure 26A:
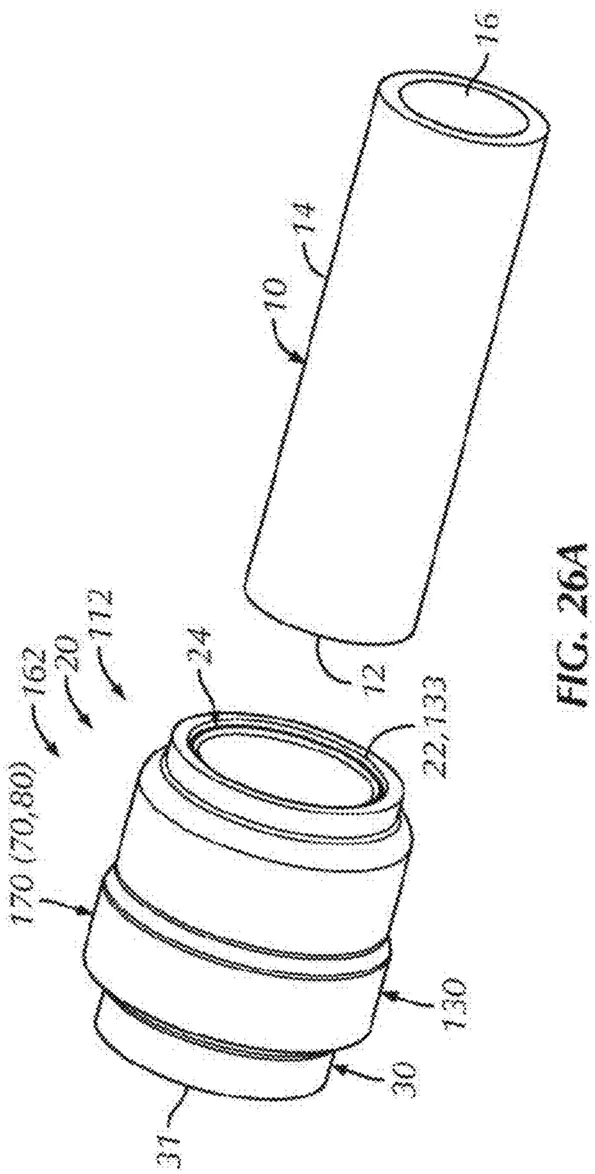
FIG. 26A is a perspective view of a tube fitting with a visual indication according to another implementation with the tube removed from the tube fitting.
Figure 26B:
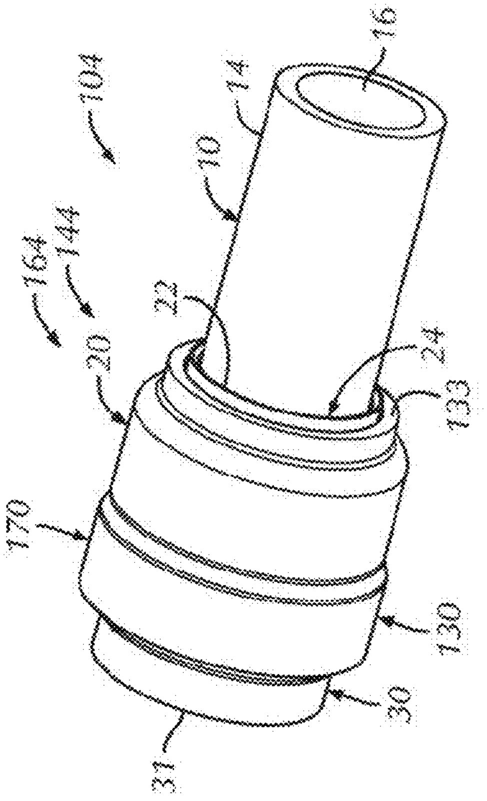
FIG. 26B is a perspective view of the tube fitting of FIG. 26A with the tube fully inserted into the tube fitting.
Figure 27A:
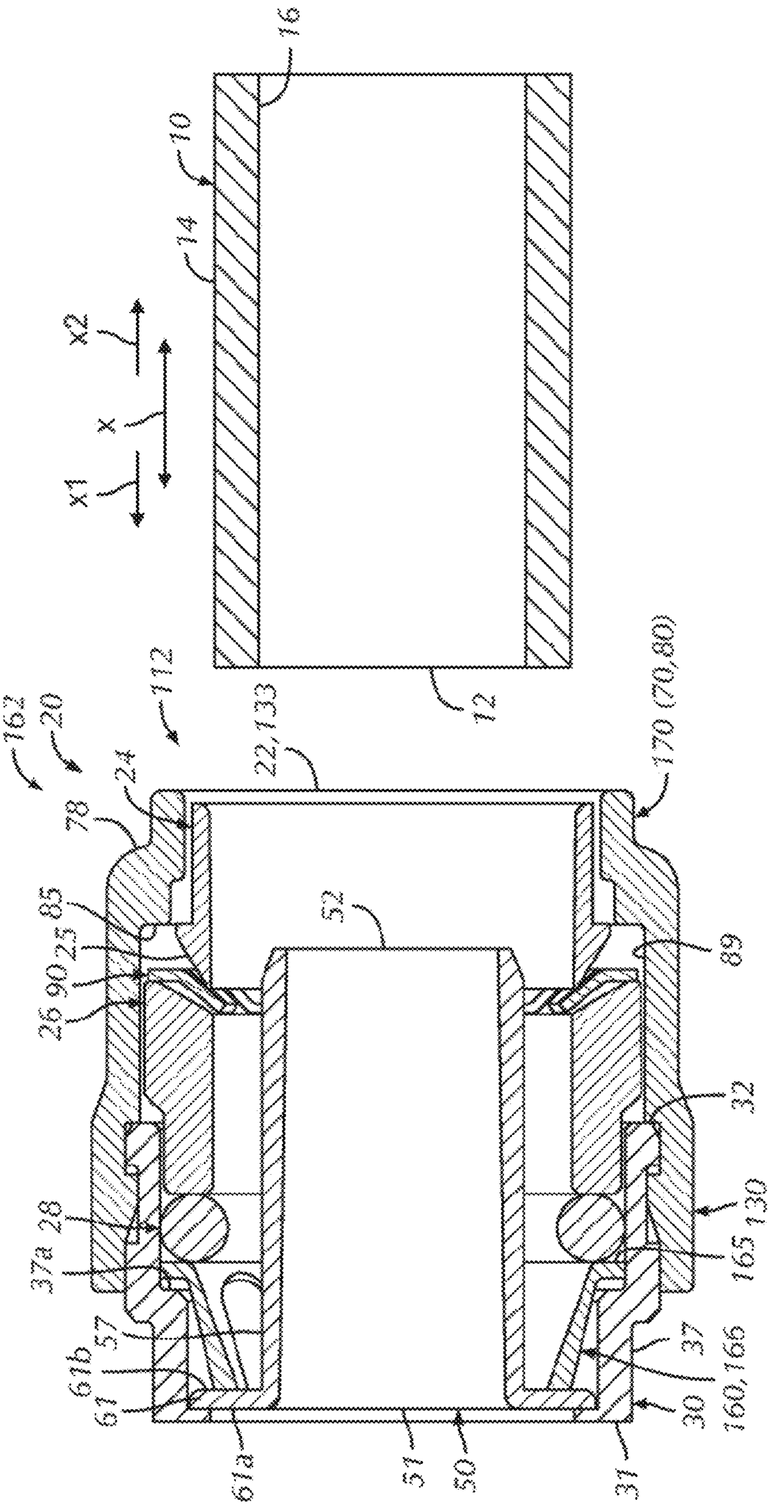
FIG. 27A is a cross-sectional view of the tube fitting of FIG. 26A with the tube removed from the tube fitting.
Figure 27B:
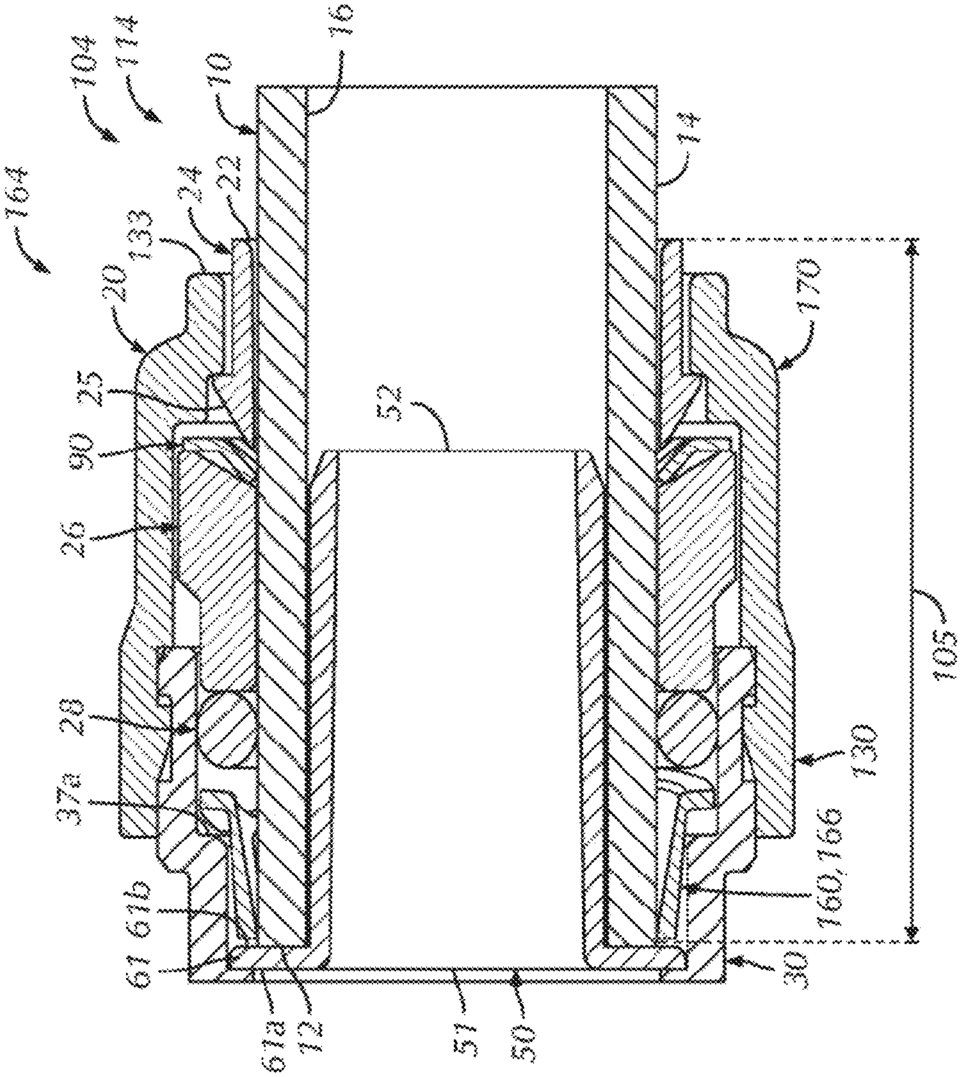
FIG. 27B is a cross-sectional view of the tube fitting of FIG. 26A with the tube fully inserted into the tube fitting.

According to another implementation as shown in FIGS. 26A-27B, the visual indication is provided along and through a second end 133 of the body assembly 130 (where the first end of the body assembly 130 corresponds to the first end 31 of the main body structure 30, and the second end 133 of the body assembly 130 is opposite the first end of the body assembly 130 along the length of the body assembly 130). In particular, the position of the demount ring 24 provides a visual indication regarding whether or not the tube 10 is fully inserted into the tube fitting 20. The demount ring 24 is movable between a concealed position 112 and an exposed position 114. In the concealed position 112 (as shown in FIGS. 26A and 27 A), the tube 10 is not fully inserted into the tube fitting 20. Accordingly, the demount ring 24 is positioned completely within the body assembly 130, indicating that the tube 10 is not fully inserted into the tube fitting 20. In particular, the end of the demount ring 24 (that is further in the second axial direction X2 and opposite the angled end 25) is either flush with or completely recessed within the corresponding end of the retainer structure 170 of the body assembly 130 such that the demount ring 24 is not visible outside of the body assembly 130. In the concealed position 112, the retainer structure 170 defines the entrance end 22 of the tube fitting 20, and the activation structure 160 is in the retracted position 162.

When the activation structure 160 is moved from the retracted position 162 to the extended position 164, the demount ring 24 is concurrently moved from the concealed position 112 to the exposed position 114 to provide the visual indication. In particular, in the exposed position 114 (as shown in FIGS. 26B and 27B), the tube 10 is fully inserted into the tube fitting 20. Accordingly, the end of the demount ring 24 (that is further in the second axial direction X2 and opposite the angled end 25) is positioned partially outside of and is visible outside of the body assembly 130 (in the axial, longitudinal direction X), indicating that the tube 10 is fully inserted into the tube fitting 20. In the exposed position 114, the end of the demount ring 24 defines the entrance end 22 of the tube fitting 20, and the activation structure 160 is in the extended position 164.

Accordingly, during use, as the tube 10 is fully inserted into the tube fitting 20 (as shown in FIGS. 26A-27B), the end 12 of the tube 10 pushes radially outwardly against the inner surface of the activation structure 160 (i.e., the conical portion 167 or the clip 168, as described further herein), which causes the activation structure 160 to flex or expand radially outwardly to accommodate the outer diameter of the tube 10 such that the tube 10 fits within and extends through the activation structure 160. This moves the activation structure 160 from the retracted position 162 to the extended position 164. As the activation structure 160 radially expands and moves from the retracted position 162 to the extended position 164, the activation structure 160 moves in the second axial direction X2 (opposite the direction that the tube 10 is moving into the tube fitting 20). As the activation structure 160 moves in the second axial direction X2, the activation structure 160 concurrently moves or pushes the seal member 28, the securing ring 26, the grab ring 90, and the demount ring 24 in the same second axial direction X2 within the body assembly 130, which moves the demount ring 24 to axially extend beyond or protrude past the second end 133 of the body assembly 130 (in particular beyond the retainer structure 170) to provide the visual indication that the tube 10 is fully inserted into the tube fitting 20. When the demount ring 24 axially extends and is visible beyond the second end 133 of the body assembly 130, the user can visually verify that the tube 10 is fully inserted into the tube fitting 20.

To remove the tube 10 from the tube fitting 20 and reset the visual indication in the implementation shown in FIGS. 26A-27B, the same procedure is followed as previously described with respect to the implementations shown in FIGS. 18A-18B and 24A-24B. Once the tube 10 is removed from the tube fitting 20, the demount ring 24 is retracted back to the retracted position 162 from the extended position 164.

In this implementation shown in FIGS. 26A-27B, the activation structure 160 is shown as the conical structure 166 (as described further herein). However, the clip 168 (as described further herein) may alternatively be used as the activation structure 160 within the implementation of FIGS. 26A-27B. Furthermore, the tube fitting of FIGS. 26A-27B can include the through-hole 132 and the various other corresponding structures, such as the indication member 127 (as described further herein).

Each of the various implementations disclosed herein may have any of the aspects, features, components, and configurations of the other implementations, except where noted otherwise. For example, each of the various features, components, and aspects of the various types of indications (i.e., the audible indication, the force indication, and/or the visual indication) can be integrated into any of the other implementations.

As utilized herein, the term "approximately" and similar terms are intended to have a broad meaning in harmony with the common and accepted usage by those of ordinary skill in the art to which the subject matter of this disclosure pertains. The term "approximately" as used herein refers to ±5% of the referenced measurement, position, or dimension. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," "attached," and the like as used herein mean the joining of two members directly to one another. Such joining may be stationary (e.g., permanent) or moveable (e.g., removable or releasable).

References herein to the positions of elements (e.g., "top," "bottom," "above," "below," etc.) are merely used to describe the orientation of various elements in the FIGURES. It should be noted that the orientation of various elements may differ according to other exemplary implementations, and that such variations are intended to be encompassed by the present disclosure.

It is important to note that the construction and arrangement of the various exemplary implementations are illustrative only. Although only a few implementations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, the position of elements may be reversed or otherwise varied, and the nature or number of discrete elements or positions may be altered or varied. The order or sequence of any process or method steps may be varied or re-sequenced according to alternative implementations. Other substitutions, modifications, changes and omissions may also be made in the design, operating conditions and arrangement of the various exemplary implementations without departing from the scope of the present invention.

What is claimed is:

1. A tube fitting for connection to a tube, the tube fitting comprising:

a main body structure configured to receive an end of the tube and fluidly connect the tube to another component;

a retainer positioned around an end of the main body structure;

a grab ring including a ring body and a plurality of axially-inwardly facing teeth that extend radially inwardly from the ring body;

a securing ring having an integrally formed main body with an outer radial surface and an outer diameter, the outer radial surface of the main body of the securing ring extending from a distal end of the main body of the securing ring and a proximal end of the main body of the securing ring, the securing ring being positioned axially inward from the grab ring, the main body of the securing ring including an inclined surface opposite the outer radial surface of the main body, the inclined surface inclined inward and toward the distal end of the securing ring so as to approximately align with the plurality of axially-inwardly facing teeth of the grab ring, wherein the ring body of the grab ring and the plurality of axially-inwardly facing teeth of the grab ring are not extended over any portion of the outer radial surface of the main body of the securing ring between the distal end of the main body of the securing ring and the proximal end of the main body of the securing ring; and a tube liner and a spring member, wherein the tube liner is positioned at least partially within the main body structure and comprises an inner portion configured to extend into the tube and an extension that extends radially outward from an outer surface of the inner portion of the tube liner;

the main body structure and the retainer are configured such that, when the tube is only partially inserted into the tube fitting, the end of the tube is positioned at a depth that is less than a depth within the tube fitting;

wherein, when the tube is fully inserted into the tube fitting, the end of the tube is positioned at the depth within the tube fitting and at least one insertion indication is provided within the tube fitting to indicate that the tube has been fully inserted into the tube fitting, and the main body structure and the retainer cooperate together to prevent the retainer from freely rotating about the end of the main body structure; and wherein the spring member is positioned along the extension and is configured to abut the end of the tube such that, when the tube moves in a first axial direction into the tube fitting and is fully inserted into the tube fitting, the spring member pushes the tube backward in a second axial direction opposite to the first axial direction to provide the at least one insertion indication.

2. The tube fitting of claim 1, wherein the tube liner comprises an outer portion with a lip configured to abut a ledge along an inner surface of the main body structure.

3. The tube fitting of claim 1, further comprising:

a grab ring that is configured to grip an outer surface of the tube and move in the second axial direction when the tube moves in the second axial direction.

4. The tube fitting of claim 3, further comprising a cartridge ring positioned at least partially within the retainer, wherein movement of the grab ring in the second axial direction moves the cartridge ring in the second axial direction.

5. The tube fitting of claim 3, wherein:

the retainer comprises at least one tab that extends axially inward, and an outer surface of the main body structure comprises a channel that extends radially around the main body structure and is configured to receive the at least one tab of the retainer.

6. The tube fitting of claim 5, wherein the channel comprises an end wall, wherein, when the at least one tab is pulled further into the channel in the second axial direction, a free end of the at least one tab abuts the end wall, and wherein a frictional force of the at least one tab of the retainer being pulled onto the end wall of the channel of the main body structure in the second axial direction prevents the retainer from rotating relative to the main body structure and provides a force indication that the tube is fully inserted into the tube fitting.

7. The tube fitting of claim 6, wherein the end wall of the channel of the main body structure comprises at least one notch that is indented axially along a circumferential length of the end wall, wherein the at least one tab is configured to align with and be received within the at least one notch such that side edges of the at least one notch rotationally lock the retainer relative to the main body structure to provide the force indication that the tube is fully inserted into the tube fitting.

8. The tube fitting of claim 1, wherein, when the tube is only partially inserted into the tube fitting, the at least one insertion indication is not performed.

9. The tube fitting of claim 1, further comprising a tube liner positioned at least partially within the main body structure and configured to extend into the tube, wherein, when the tube is fully inserted into the tube fitting, the main body structure and the tube liner cooperate together to provide an audible indication to indicate that the tube has been fully inserted into the tube fitting.

10. The tube fitting of claim 9, wherein:

one of the main body structure and the tube liner comprises a protrusion, and the other of the main body structure and the tube liner comprises a groove configured to receive the protrusion, wherein the audible indication is generated when the groove receives the protrusion.

11. A kit for connecting fluid conduits, the kit comprising:

a tube fitting having a body assembly configured to receive an end of a tube and fluidly connect the tube to another component, the tube fitting comprising:

a retainer positioned around an end of the body assembly;

a seal member positioned at least partially within the body assembly and configured to provide a seal with an outer portion of the tube;

a grab ring including a ring body and one or more teeth that extend radially inwardly from the ring body, the one or more teeth configured to secure the tube;

a protection ring positioned axially between the grab ring and the seal member; wherein, when the tube is fully inserted into the tube fitting, the end of the tube is positioned at a depth within the tube fitting and at least one insertion indication is provided within the tube fitting to indicate that the tube has been fully inserted into the tube fitting, and the body assembly and the retainer cooperate together to prevent the retainer from freely rotating about the end of the body assembly; and a tube liner and a spring member, wherein the tube liner is positioned at least partially within the body assembly and comprises an inner portion configured to extend into the tube and an extension that extends radially outward from an outer surface of the inner portion of the tube liner;

wherein the spring member is positioned along the extension and is configured to abut the end of the tube such that, when the tube moves in a first axial direction into the tube fitting and is fully inserted into the tube fitting, the spring member pushes the tube backward in a second axial direction opposite to the first axial direction to provide the at least one insertion indication;

a tube stiffener configured to extend axially into the tube once the tube is at least partially inserted into the body assembly;

wherein the protection ring has an integrally formed body with an outer radial surface and an outer diameter, the outer radial surface of the body of the protection ring extending from a distal end of the body of the protection ring and a proximal end of the body of the protection ring, wherein the one or more teeth of the grab ring align opposite to the outer radial surface of the body of the protection ring such that the one or more teeth of the grab ring and the ring body of the grab ring are not extended over any portion of the outer radial surface of the body of the protection ring between the distal end of the body of the protection ring and the proximal end of the body of the protection ring.

12. The kit of claim 11, wherein the at least one insertion indication is an audible indication.

13. The kit of claim 11, wherein the at least one insertion indication is a force indication.

14. The kit of claim 11, wherein the protection ring has an indication member that is visible to provide a visual indication, wherein the indication member is configured to press against an inner surface of the body assembly.

15. The kit of claim 11, further comprising a demount ring movable between a concealed position in which the demount ring is positioned completely within the body assembly and an exposed position in which the demount ring is positioned partially outside of the body assembly.

16. A tube fitting for connection to a tube, the tube fitting comprising:

a main body structure configured to receive an end of the tube and fluidly connect the tube to another component;

a grab ring including a ring body and one or more teeth that extend radially inwardly from the ring body, the one or more teeth configured to secure the tube;

a securing ring having an integrally formed main body with an outer radial surface and an outer diameter, the outer radial surface of the main body of the securing ring extending from a distal end of the main body of the securing ring and a proximal end of the main body of the securing ring, the securing ring being positioned axially inward from the grab ring, the main body of the securing ring including an inclined surface opposite the outer radial surface of the main body, the inclined surface inclined inward and toward the distal end of the securing ring so as to approximately align with the one or more teeth, wherein the ring body of the grab ring and the one or more teeth of the grab ring are not extended over any portion of the outer radial surface of the main body of the securing ring between the distal end of the main body of the securing ring and the proximal end of the main body of the securing ring;

a retainer positioned around an end of the main body structure such that the retainer is prevented from freely rotating about the end of the main body structure, wherein an insertion indication is provided within the tube fitting to indicate when an end of the tube is fully inserted to a depth within the tube fitting; and a tube liner and a spring member, wherein the tube liner is positioned at least partially within the main body structure and comprises an inner portion configured to extend into the tube and an extension that extends radially outward from an outer surface of the inner portion of the tube liner;

wherein the spring member is positioned along the extension and is configured to abut the end of the tube such that, when the tube moves in a first axial direction into the tube fitting and is fully inserted into the tube fitting, the spring member pushes the tube backward in a second axial direction opposite to the first axial direction to provide the insertion indication.

17. The tube fitting of claim 16, wherein the insertion indication is an audible indication.

18. The tube fitting of claim 16, wherein the insertion indication is a force indication.

19. The tube fitting of claim 16, wherein the insertion indication is a visual indication.

20. A tube fitting for connection to a tube, the tube fitting comprising:

a main body structure configured to receive an end of the tube and fluidly connect the tube to another component;

a retainer positioned around an end of the main body structure;

a tube liner and a spring member, wherein the tube liner is positioned at least partially within the main body structure and comprises an inner portion configured to extend into the tube and an extension that extends radially outward from an outer surface of the inner portion of the tube liner;

wherein the spring member is positioned along the extension and is configured to abut the end of the tube such that, when the tube moves in a first axial direction into the tube fitting and is fully inserted into the tube fitting, the spring member pushes the tube backward in a second axial direction opposite to the first axial direction to provide the at least one insertion indication;

the main body structure and the retainer are configured such that, when the tube is only partially inserted into the tube fitting, the end of the tube is positioned at a depth that is less than a depth within the tube fitting; and wherein, when the tube is fully inserted into the tube fitting, the end of the tube is positioned at the depth within the tube fitting and at least one insertion indication is provided within the tube fitting to indicate that the tube has been fully inserted into the tube fitting, and the main body structure and the retainer cooperate together to prevent the retainer from freely rotating about the end of the main body structure.

21. A kit for connecting fluid conduits, the kit comprising:

a tube fitting having a body assembly configured to receive an end of a tube and fluidly connect the tube to another component, the tube fitting comprising:

a retainer positioned around an end of the body assembly;

a seal member positioned at least partially within the body assembly and configured to provide a seal with an outer portion of the tube;

a grab ring having one or more teeth configured to secure the tube; and a protection ring positioned axially between the grab ring and the seal member; wherein, when the tube is fully inserted into the tube fitting, the end of the tube is positioned at a depth within the tube fitting and at least one insertion indication is provided within the tube fitting to indicate that the tube has been fully inserted into the tube fitting, and the body assembly and the retainer cooperate together to prevent the retainer from freely rotating about the end of the body assembly; and a tube stiffener configured to extend axially into the tube once the tube is at least partially inserted into the body assembly;

wherein the protection ring has an indication member that is visible to provide a visual indication, wherein the indication member is configured to press against an inner surface of the retainer to prevent the protection ring from inadvertently moving on its own within the body assembly while still being slidable when moved by an activation structure or demount ring.

* * * * *